(12) United States Patent
Peterson et al.

(10) Patent No.: US 8,931,277 B2
(45) Date of Patent: Jan. 13, 2015

(54) SYSTEM AND METHOD FOR STORING ENERGY AND PURIFYING FLUID

(75) Inventors: Richard B. Peterson, Corvallis, OR (US); Robbie Ingram-Goble, Corvallis, OR (US); Kevin J. Harada, Junction City, OR (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 23 days.

(21) Appl. No.: 13/236,466

(22) Filed: Sep. 19, 2011

(65) Prior Publication Data

US 2012/0067047 A1 Mar. 22, 2012

Related U.S. Application Data

(60) Provisional application No. 61/403,770, filed on Sep. 20, 2010, provisional application No. 61/463,785, filed on Feb. 22, 2011, provisional application No. 61/520,810, filed on Jun. 14, 2011, provisional application No. 61/520,781, filed on Jun. 14, 2011.

(51) Int. Cl.
  *F01K 3/00* (2006.01)
  *F01K 13/02* (2006.01)
  (Continued)

(52) U.S. Cl.
  CPC . *F28D 17/00* (2013.01); *C02F 1/22* (2013.01); *F01K 3/12* (2013.01); *F01K 25/08* (2013.01);
  (Continued)

(58) Field of Classification Search
  CPC ......... Y02E 60/14; Y02E 60/10; F01K 25/00; F01K 3/00; F28D 20/0056; F28D 20/02
  USPC .................................................. 60/645–682
  See application file for complete search history.

(56) References Cited

U.S. PATENT DOCUMENTS

| 4,024,908 A | 5/1977 | Meckler |
| 4,429,536 A * | 2/1984 | Nozawa .......................... 60/655 |

(Continued)

FOREIGN PATENT DOCUMENTS

| DE | 4112358 | * 10/1992 | ............... B01J 20/18 |
| GB | 906306 | 9/1962 | |

(Continued)

OTHER PUBLICATIONS

Scharli et al, Determination of specific heat capacity on rock fragments, Geothermics, 30 (2001) 93-110.*

(Continued)

*Primary Examiner* — Kenneth Bomberg
*Assistant Examiner* — Deming Wan
(74) *Attorney, Agent, or Firm* — Klarquist Sparkman, LLP

(57) ABSTRACT

Embodiments of a system for storing and providing electrical energy are disclosed. Also disclosed are embodiments of a system for purifying fluid, as well as embodiments of a system in which energy storage and fluid purification are combined. One disclosed embodiment of the system comprises a latent heat storage device, a sensible heat storage device, a vapor expander/compressor device mechanically coupled to a motor/generator device, a heat-exchanger, and a liquid pressurization and depressurization device. The devices are fluidly coupled in a closed-loop system, and a two-phase working fluid circulates therein. Embodiments of a method for operating the system to store and generate energy also are disclosed. Embodiments of a method for operating the system to purify fluid, as well as embodiments of a method for operating a combined energy storage and fluid purification system are disclosed.

42 Claims, 47 Drawing Sheets

(51) Int. Cl.

| | | |
|---|---|---|
| *F01K 1/00* | (2006.01) | |
| *F28D 17/00* | (2006.01) | |
| *C02F 1/22* | (2006.01) | |
| *F01K 3/12* | (2006.01) | |
| *F01K 25/08* | (2006.01) | |
| *F28D 20/00* | (2006.01) | |
| *F28D 20/02* | (2006.01) | |
| *C02F 103/08* | (2006.01) | |

(52) U.S. Cl.
CPC ............ *F28D 20/0056* (2013.01); *F28D 20/02* (2013.01); *C02F 2303/10* (2013.01); *C02F 2103/08* (2013.01); *Y02E 60/142* (2013.01); *Y02E 60/145* (2013.01)
USPC .................. 60/651; 60/652; 60/659

(56) References Cited

U.S. PATENT DOCUMENTS

| | | | | |
|---|---|---|---|---|
| 4,755,200 | A | * | 7/1988 | Liu et al. ............. 62/11 |
| 4,976,464 | A | | 12/1990 | Swenson |
| 5,012,767 | A | | 5/1991 | Sheikh et al. |
| 5,299,630 | A | * | 4/1994 | Schatz ............. 165/10 |
| 5,497,629 | A | | 3/1996 | Rafalovich et al. |
| 5,513,699 | A | | 5/1996 | Menze et al. |
| 6,560,971 | B2 | * | 5/2003 | Takao et al. ............. 62/54.1 |
| 6,997,010 | B2 | * | 2/2006 | Suzuki et al. ............. 62/434 |
| 7,235,301 | B2 | * | 6/2007 | Bacher et al. ............. 428/408 |
| 7,603,860 | B2 | | 10/2009 | Thomas |
| 2005/0247906 | A1 | * | 11/2005 | Neuschutz et al. ............. 252/70 |
| 2008/0006040 | A1 | | 1/2008 | Peterson et al. |
| 2008/0092542 | A1 | * | 4/2008 | Graham ............. 60/651 |
| 2008/0276616 | A1 | | 11/2008 | Flynn et al. |
| 2009/0121495 | A1 | * | 5/2009 | Mills ............. 290/4 D |
| 2009/0211726 | A1 | * | 8/2009 | Bank et al. ............. 165/10 |
| 2010/0001228 | A1 | * | 1/2010 | Tomura et al. ............. 252/75 |
| 2010/0126344 | A1 | * | 5/2010 | Stein et al. ............. 95/96 |
| 2010/0304227 | A1 | | 12/2010 | Kah et al. |

FOREIGN PATENT DOCUMENTS

| | | |
|---|---|---|
| GB | 1118413 | 7/1968 |
| WO | WO 2004/045738 A2 | 6/2004 |
| WO | WO 2009/048479 A1 | 4/2009 |
| WO | WO 2010/006942 A1 | 1/2010 |
| WO | WO 2010/020480 A2 | 2/2010 |

OTHER PUBLICATIONS

Peterson et al., "Energy Storage and Waste Heat Recovery: A Synergistic Effect Benefiting Renewable Energy," Paper No. 54784, *Proceedings of the 5th International Conference on Energy Sustainability*, Aug. 7-10, 2011, Washington, D.C.
International Search Report and Written Opinion dated Feb. 23, 2012, from International Application No. PCT/US2011/052171.
International Search Report dated Feb. 7, 2014, from International Application No. PCT/US2013/057646 (three pages).
Written Opinion dated Feb. 7, 2014, from International Application No. PCT/US2013/057646 (five pages).

* cited by examiner

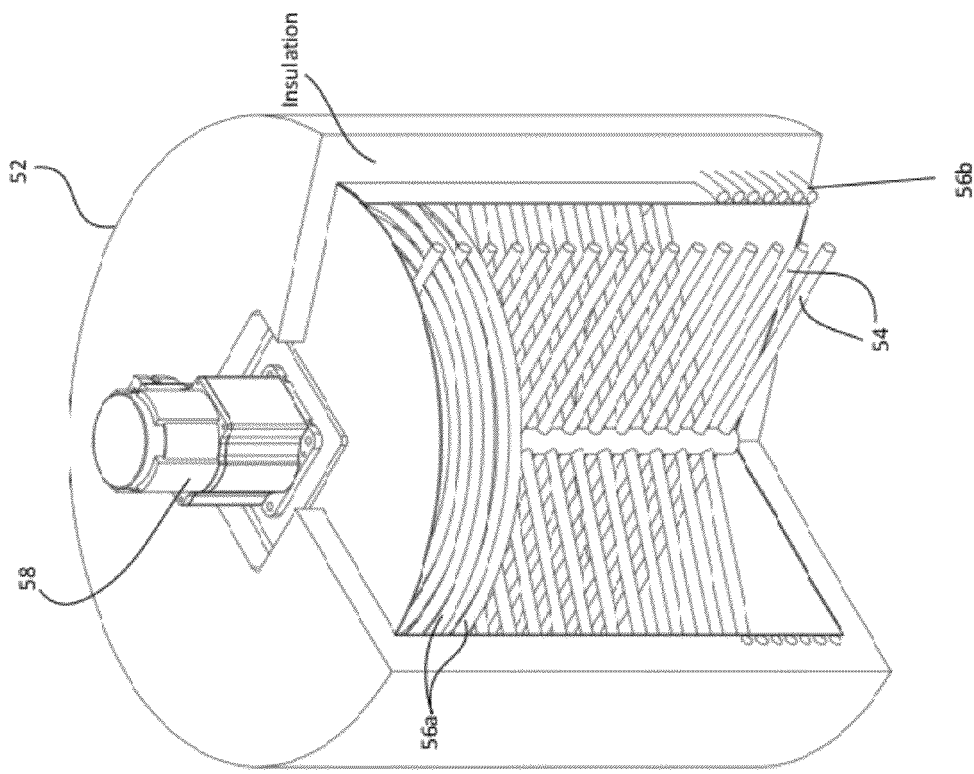
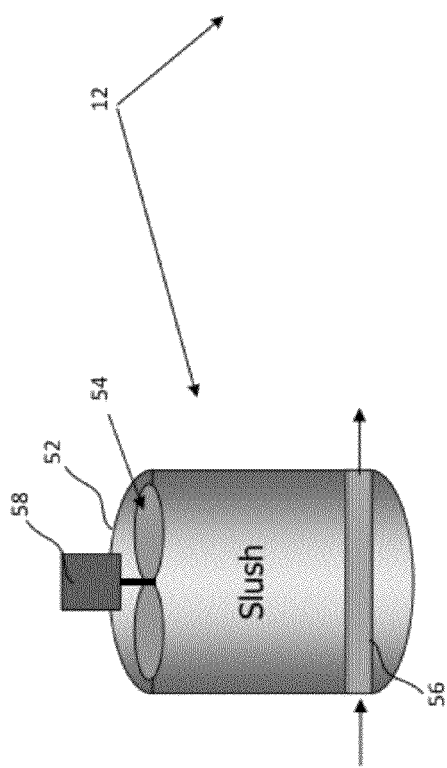
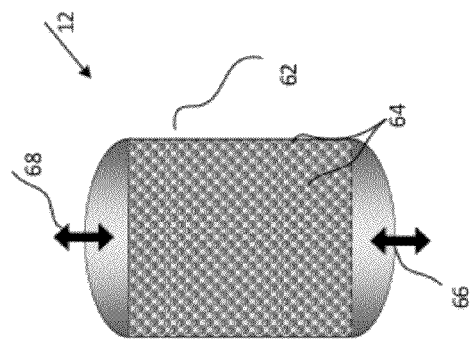
FIG. 4
FIG. 3
FIG. 5

SYSTEM AND METHOD FOR STORING ENERGY AND PURIFYING FLUID

CROSS REFERENCE TO RELATED APPLICATION

This application claims the benefit of the earlier filing date of U.S. provisional application No. 61/403,770, filed Sep. 20, 2010, U.S. provisional application No. 61/463,785, filed Feb. 22, 2011, U.S. provisional application No. 61/520,781, filed Jun. 14, 2011, and U.S. provisional application No. 61/520,810, filed on Jun. 14, 2011, all of which are incorporated herein by reference in their entirety.

FIELD

This disclosure relates to a system for thermally storing electrical energy, purifying fluid, and combinations thereof, as well as a method of using the disclosed system.

BACKGROUND

Developing and deploying practical grid-level energy storage is a challenge in the area of renewable energy. As renewable and sustainable energy sources, such as wind and solar, are developed, the intermittency factors of these sources become a concern. A need exists for the development of storage systems to level-load or smooth out the peaks and dead times in their power output. In addition to this need, other grid services could be provided by versatile energy storage, including electrical energy time shifting, load following, area regulation, as examples.

Some approaches to grid-level storage include capacitors, flywheels, batteries, compressed air energy storage (CAES), and pumped hydro energy storage. These approaches have several disadvantages, including technical difficulties, high costs, and limited applicability outside of particular niche areas. For example, capacitors are fast-reacting and can sink large currents, but they have limited storage capacity. Their niche area is grid voltage and frequency maintenance through electronic control circuitry. Flywheels and batteries are typically capable of meeting only moderate storage capacity needs. Also, flywheels can be expensive to construct and operate, and batteries tend to have a relatively short lifespan. In the higher capacity range, CAES and pumped hydro energy storage are often preferred; however, site-specific issues dictate where such plants can be placed.

The world's fresh water supplies are being depleted due to a number of different factors. As additional people from various arid and semi-arid regions require water for both irrigation and personal use, aquifers are being depleted at ever increasing rates. Furthermore, climate change is decreasing snowpacks and reducing the size of glaciers such that fresh water derived from these traditionally renewable sources are falling short of their historic levels. Sustainable use of fresh water does not appear to be a priority in developed countries where supplies are being utilized to satisfy an increasing number of uses such as hydroelectric power generation, agriculture, and for use by urban areas for personal and industrial use. It has been estimated that within the next 25 years, water may be shipped in oil tanker-like vessels from areas where it remains plentiful (e.g. Alaska) to regions of the world that suffer from lack of water. If these trends continue, wide spread drought could lead to starvation and conflict. Expensive, energy intensive technology already exists for creating fresh water from non-potable sources. Technologies such as reverse osmosis (RO) and flash evaporation are used where energy sources in the form of electricity and/or heat generation (mostly through combustion) are plentiful. However, when measured in terms of energy needed to produce a unit of fresh water, these techniques are not particularly efficient although RO systems are under continual improvement. Therefore, there is a need for methods of energy efficient production of fresh water using energy sources that are present indigenously in the regions where the water is to be used.

SUMMARY

Embodiments of a system for storing and providing electrical energy are disclosed. One disclosed embodiment of the system comprises a latent heat storage device, a sensible heat storage device, a vapor expander/compressor device mechanically coupled to a motor/generator, a heat-exchanger device, and a liquid pressurization and depressurization device. The devices are fluidly coupled in a closed-loop system, and a two-phase working fluid circulates therein.

Certain disclosed embodiments of the system can be configured as a cold storage system, wherein the latent heat storage device stores heat of vaporization at an effective temperature, such as a temperature of about −65° C. to about 0° C. The cold storage system can comprise components fluidly coupled in the following order: a vapor expander/compressor device mechanically coupled to a motor/generator; a heat-exchanger device; a sensible heat storage device; a liquid pressurization and depressurization device; and a latent heat storage device. The heat exchanger can be operable near an ambient temperature during energy storage and at a higher than ambient temperature during energy generation. In particular disclose embodiments, the pressurization and depressurization device may be a pump/motor device.

Certain disclosed embodiments of the system can be configured as a hot storage system, wherein the latent heat storage device stores heat of condensation at an effective temperature, such as a temperature of about 90° C. to about 150° C. The hot storage system can comprise components fluidly coupled in the following order: a sensible heat storage device; a liquid pressurization and depressurization device; a heat-exchanger device; a vapor expander/compressor device mechanically coupled to a motor/generator; and a latent heat storage device.

A latent heat storage device can comprise a storage tank, housing a latent heat storage material. The storage tank can be insulated to maintain an effective internal temperature, such as a temperature of from about −65° C. to about 0° C. The latent heat storage material can have a melting point corresponding to the effective temperature, such as a temperature of from about −65° C. to about 0° C. The latent heat storage material can have a melting point corresponding to the effective temperature, such as temperatures of from about −65° C. to about 0° C. The latent heat storage material can be encapsulated in a thermally conductive material, hence the cycle working fluid and the encapsulated material for latent heat storage do not mix. The size of each capsule can be small for increased surface area contact between the working fluid and the latent heat storage material. For example, each capsule can have a volume preferably less than approximately 350 cm$^3$. In another embodiment the latent heat storage material can be in the form of a solid-liquid mixture, which can be agitated by the use of an agitator, operating either continuously or intermittently. In this embodiment, the cycle working fluid would be separated from the latent heat storage material by a heat exchanger, although still further embodiments may have the working fluid and the latent heat storage material contacting each other through a direct contact heat exchange process. The latent heat storage material can be a single substance, such as water or an alkylene glycol, such as ethylene glycol or propylene glycol. The latent heat storage material can comprise a mixture of two or more materials, such as water and one or more alkylene glycols.

A sensible heat storage device can comprise an insulated storage tank operable for maintaining a thermal gradient, such that the working fluid flowing through the device mediates the temperature change from the ambient temperature heat exchanger to the temperature at which the thermal energy is stored in a latent form. The storage tank can be oriented as deemed appropriate for a particular application, but is typically vertically oriented. The storage tank can house a granulated mixture of solid material for increased heat capacity, decreased volume of the working fluid, and decreased mixing of the working fluid. The granulated mixture can comprise a material which is chemically non-reactive with the working fluid so that it can be maintained in intimate contact with the working fluid. The granulated mixture can comprise a material having a thermal capacity of from about 1,200 (J/kg ° C.) to about 200 (J/kg ° C.). The granulated mixture can further comprise a material selected from granite and other rock-based material, silica-based material, concrete, metal, glass, plastics, ceramics and combinations thereof. The sensible heat storage device can be operable such that the working fluid at one end of the device can have warmer temperature than the working fluid at the other end of the device.

A working fluid can be water, ammonia, alcohols, a natural or synthetic refrigerant, or a mixture comprising natural or synthetic refrigerants. The working fluid can be an alkane having from 1 to 10 carbon atoms, such as propane or hexane.

The system can be electrically coupled to a power grid or effectively coupled to an alternate power source. The system can further comprise a heater, such as a combustor, a gas-fired boiler, a furnace, or other suitable heater for adding heat to the system. The heater can be operable to provide heat during power generation, if stored heat becomes depleted before the next charging cycle. The system can further comprise a waste-heat recovery device. The waste-heat recovery device can comprise a second fluid loop for capturing and using heat from various industrial processes, from power plants, or heat naturally available in the environment. The second fluid loop can include a second heat-exchanger, preferably a counterflow heat exchanger. In some embodiments, the second fluid loop can be a cooling tower. Low grade waste-heat, or temperature differences found in the environment, can be used for increasing the round-trip efficiency of the system. In particular embodiments, latent heat storage may be combined with sensible heat storage, wherein at least one sensible heat storage device is thermally coupled with the latent heat storage device through a secondary fluid loop. In particular embodiments, the sensible heat storage device is fluidly coupled with a heat exchanger that is thermally coupled with the latent heat storage device.

Embodiments of a method for storing and generating energy also are disclosed. One disclosed embodiment comprises operating a system comprising a latent heat storage device fluidly coupled to a sensible heat storage device, and having a two-phase working fluid flowing there through. The system is operated to perform a charging cycle to store energy as sensible heat and latent heat. The method also may comprise operating the system to perform a discharging cycle using stored latent heat and stored sensible heat to mediate a thermal power cycle. Operating the system can further comprise using a waste-heat recovery device. The system can use temperature variations found in the environment, or technology-generated temperature variations such as an industrial waste heat source, to increase the round-trip efficiency of the system.

Storing energy can comprise compressing and hence heating a working fluid by passing it through a compressor, condensing the working fluid by passing it through a heat exchanger; cooling the working fluid by passing it through the sensible heat storage device, depressurizing the working fluid by passing it through a liquid motor, and vaporizing the working fluid by passing it through the latent heat storage device. Cooling the working fluid can comprise storing sensible heat from the working fluid in a thermally stable temperature gradient within the sensible heat storage device. The working fluid can be vaporized by transferring latent heat from the latent heat storage material to the working fluid while a low pressure is maintained in the latent heat storage device by the compressor.

Generating energy can comprise condensing the working fluid by passing it through the latent heat storage device, pressurizing the working fluid by passing it through a liquid pump, raising the temperature of the working fluid by passing it through the sensible heat storage device, boiling the working fluid by passing it through a heat exchanger, and expanding the working fluid to generate power. Boiling can comprise heating the working fluid by transferring heat from the environment, or a waste heat source, to the working fluid in the heat exchanger. Condensing can comprise cooling the working fluid by transferring heat from the fluid to the latent heat storage material.

Embodiments of a thermally mediated energy storage method also are disclosed. One disclosed embodiment comprises combining a heat pump cycle and a heat engine cycle within a single, fluidly-closed loop system. The system can operate as a heat pump during charging and as a heat engine during discharging. A disclosed embodiment can comprise operating the closed loop system by delivering a phase change working fluid through the closed loop system and embedding sensible heat storage in the compression (charging) cycle of the working fluid. The compression cycle can be powered by electrical energy, which can be converted to heat and stored in the phase change of a latent heat storage material. During discharging (during the expansion cycle of the working fluid), the system can be operated to convert the stored latent heat to electrical energy and use stored sensible heat for increased round-trip efficiency of the system.

Additional embodiments concern a system that purifies fluids. Any fluid capable of being purified using a freezing/thawing purification process is contemplated in the present disclosure, which certain embodiments being selected from water, solvents, and combinations thereof. Particular disclosed embodiments comprise both freezing processes and melting processes, which may be carried out continuously or intermittently. Particular embodiments of the disclosed system are capable of separating pure water (e.g. potable water) any species of contaminant present in non-potable water that is substantially removed during the freezing and/or washing processes disclosed herein. In certain embodiments, a thermodynamic heat pump cycle, also referred to as a freezing cycle, is made by a freezing loop comprising a vapor compressor, a heat exchanger in a freezing section, a pressure reducing device, and a condenser in thermal communication with a heat sink may be used in combination with a thermodynamic power cycle, also referred to as a thawing cycle, comprising a vapor expander, a heat exchanger in a melting section, a pump, and an evaporator in thermal communication with a heat source. Embodiments of the disclosed system that purify water also comprise a freezer where non-potable water is frozen, a unit where ice and concentrate are separated and the ice is washed, a melter that melts ice, and a device that cools the incoming non-potable water and/or expels potable water from the system. Many variations of the disclosed system are disclosed as well as a method for its use.

In other disclosed embodiments, energy storage and water purification may be combined in order to make a system capable of performing both processes. Particular embodiments concern coupling the water processing components of the purification system with the components used in embodiments of the disclosed energy storage system, such as, but not limited to, a sensible heat storage unit. Low-grade heat may be used to power the disclosed processes; however, a person of ordinary skill in the art will recognize that external sources of energy other than low-grade heat may be used. Many variations of the disclosed system are disclosed as well as a method for its use.

The foregoing and other objects, features, and advantages of the invention will become more apparent from the following detailed description, which proceeds with reference to the accompanying figures.

BRIEF DESCRIPTION OF THE DRAWINGS

FIG. 3 is a schematic diagram of one embodiment of a latent heat storage tank.

FIG. 4 is a schematic diagram of another embodiment of a latent heat storage tank.

FIG. 5 is a schematic diagram of another embodiment of a latent heat storage tank comprising encapsulated latent heat storage material.

DETAILED DESCRIPTION

I. Terms

Figure 1:
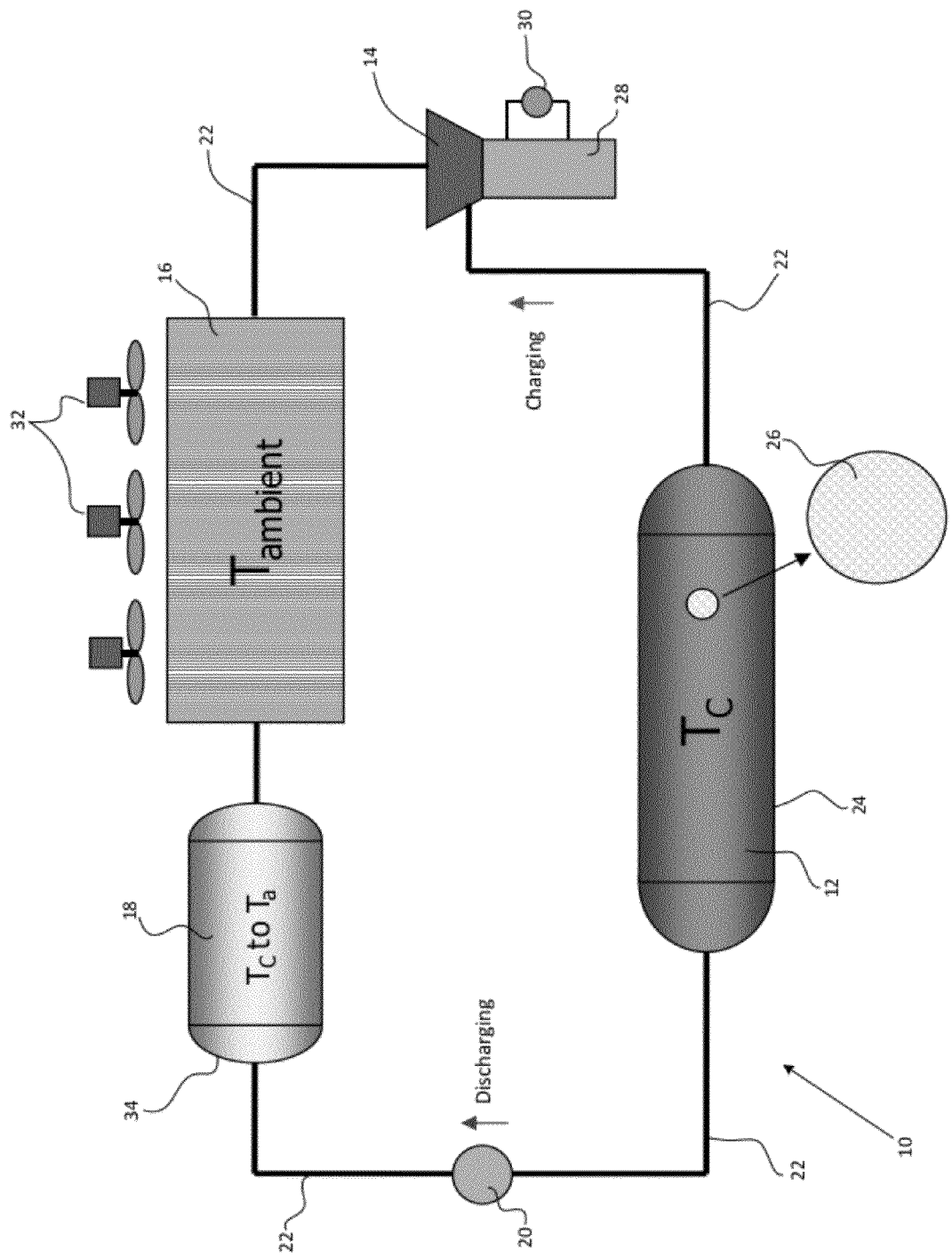
FIG. 1 is a schematic diagram of an embodiment of the system wherein latent heat is stored in a cold storage tank.

The following description is exemplary in nature and is not intended to limit the scope, applicability, or configuration of the invention in any way. Various changes to the described embodiment may be made in the function and arrangement of the elements described herein without departing from the scope of the invention. Further, descriptions and disclosures provided in association with one particular embodiment are not limited to that embodiment, and may be applied to any embodiment disclosed.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language. The terms "potable" and "purified" may be used interchangeably throughout this application. Furthermore, particular disclosed embodiments that concern a system and/or method that purifies water may be used with other fluids, as well as gases.

Although the operations of exemplary embodiments of the disclosed method may be described in a particular, sequential order for convenient presentation, it should be understood that disclosed embodiments can encompass an order of operations other than the particular, sequential order disclosed, unless the context dictates otherwise. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses, such as integrated with existing or planned HVAC systems of building. Additionally, the description sometimes uses terms such as "produce" and "provide" to describe the disclosed method. These terms may be high-level abstractions of the actual operations that can be performed. The actual operations that correspond to these terms can vary depending on the particular implementation and are, based on this disclosure, readily discernible by one of ordinary skill in the art. Additionally, particular disclosed embodiments concern co-functional components. The term "co-functional" in the context of this application refers to a component capable of performing two or more different functions. It would be apparent by one of ordinary skill in the art that co-functional components could be replaced by two or more dedicated single function components without changing the intent of the innovations disclosed. Furthermore, components required to implement the system could be one large component as shown in exemplary embodiments or could be a plurality of similar or identical smaller components that cumulatively implement the function of the large single component.

The term "energy storage" or "stored energy" or similar such terms are used routinely in this document to describe both specific processes involving latent heat storage and sensible heat storage, and for describing general system processes such as the storage of electrical energy from the grid.

Furthermore, when energy storage terminology is used in the context of storing thermal energy at elevated temperatures, these terms refer to the storage of thermal energy as a material increases in temperature, as in the case of sensible heat storage, or when the material changes from a solid to a liquid, as in the case of latent heat storage. When used in the context of storing energy at cold conditions, these terms refer to the storage of thermal energy in the form of "chill", or in the case of latent heat storage, when a material changes from liquid to a solid phase by the removal of thermal energy from the material.

In the various embodiments disclosed herein, certain elements that are similar to those described previously are designated by similar reference numbers for convenience. To the extent that these elements are different from the previously-described elements, those differences are either described in detail in the specification or would be apparent to one of ordinary skill in the art in view of the specification and/or figures.

II. Introduction

Particular embodiments concern a system that stores and provides electrical energy. Also, a method for operating the disclosed system is discussed, including embodiments of a method for storing energy and method for producing energy. Further embodiments concern a thermally-mediated energy storage method. In addition, embodiments of a system that purifies non-potable water are disclosed. Also, a method for purifying fluids or concentrated solutions with low energy input is disclosed.

III. A System and Method for Storing and Producing Electrical Energy

Referring now to the drawings and more particularly to FIG. 1, one embodiment of the system comprises a cold storage system 10. As used herein, the term "cold storage system" means that latent heat storage can occur at sub-ambient temperatures. As used herein, the term "latent heat storage" means reversibly storing heat of transformation (phase change heat) within the system, such that the stored heat can later be withdrawn from the system. This storage of heat as a phase change can occur at one temperature or through a range of temperatures depending upon the material composition of the phase change substance. For example, an essentially pure substance may change phase at one precise temperature; however, a mixture of substances can have a range over which phase change occurs.

System 10 as illustrated in FIG. 1 comprises a latent heat storage device 12, a vapor expander/compressor device 14, a heat-exchanger device 16, a sensible heat storage device 18, and a pump/motor device 20. As used herein, "sensible heat" means thermal energy relating to a change in temperature, as opposed to latent heat, which means thermal energy relating to a change in phase. As shown in FIG. 1, each of the devices can be fluidly coupled in a fluidly-closed circuit 22, through which a two-phase working fluid can flow.

The latent heat storage device 12 can comprise a cold storage tank 24, which houses a latent heat storage material 26. The cold storage tank 24 can be fluidly coupled to a vapor expander/compressor device 14, which is, in turn, mechanically coupled to a motor/generator device 28. The motor/generator device 28 can be electrically coupled to a power grid 30. As would be understood by one of ordinary skill in the art, the motor/generator 28 can be effectively coupled to any suitable power source other than a power grid. For example, the motor/generator can be electrically coupled to the power output of a wind turbine or a water turbine.

The expander/compressor 14 can be fluidly coupled to a heat-exchanger device 16. The heat-exchanger device 16 can comprise a phase-change heat exchanger which causes the working fluid to undergo condensation at an ambient temperature, $T_{ambient}$, while exchanging thermal energy with the surroundings. The heat-exchanger device 16 can further comprise a temperature-modulator device 32 for adjusting the driving temperature difference ($\Delta T$) by motivating higher or lower air flow across the heat exchanger. The driving temperature difference, $\Delta T$, as used herein, means the difference between the temperature of the working fluid undergoing a phase-change in the heat exchanger and the temperature of a medium providing or receiving the thermal energy.

As will be apparent to one of ordinary skill in the art, the heat exchanger 16 can exchange heat between the working fluid flowing inside fluid channels within the heat exchanger and a medium exterior to the fluid channels of the heat exchanger. Hence, the heat exchanger has a working fluid side and a medium side. The medium either provides heat to, or receives heat from, the working fluid during vaporization or condensation of the working fluid, respectively. In most applications the medium can be either a gas or a liquid, with which the working fluid can exchange thermal energy. The gas in many applications can be air. In many applications, the liquid can be water. The heat exchanger 16 can be fluidly coupled to a sensible heat storage device 18 and the sensible heat storage device 18 can be configured to cool the working fluid to about the temperature inside the cold storage tank 24.

The sensible heat storage device 18 can comprise an insulated tank 34. The sensible heat storage device 18 can house a granulated mixture for increased thermal capacity, decreased volume of the working fluid within the system 10, and decreased mixing of the working fluid within the tank 34. The sensible heat storage device 18 is fluidly coupled to a pressurization and depressurization device, such as pump/motor device 20, operable for pumping liquids. The pump/motor device 20 can comprise a reversible flow pump, which can operate as a liquid motor in reverse. The pump/motor device 20 can be a series of pumps and motors effectively coupled to allow for the direction of the flow within the system to be reversed. The pump/motor device 20 can be fluidly coupled to the latent heat storage device 12, forming a fluidly-closed circuit 22 through which the working fluid can be recycled. The working fluid can be circulated through the system primarily by mechanical work done to the fluid by the vapor expander/compressor device 14 and the pump/motor device 20. As will be apparent to one of ordinary skill in the art, other arrangements and combinations of components can be used. As an example, the disclosed pressurization and depressurization device (e.g. pump/motor device 20) can be replaced with a pump in parallel with a controllable throttling valve for reducing the pressure of the working fluid during the charging cycle.

Figure 2:
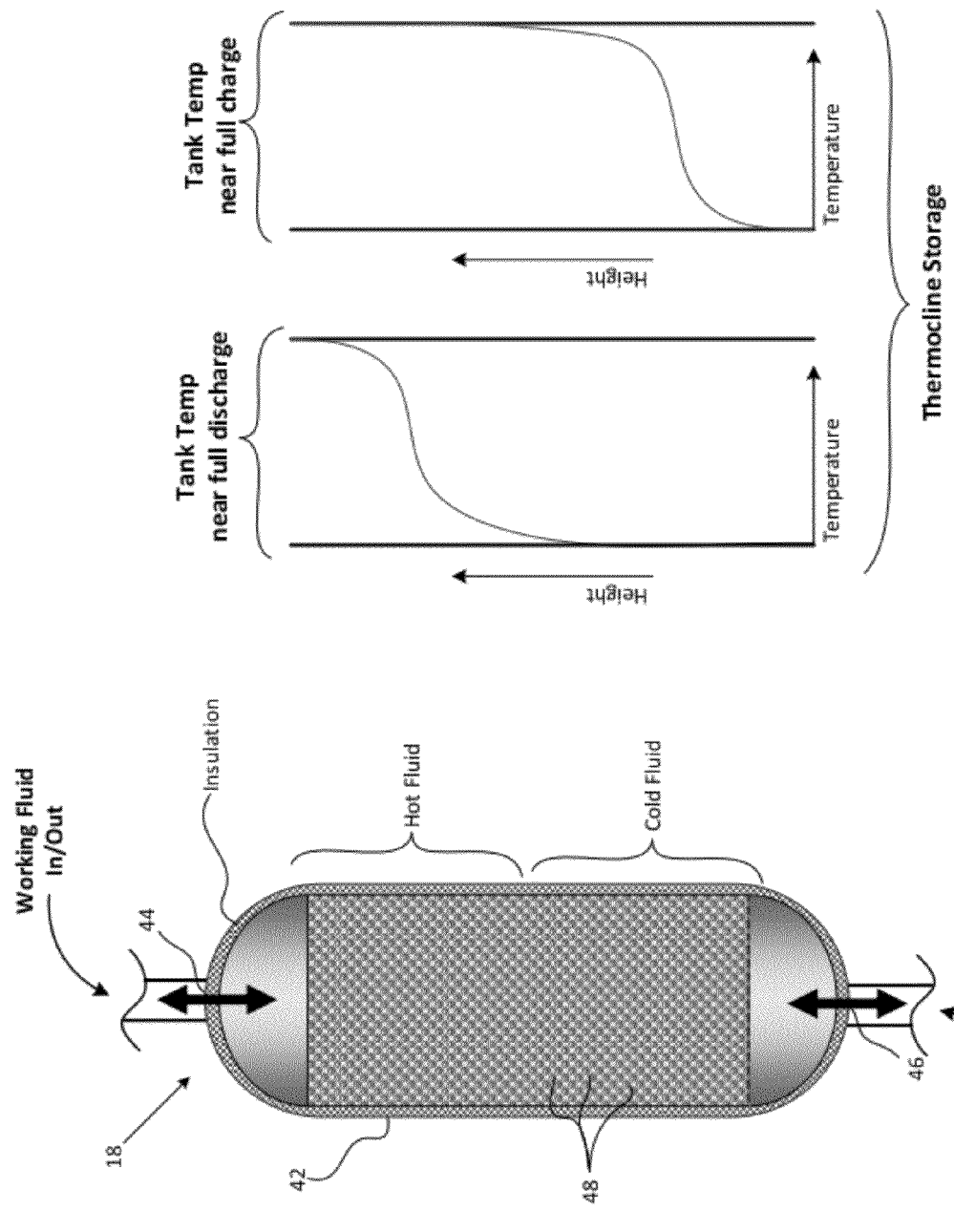
FIG. 2 is a schematic diagram of one embodiment of a sensible heat storage tank.

FIG. 2 shows an exemplary sensible heat storage device 18. As shown in FIG. 2, the sensible heat storage device 18 can comprise an insulated storage tank 42. Tank 42 may be positioned vertically with openings at the top 44 and bottom 46. The storage tank 42 can house a granulated mixture of solid material 48 that is maintained in intimate contact with the working fluid flowing through the storage tank 42. The granulated mixture 48 can comprise a solid material, which is non-reactive with the working fluid and which has a high thermal capacity. The granulated material is comprised of particles with a range of sizes. Preferably, the sizes range from about 1 cm to about 0.1 mm, and more preferably from about 1 cm to about 1 mm. The sensible heat storage device comprises a thermally stable configuration with hot fluid at one end 44 and cold fluid at the other end 46.

FIGS. 3-5 illustrate exemplary alternative embodiments of latent heat storage devices 12. FIG. 3 illustrates a latent heat storage device 12 comprising an insulated storage tank 52, wherein the latent heat storage material is a solid-liquid mixture. The storage tank 52 illustrated in FIGS. 3-5 may include an agitator 54 for agitating the solid-liquid mixture. The storage tank 52 further comprises one or more heat-exchangers 56a and 56b, wherein the working fluid flows there through. The solid-liquid mixture is agitated to prevent agglomeration of solid material and to facilitate the movement of the latent heat storage material across the heat exchanger surfaces. The device 12 can further comprise a motor 58 for driving the agitator 54.

As will be understood by one of ordinary skill in the art, the positioning of the agitator 54 and the heat exchanger 56, or multiple heat exchangers, in the storage device 12 is exemplary. It would also be understood that a heat exchanger for creating the solid phase of the energy storage media could reside outside of the insulated holding tank. Furthermore, one or more of the heat exchangers can be fitted with a surface scraper for removing the solid accumulation of phase change material on the surface of the heat exchanger. Referring to FIG. 4, the agitator can be distributed along the height of the storage tank 52 and the heat exchangers 56a and 56b can be positioned at the top. As another example, heat exchangers 56a and 56b can be positioned both at the top and at the bottom of the storage tank 52. The heat exchanger positioned at the top of the tank 52 and the heat exchanger positioned at the bottom of the tank 52 can be structurally identical or structurally different. In this embodiment, the heat exchanger positioned at the bottom of the storage tank 52 can be used for making the solid-liquid mixture through freezing and the heat exchanger positioned at the top of the tank 52 can be used for melting the solid-liquid mixture. In this way, the storage device 12 can take advantage of buoyancy. Irrespective of the heat exchanger arrangements within the storage tank 52, effective fluid coupling can deliver the working fluid to each of the separate heat exchangers and allow the system to operate as described herein.

FIG. 5 illustrates another exemplary embodiment of latent heat storage device 12. The latent heat storage device depicted in FIG. 5 comprises an insulated storage tank 62, wherein the latent heat storage material 64 is encapsulated. The storage tank 62 has an opening at each end 66 and 68, through which the working fluid can enter and exit the tank 62. The capsules containing the latent heat storage material 64 can be a size suitable for increased surface area contact with the working fluid, such as a size within the range of from about 0.1 cm$^3$ to about 100 cm$^3$. The latent heat storage material can be encapsulated in a thin layer of chemically stable solid material, which has low thermal resistance so as to maximize heat transfer between the working fluid and the latent heat storage material.

In operation, the working fluid can be circulated through the system in a substantially steady state flow. The working fluid states throughout the system are described with reference to an exemplary working fluid, propane, and in reference to FIGS. 6 and 7. The system can be operable to perform a charging cycle and a discharging cycle. Preferably, charging and discharging of the system can be accomplished in the same circuit by reversing the flow direction of the working fluid.

Figure 7:
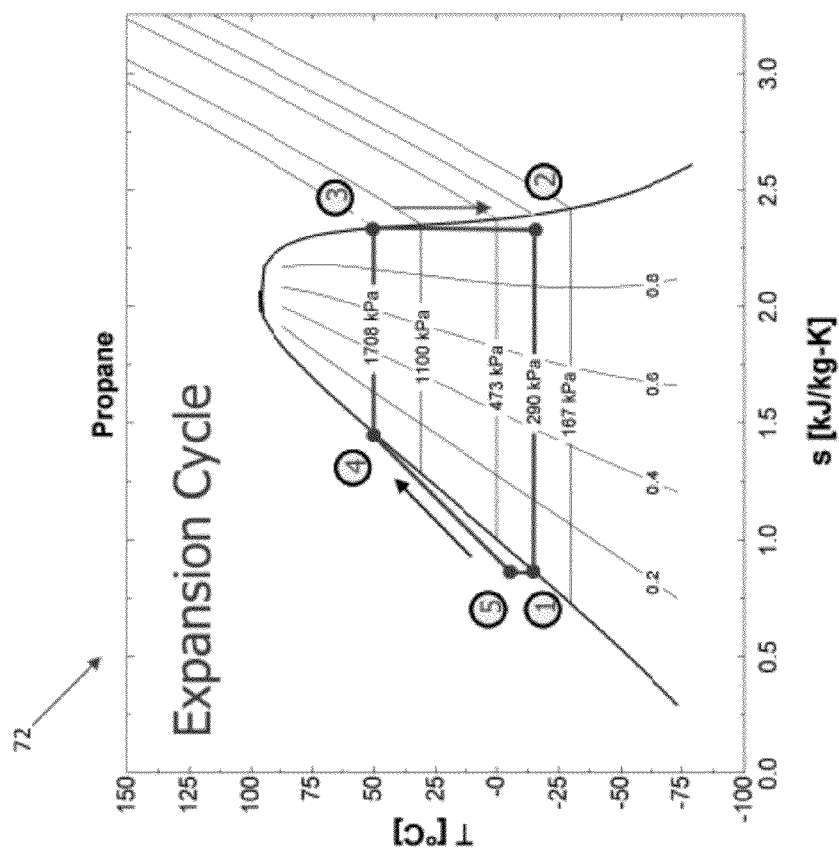
FIG. 7 is a graph of temperature (° C.) versus entropy (S, units of [kJ/kg-K]) for an expansion (discharge) cycle of the working fluid in FIG. 6.
Figure 6:
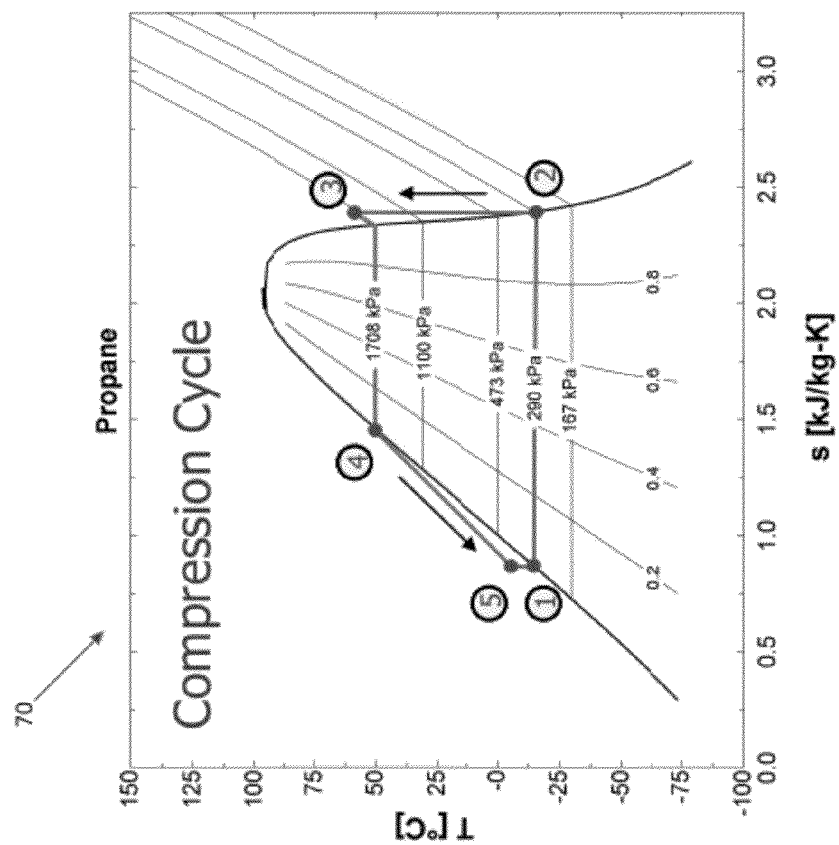
FIG. 6 is a graph of temperature (° C.) versus entropy (S, units of [kJ/kg-K]) for a compression (charge) cycle of a working fluid.

As shown in FIG. 6, a charging cycle of the system can resemble a vapor-compression cycle 70 of a two-phase working fluid. The system modifies a typical compression cycle of a two-phase fluid in a novel way by embedding thermal storage between states 4-5 and states 1-2. As shown in FIG. 7, a discharging cycle of the system can resemble an expansion cycle (Rankine power cycle) 72 of a two-phase working fluid. Another novel feature of the system is that it utilizes the thermal energy stored during the charging (compression) cycle to mediate the expansion (power) cycle.

Figure 8:
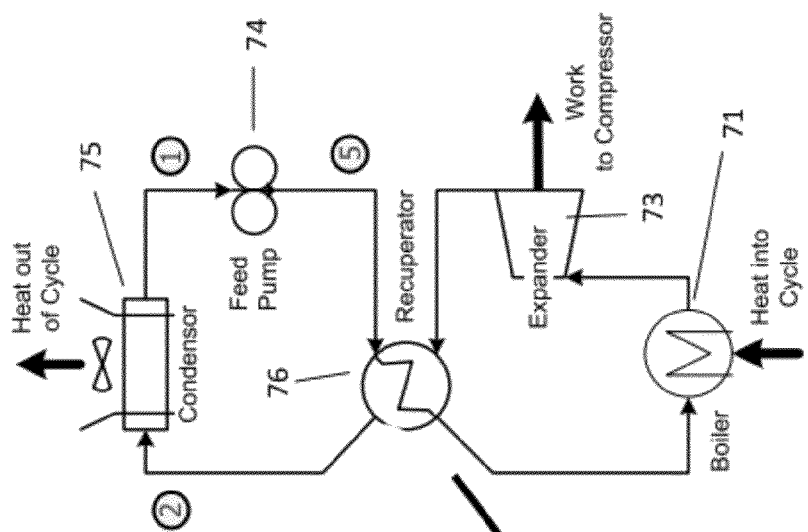
FIG. 8 is an illustration of a traditional Organic Rankine Cycle demonstrating partial recovery of heat energy by a recuperator.
Figure 8:
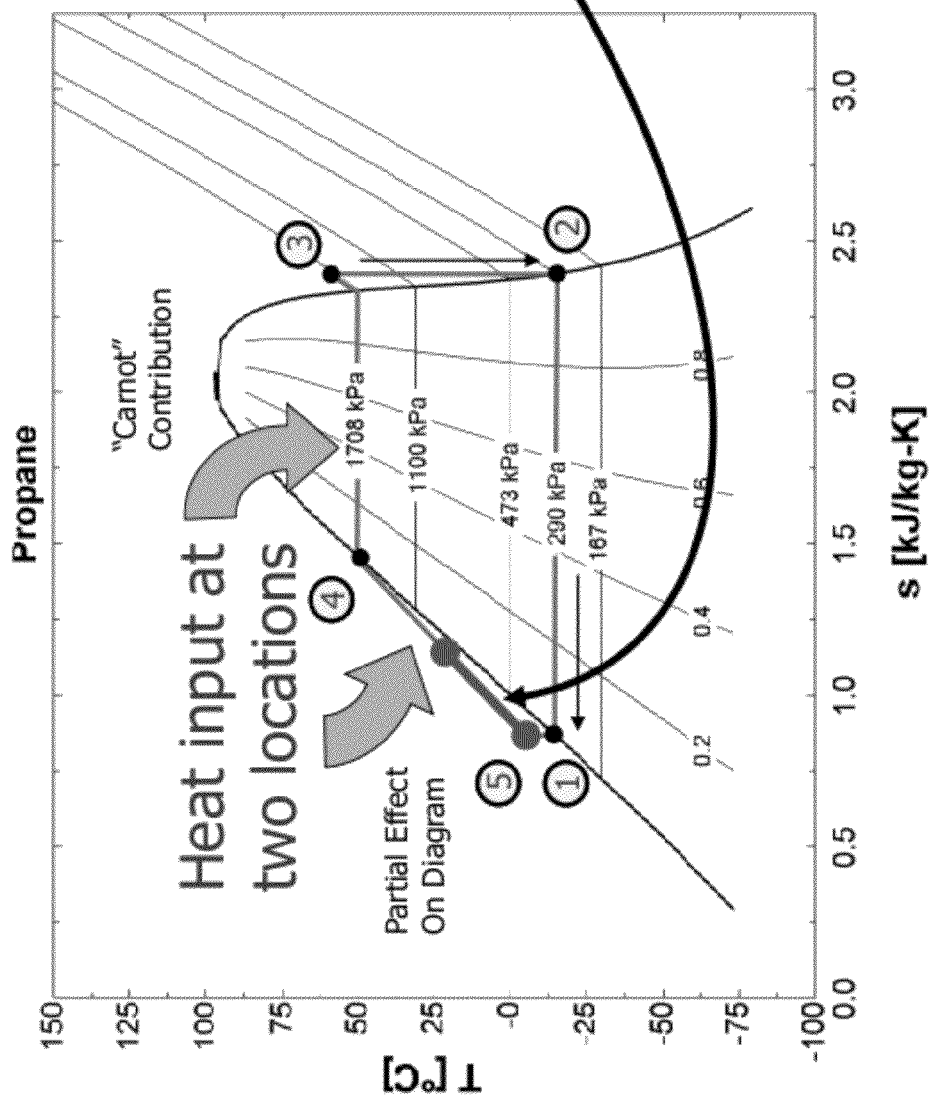
Figure 9:
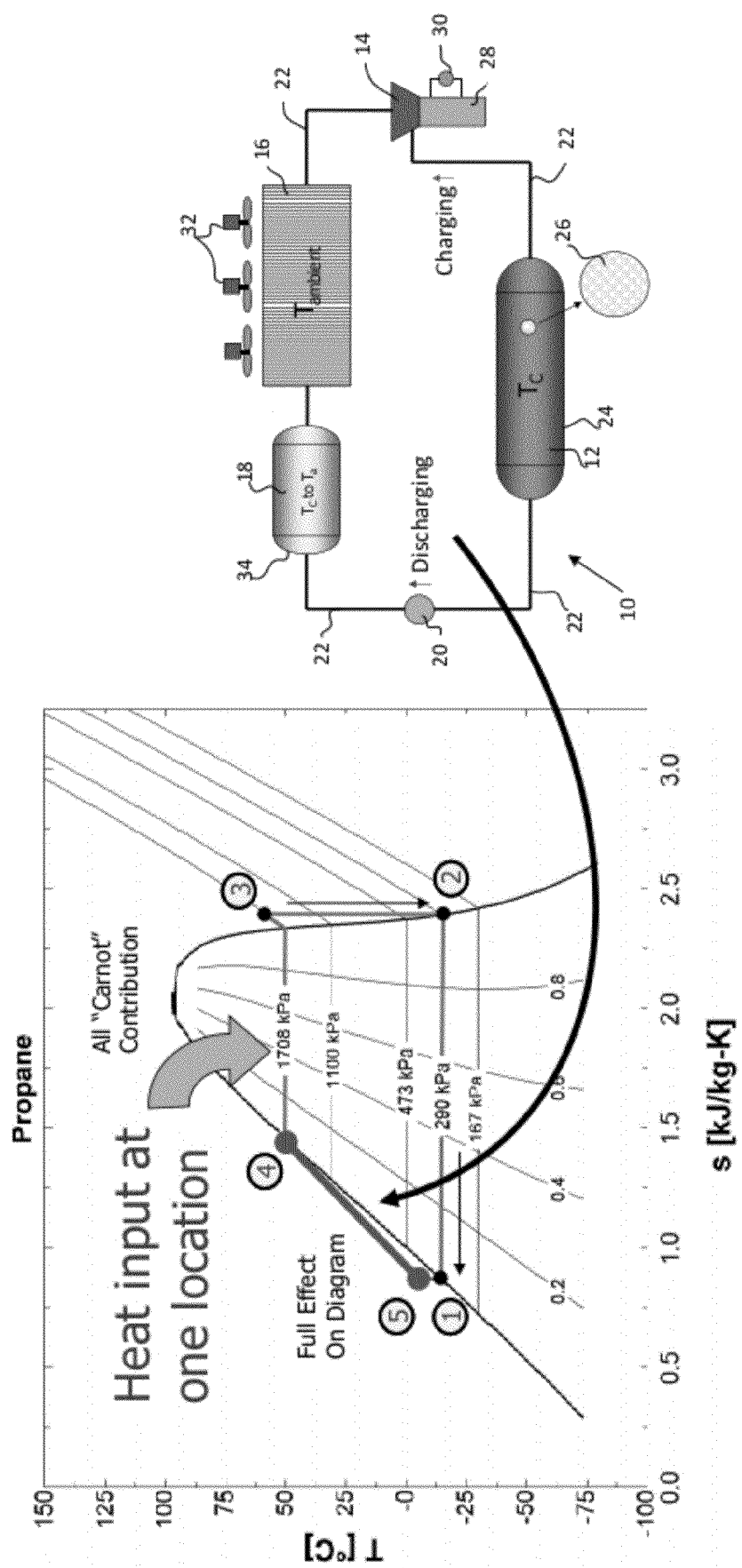
FIG. 9 is an illustration of an embodiment of the disclosed system demonstrating nearly full recovery of heat energy by incorporating sensible heat storage into the system.

FIGS. 8 and 9 depict a traditional Organic Rankine Cycle (ORC) implementation (FIG. 8), which comprises a feed pump 74, a condenser 75, a recuperator 76, a boiler 71, and an expander 73; and an example of the novel energy storage implementation disclosed herein (FIG. 9). To implement this internal-to-the-cycle thermal storage, a sensible heat storage device 34 (FIG. 9) is integrated into the system 10. A consequence of this innovation is to endow the system with the equivalent of a steady state, real time heat recuperation process as used in many organic Rankine cycles (FIG. 8), but it is implemented here as a "time shifted" thermal recuperation of heat since the storage effect is carried over from a charge cycle to a discharge cycle. The identification of the path on the T-s diagram of FIG. 9 where this effect takes place allows one of ordinary skill in the art to appreciate the efficiencies created by this innovative thermal storage approach.

As shown in FIG. 1, during charging the co-functional expander/compressor device operating as a compressor 14 can draw in the working fluid by creating a partial vacuum on the latent heat storage tank 24. The compressor can be coupled to a motor/generator 28 that is powered by electricity from the grid, powered by the output of a wind farm, or from any other suitable energy source. Between states 1-2, depicted in FIG. 6, the working fluid is vaporized as it passes through the latent heat storage device 12. The heat of vaporization can be transferred and stored in the solid phase of the latent heat storage material 26. Between states 2-3 (depicted in FIG. 6) the working fluid, now in gaseous or vapor state, is both heated and compressed through a substantially adiabatic process in the compressor 14. The compressor can be a positive displacement device such as a scroll compressor, or a dynamic compressor such as a radial centrifugal compressor or an axial flow compressor. Between states 3-4 (depicted in FIG. 6) the working fluid is delivered to the heat-exchanger 16. There, the working fluid can be cooled to an ambient temperature $T_a$ to condense the working fluid. As used herein, the abbreviations $T_{ambient}$ and $T_a$ mean the temperature of the ambient heat exchanger and can be used interchangeably herein. In this stage, heat can be rejected to the surroundings or can be transferred to a heat exchange medium for later use. Between states 4-5, the working fluid, now in a substantially liquid state, is delivered to the sensible heat storage device 18, wherein sensible heat is stored in the device 18. At this stage, the working fluid can be cooled to about the temperature of the cold storage tank, $T_C$. Between states 5-1, the working fluid can be passed through a motor/pump 20 to reduce the pressure of the working fluid from about a pressure equal to the pressure of the heat exchanger to about a pressure equal to the pressure within the latent heat storage tank 24. After exiting the motor/pump 20, the working fluid can be recirculated through the system, repeating the charging process and thereby continuously storing thermal energy in the solid phase of the latent heat storage material 26.

During discharge, the working fluid can flow in the reverse direction. Thus, as shown in FIG. 7, between states 5-4, the working fluid is heated in the sensible heat storage device by absorbing sensible heat stored during the charging cycle. The system can be operable to heat the working fluid to about the temperature of vaporization. Between states 4-3, the working fluid can be vaporized in the heat exchanger. The heat-exchange process is driven by a $\Delta T$, as previously defined. If desired, the difference in temperature can be further adjusted by a temperature-modulator device 32 or can be adjusted by reusing heat stored in a heat exchange medium during charging. As would be understood by one of ordinary skill in the art, the heat-exchanger device can be any known or hereafter developed heat exchanger, sized appropriately for the particular energy storage system. The heat-exchanger device can comprise parallel, cross or counter flow type heat exchangers. Structurally, exemplary heat-exchanger devices can comprise a shell or tube heat exchanger, a plate heat exchanger, or a regenerative type heat exchanger, wherein the heat-exchanger devices are appropriately sized for the demands of the particular energy storage system. As another example, the heat-exchanger device can comprise a cooling tower, wherein the difference between a wet-bulb temperature and a dry-bulb temperature can be exploited for charging and discharging with different temperatures used for the heat exchange process with the surroundings.

At the end of the process occurring between states 3-2, the working fluid, now a heated vapor, is delivered to the compressor/expander 14, operating as an expander, to produce work in the form of mechanical energy. The expander can be the compressor operated in reverse as can be the case with a scroll-based expander/compressor. As another example, turbomachinery can be used, wherein a compressor rotor is attached to an expander rotor on the same shaft with a motor/generator positioned in between. The mechanical energy of the expander can be converted to electrical energy by coupling the expander to a motor/generator 28 and electrically coupling the generator 28 to a power grid 30. Between states 2-1, the working fluid is delivered through the latent heat storage device, wherein heat of condensation is transferred to the latent heat storage material from the working fluid and the latent heat storage material melts. Finally, between states 1-5, the working fluid can be delivered through a pressurization and depressurization device, such as a motor/pump device, which pressurizes the working fluid to repeat the power cycle.

Figure 10:
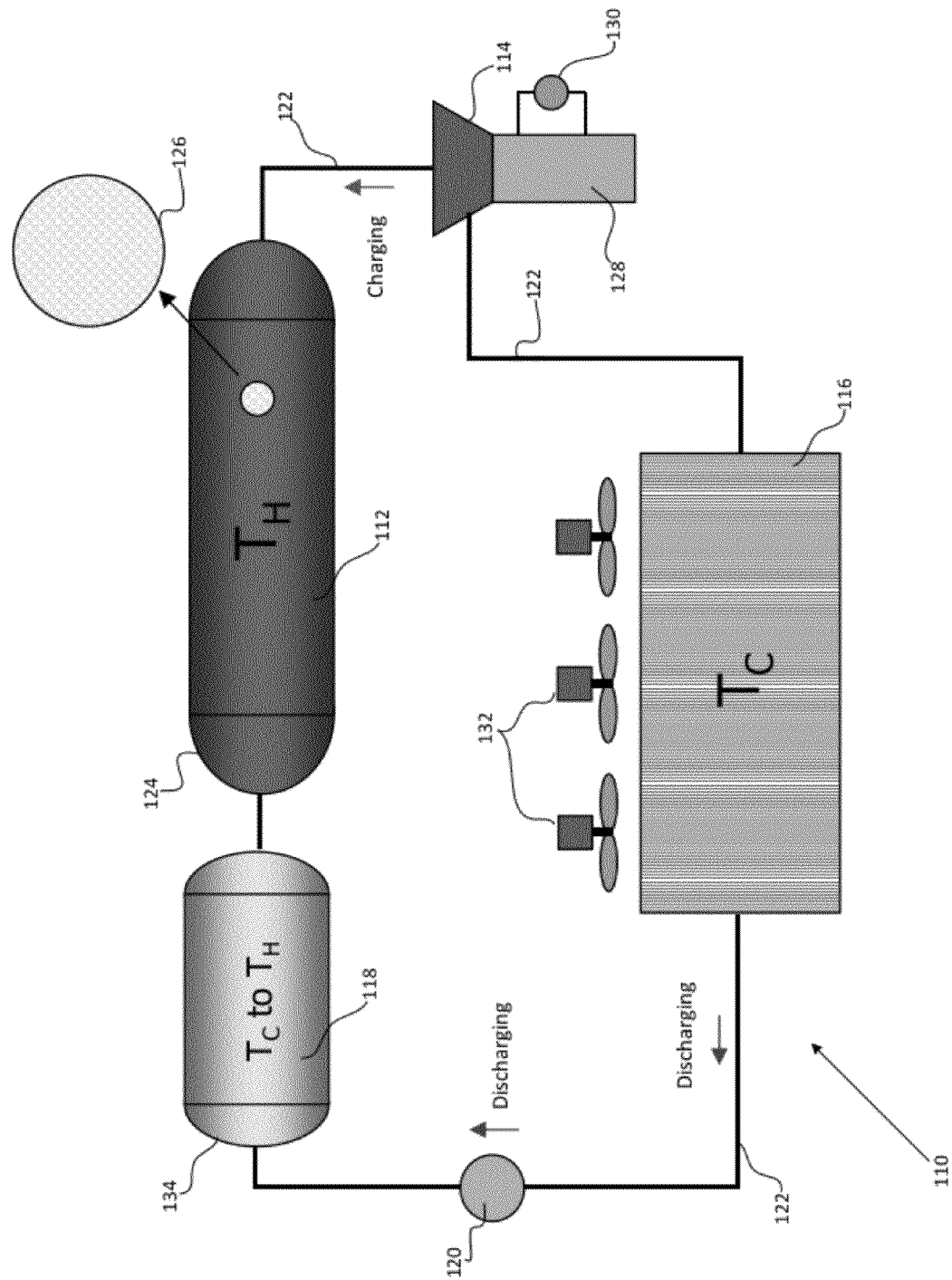
FIG. 10 is a schematic diagram of another embodiment of the system wherein latent heat is stored in a hot storage tank.

FIG. 10 illustrates another embodiment of a system for storing and providing energy. System 110 comprises a latent heat storage device 112, a sensible heat storage device 118, a pump/motor device 120, a heat-exchanger device 116 and a vapor expander/compressor 114 coupled to a motor/generator 128. In this embodiment, the system 110 can comprise a hot storage system. As used herein, the term "hot storage system" means that latent heat storage can occur at temperatures above ambient temperatures. The latent heat storage device 112 can comprise a hot storage tank 124 in which the working fluid's heat of condensation can be stored in the form of latent heat, such as at temperatures of from about 90° C. to about 150° C.

As will be apparent to one of ordinary skill in the art, many of the components of the hot storage system 110 can be the same or substantially the same as the components described in detail in relation to the cold storage system 10. The novel and unique arrangement of these components in the order depicted by the exemplary system in FIG. 10 enable the system to be operable as a hot storage system. Moreover, as will be apparent to one of ordinary skill in the art, certain elements of the exemplary systems described herein can comprise commercially or other readily available devices. For example, various types and sizes of heat-exchangers are available commercially, and particularly in the Heating Ventilation and Air-conditioning (HVAC) industry. Other suitable heat-exchangers can comprise cooling towers. Similarly, commercially available expander/compressors and motor/pumps are available in the engineering industries, and can be sized to handle a desired capacity and made suitable for use in many embodiments of the system. In cases where the heat-exchange device comprises a cooling tower operated as an evaporative condenser in the discharge cycle and as a simple evaporator in the charge cycle in the embodiment using hot storage, wet bulb conditions can be used for the discharge cycle and dry bulb conditions can be used for charging. This would provide a difference in temperature to enhance the overall performance of the storage system as measured by the round-trip efficiency. As used herein the term "round-trip efficiency" relates to the reversibility of the energy conversion and energy storage processes, wherein a higher "round-trip efficiency" implies higher reversibility of the processes disclosed herein.

Figure 11:
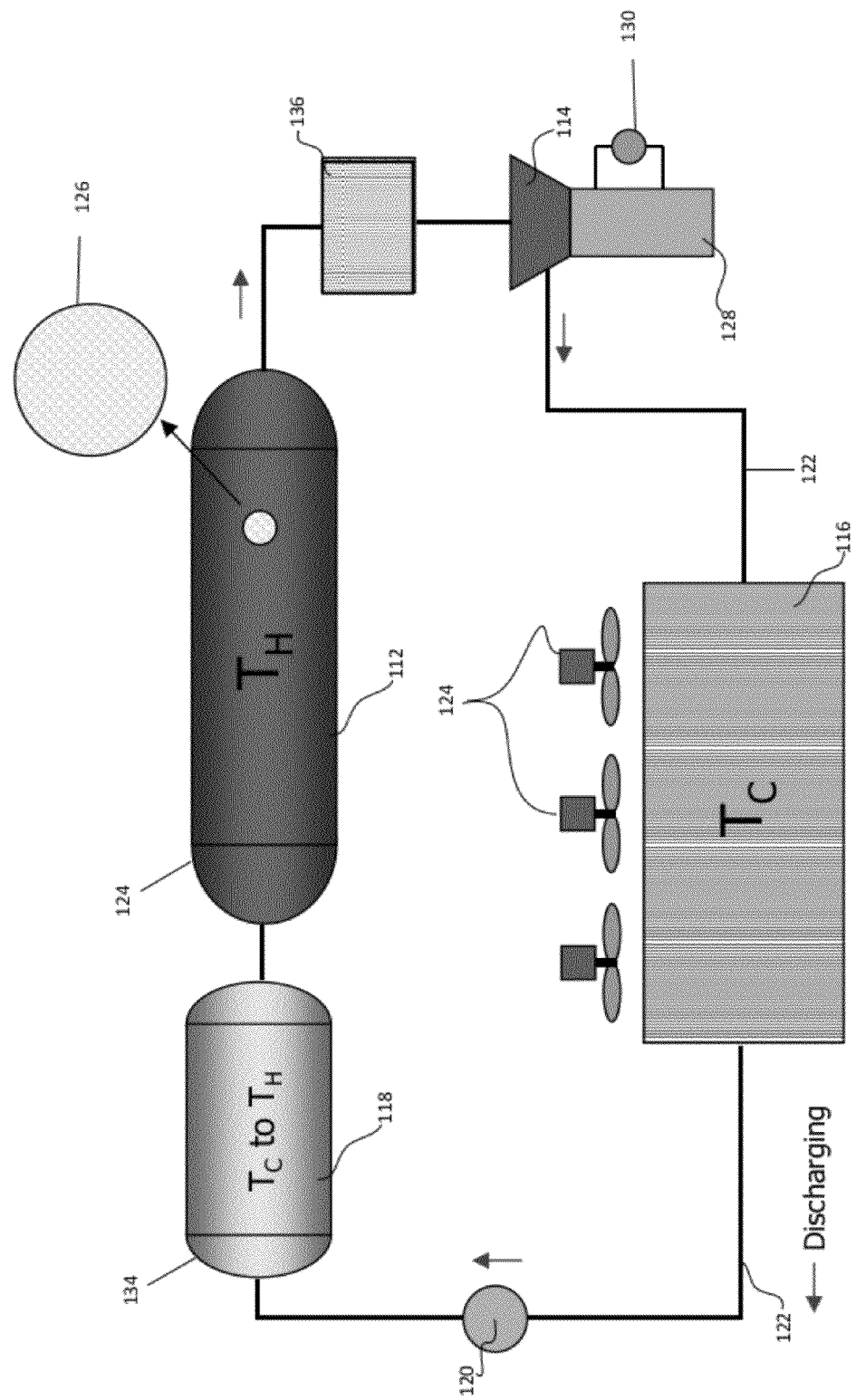
FIG. 11 is a schematic diagram of another embodiment of the system further comprising a heater.
Figure 12:
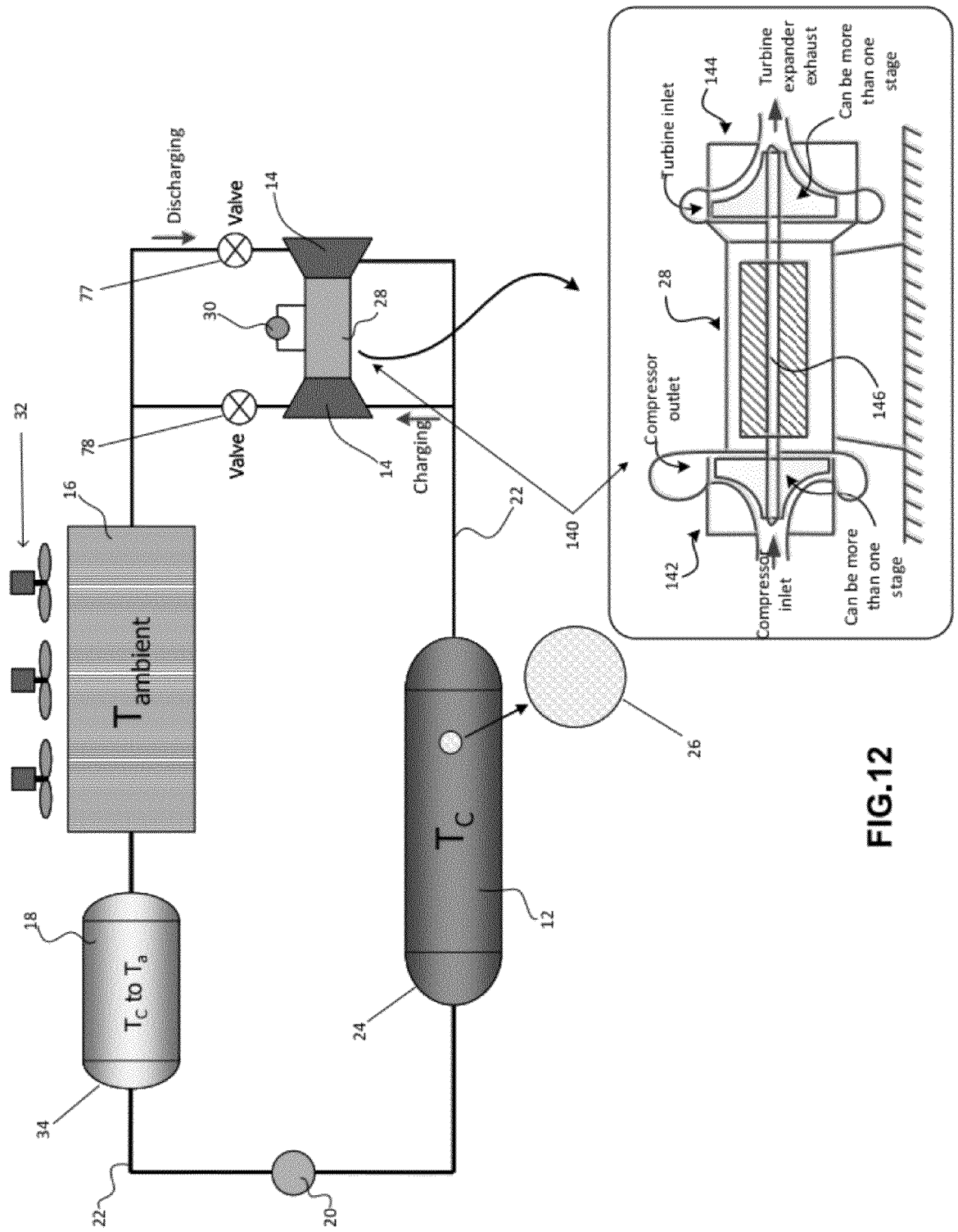
FIG. 12 is a schematic diagram of another embodiment of the system wherein another embodiment of the vapor expander/compressor device is provided.

Referring to FIG. 11, the system 110 can further comprise a heater 136, such as a combustor, a boiler, a furnace or other heater suitable for adding heat to the system. A person of ordinary skill in the art will appreciate that a heater also can be used with cold storage embodiments. The heater 136 can be a gas-fired boiler for heating the working fluid in the case that the stored latent heat is depleted prior to the next charging cycle. As illustrated in FIG. 12, but not limited to the embodiment depicted therein, compressor/expander can comprise multiple devices coupled in an effective arrangement to achieve the desired compression of the working fluid during charging, and expansion and power generation during discharging. As illustrated in FIG. 12, turbomachinery 140 can be used, wherein a compressor rotor 142 is attached to an expander rotor 144 on the same shaft 146 with a motor/ generator positioned in between 28. The mechanical energy of the expander can be converted to electrical energy by coupling the expander to a motor/generator 28 and electrically coupling the generator 28 to a power grid 30. The turbomachinery 140 may be fluidly coupled to the closed loop 22 via valves 78 and 77. This embodiment can provide a rapid changeover to generation (from the charging mode) to provide grid services such as hot spinning reserve capacity or provide rapid emergency power to a corporate enterprise sited system.

In FIGS. 1, 10, and 12, co-functional units are shown as operating the expansion and compression functions of the discharge and charge cycles, respectively. It would be apparent by one of ordinary skill in the art that co-functional components could be replaced by two or more dedicated single function components without changing the intent of the innovations disclosed. Furthermore, components required to implement the system could be one large component as shown in exemplary embodiments or could be a plurality of similar or identical smaller components that cumulatively implement the function of the large single component. Thus, in FIG. 12, the turbo machinery device used to expand and compress the working fluid could be separated into a dedicated turbocompressor driven by a dedicated motor and a turboexpander driving a dedicated generator where each of the dedicated motor and generator devices are electrically coupled to the power grid. Furthermore, a plurality of separate expander and compressor devices with their dedicated generator and motor devices, respectively, could be used for implementing the energy storage function. The disclosed embodiments shown in the figures are not meant to be limiting in this respect.

Figure 13:
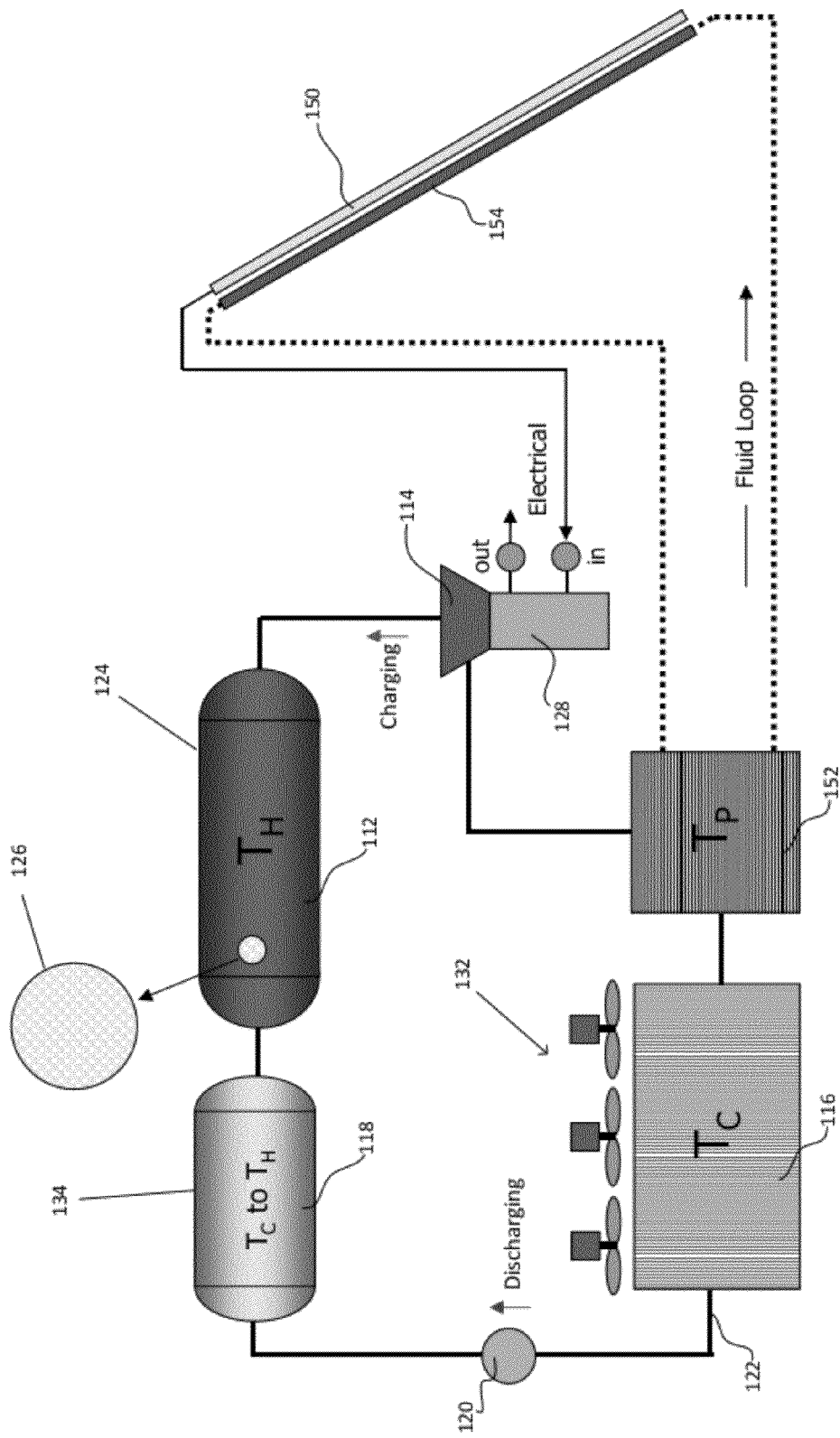
FIG. 13 is a schematic diagram of another embodiment of the system connected to photovoltaic (PV) electrical power source.

As an illustrative example, propane can be used as the working fluid in an embodiment of a cold storage system. Propane, which at 1 standard atmosphere has a boiling temperature of about −42° C., facilitates operation of the system at an ambient temperature of about 35° C. and a saturation pressure of about 1,218 kPa. In this example, cold storage can be affected in the solid phase of ethylene glycol, which has a heat of fusion of 160 kJ/kg at approximately −13° C. Thus, cold storage can occur in a latent heat storage device maintained within a range of −13° C. to about −15° C. and where the vapor pressure of the propane working fluid would be about 292 kPA. Furthermore, only about 12 m$^3$ of ethylene glycol would be needed for every 100 kW-hrs of stored electrical energy, or about 120 m$^3$ for every 1 MW-hrs of electricity stored. For an ideal system, assuming a pressure ratio of 4.18, a driving ΔT of 0° C. in the heat exchangers, and 100% efficiency of the various components, the round-trip efficiency can be about 96%, where about 5.92 kW-hr of heat is used per kW-hr of electricity generated, and about 5.88 kW-hr of heat is stored per kW-hr of electricity As another illustrative example, and referring to FIG. 13, the system can be connected to a photovoltaic (PV) array 150. In the hot storage system illustrated in FIG. 13, hexane can be used as the working fluid. This working fluid has a saturation temperature of about 69° C. at one standard atmosphere. At a potential hot storage temperature of 125° C. in the latent heat storage tank, the saturation pressure would be about 436 kPa. For exchanging thermal energy with the surroundings, boiling and condensation can take place in an ambient temperature heat exchanger 116 and/or a counterflow heat exchanger 152. In this configuration, the system can draw electrical energy from the array 150, which can convert approximately 20% of the solar irradiance to electrical power. The solar irradiance not converted appears in the form of low-grade heat and can be captured by a suitably modified panel 154 operable to capture this low-grade thermal energy. The latent heat store can operate at an elevated temperature of from about 90° C. to about 150° C. using a suitably chosen latent heat material. Using hexane or another working fluid having suitable-vapor pressure characteristics in this temperature range such that condensation takes place without excessively high pressure, the system can then store the heat of condensation from the working fluid in a latent form. In this approach, two types of heat exchangers can be utilized. A counterflow heat exchanger 152 can be used to vaporize the fluid at a temperature higher than ambient conditions during the charging phase, and an ambient temperature heat exchanger 116 can be used for exchanging thermal energy with the surroundings for condensing the working fluid during the discharging phase. This is an exemplary case of using different temperatures during charging and discharging of the energy storage system for purposes of increasing the round-trip efficiency. In this exemplary case, a liquid at temperatures higher than the temperature of the heat exchanger 116 can be used in the counterflow heat exchanger 152 and ambient air can be used in the heat exchanger 116. As will be apparent to one of ordinary skill in the art, the arrangement of heat exchanger components can be different than shown in FIG. 13.

Figure 14:
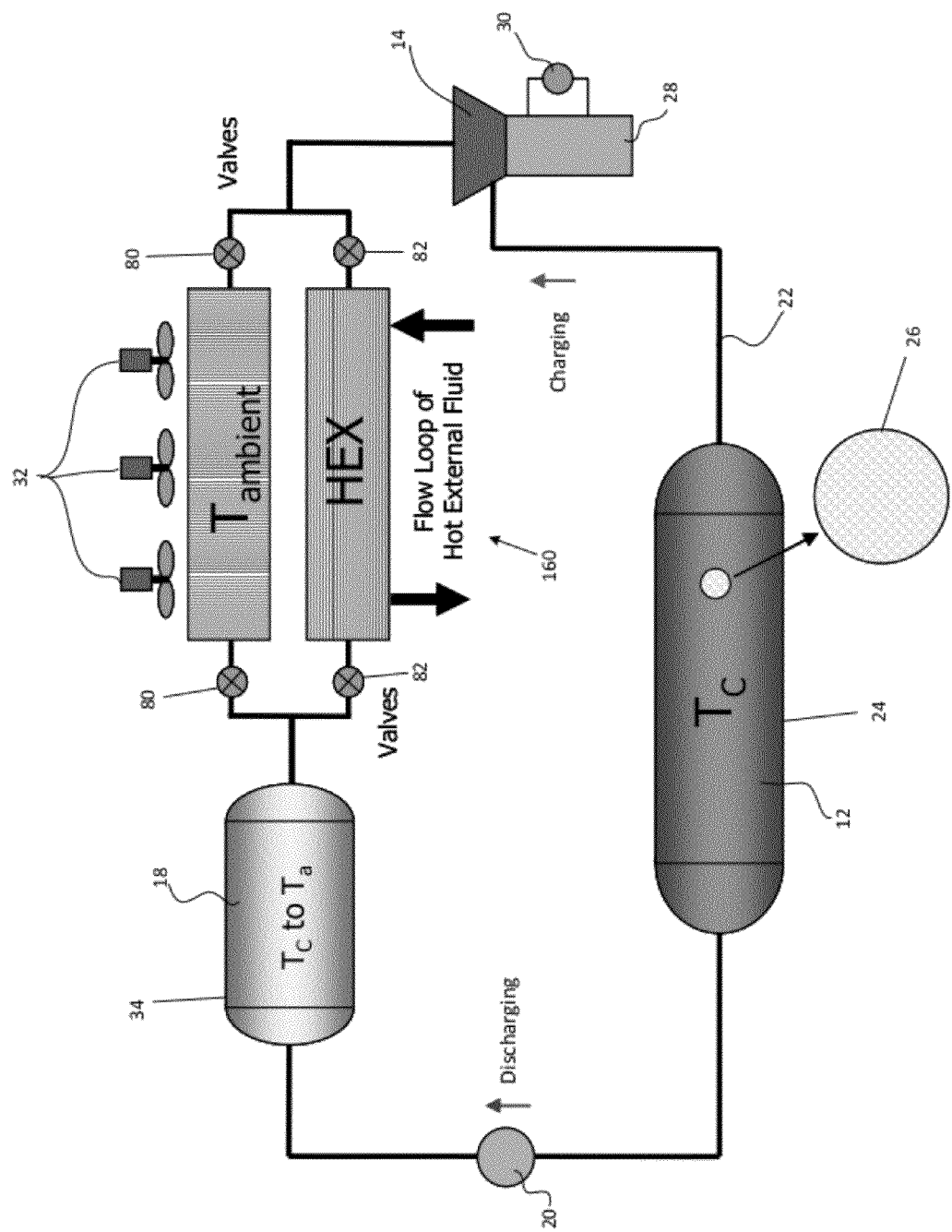
FIG. 14 is a schematic diagram of another embodiment of the system further comprising a waste-heat recovery device.
Figure 15:
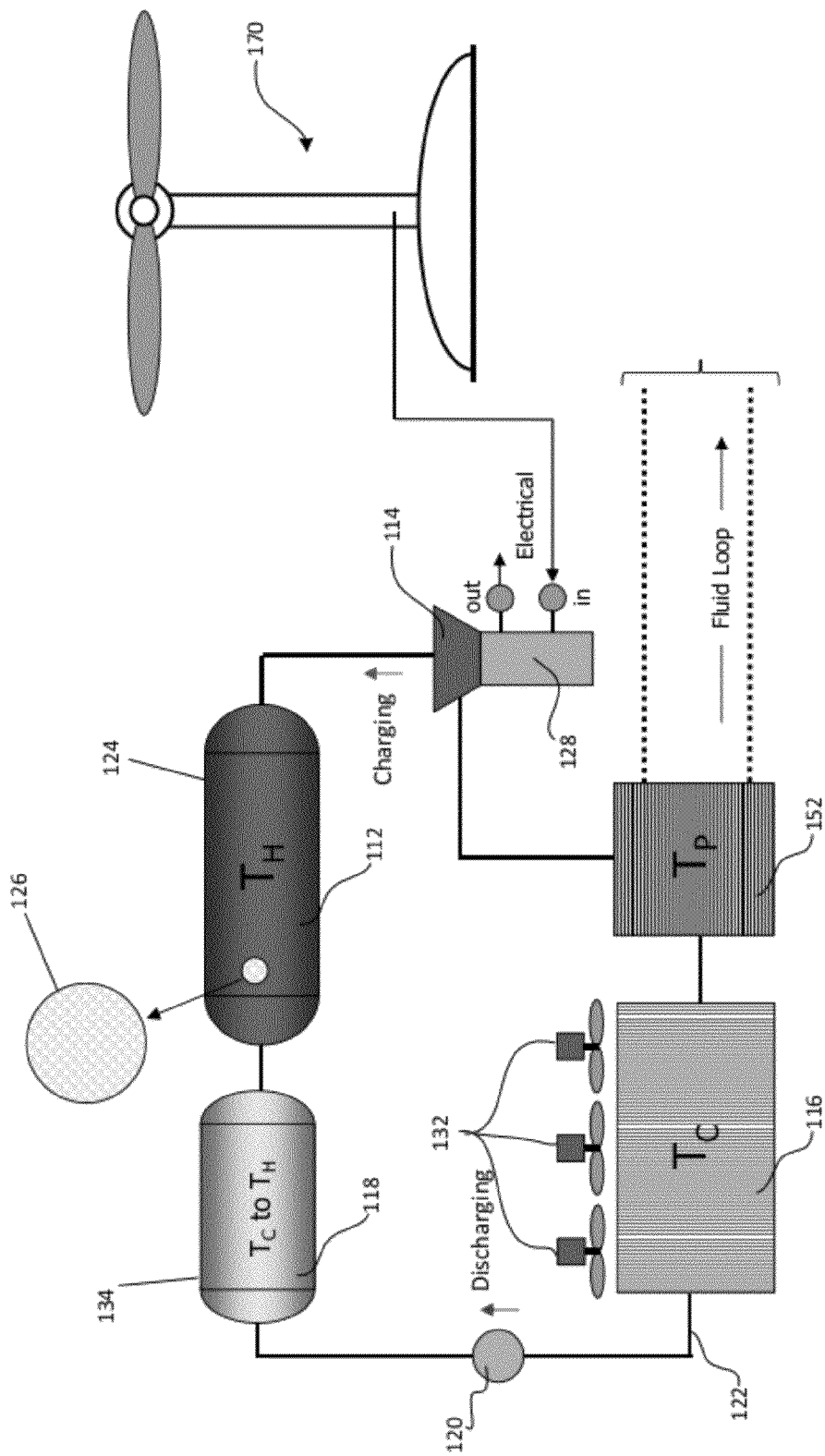
FIG. 15 is a schematic diagram of another embodiment of the system comprising a wind turbine for a power source and another embodiment of a waste-heat recovery device.
Figure 16:
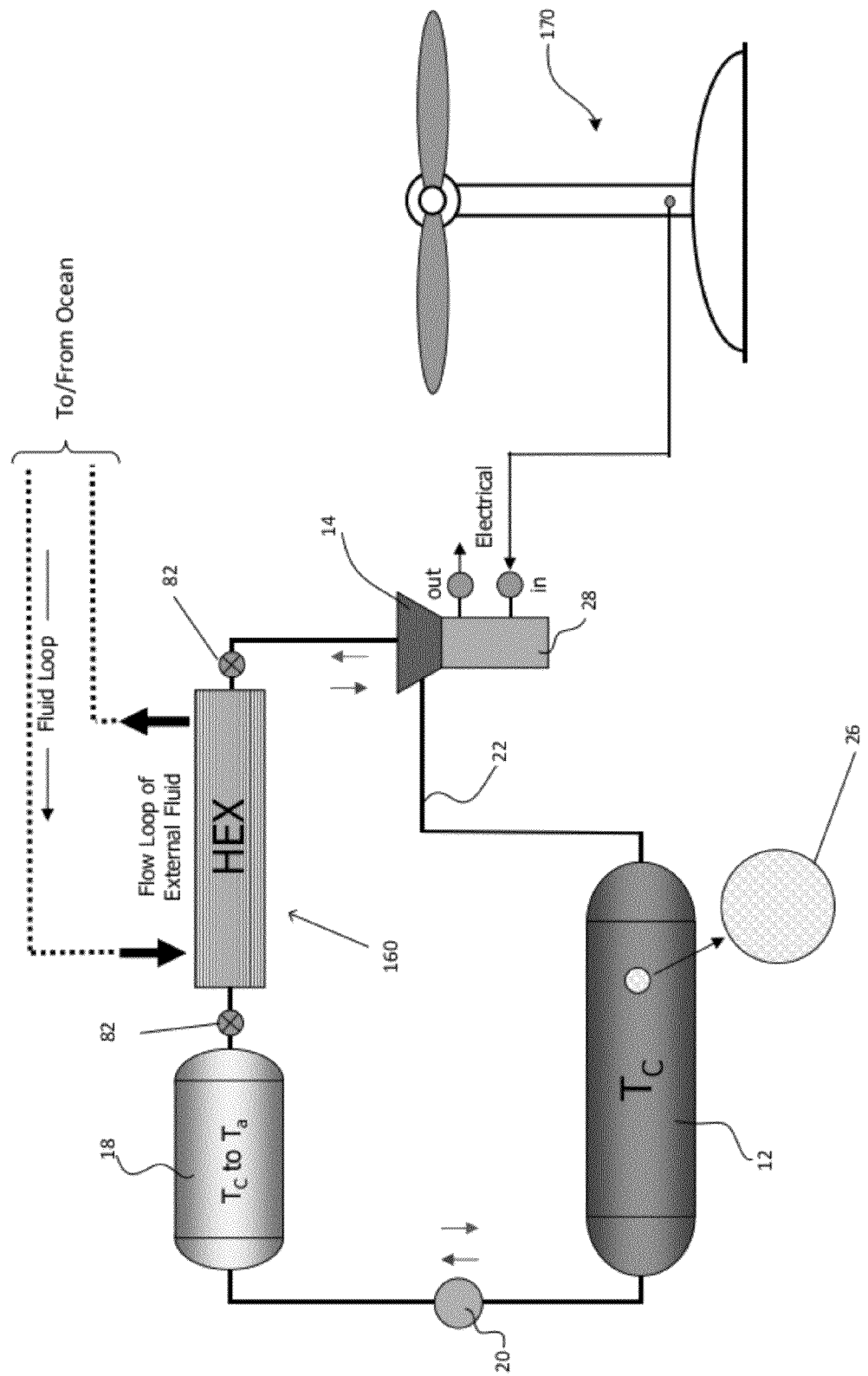
FIG. 16 is a schematic diagram of another embodiment of the system comprising an ocean thermal energy storage system.

Referring to FIG. 14, the cold storage system can comprise a waste-heat recovery device 160 to increase the temperature difference during the discharging cycle, which further increases round-trip efficiency of the system. The waste-heat recovery device 160 is fluidly coupled with the system via valves 80 and 82. As illustrated in FIGS. 15 and 16, temperature differences found naturally in the environment or resulting from waste-heat generated by various industrial processes, can be captured and utilized whether the system stores energy in a latent form at higher than ambient temperatures, or lower than ambient temperatures. Low-grade heat from geothermal, solar, combustion or industrial processes can be utilized by implementing an additional fluid loop, or multiple fluid loops, effectively arranged to lower or raise the temperature of the waste-heat recovery device 160 shown in FIG. 14, or the heat exchanger 152 shown in FIG. 15. As illustrated in FIG. 16, the system can utilize temperature differences found naturally in the ocean to increase the round-trip efficiency of the system. For example, an exemplary case would have the water temperature from the bottom depths of the ocean for charging at about 4° C. Warm water for the discharging cycle would come from the surface temperature at about 24° C. Water at these temperatures would alternately flow into the heat exchanger 160 of FIG. 16 during the charge cycle (cold water flow) and discharge cycle (warm water flow).

A similar approach can use the temperature difference generated by solar salt ponds. Also, as illustrated in FIGS. 15 and 16, the system can be coupled to a wind turbine 170 as a power source for driving the compressor. As would be apparent to one of ordinary skill in the art, any suitable power source to drive the compressor during charging, as well as any suitable method for creating a temperature for discharging that is different than the temperature for charging in terms of mediating the exchange of thermal energy with the surroundings can be used in combination or interchangeably enabling the system to be operable as disclosed herein.

Figure 17:
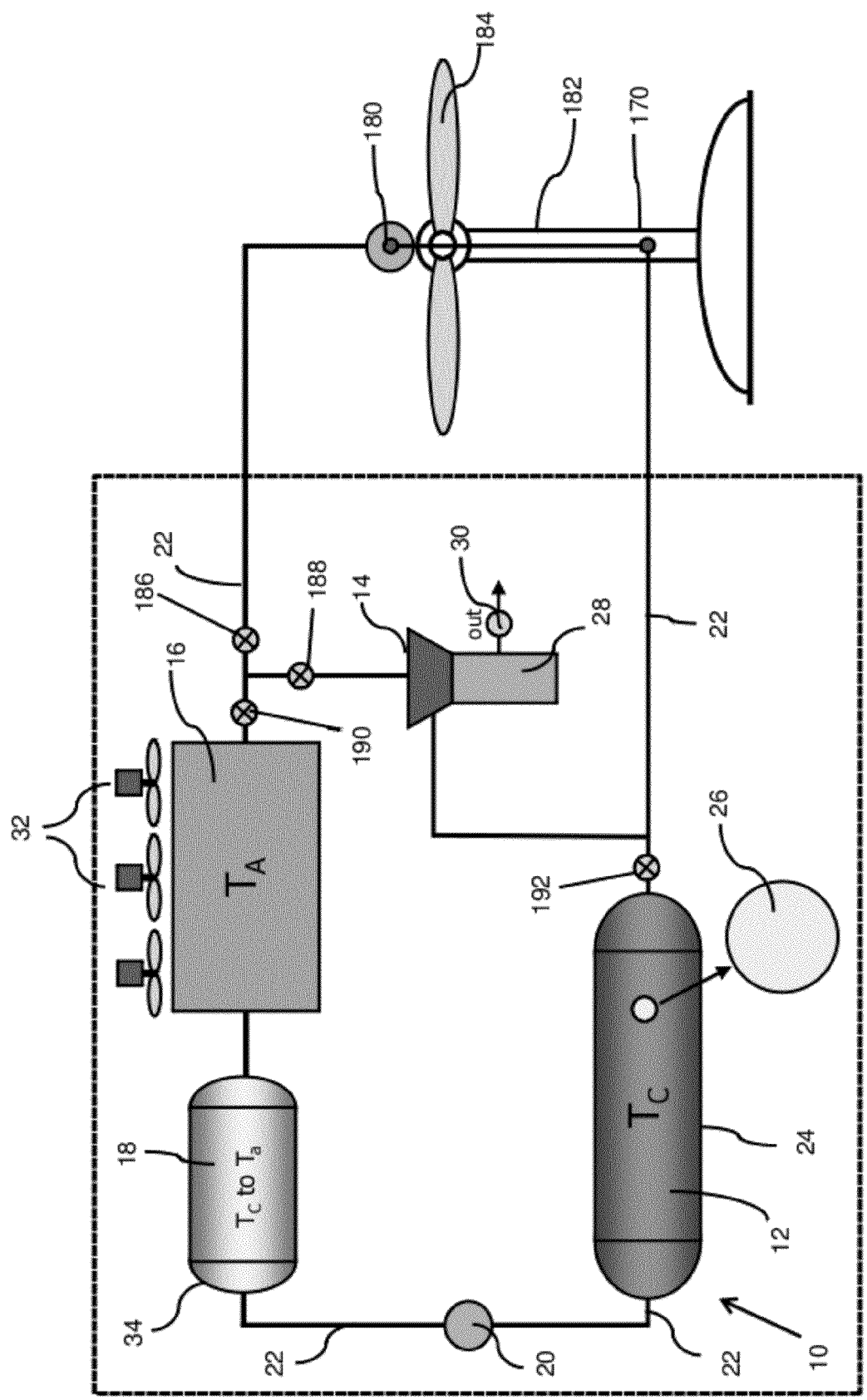
FIG. 17 is a schematic diagram of an embodiment where a power generating unit, such as a wind turbine, and a compressor are located at a position potentially remote from remaining components of the system.

FIG. 17 illustrates yet another embodiment of the present invention where a power generating unit, such as a wind turbine, and a compressor, are located at a position potentially remote from the rest of the system. The system illustrated in FIG. 17 shares many of the same components as with the embodiments discussed above, and such components are identified by the same reference numbers. While disclosed embodiments contemplate using a unitary expander/compressor device, the present disclosure also contemplates using a separate expander device and compressor device. The embodiment illustrated in FIG. 17 separates the two components into an expander 14 and a compressor 180 that is operatively associated with a power source. FIG. 17 illustrates using a wind turbine 170 as a power source for driving compressor 180. A person of ordinary skill in the art will appreciate that suitable power sources are not limited to the illustrated wind turbine 170, as discussed in more detail below.

The system 10 of FIG. 17 decouples the expander 14/motor generator 28 from the compressor 180, which allows the compressor 180 to be located where power is being generated. Thus, power generated by a power generating unit, such as by wind turbine 170, potentially at a location remote from the remaining components of system 10, can be stored using heat storage material. This provides several advantages. First, current wind turbines include relatively large gear boxes and generators on top of the support column 182. As a result, the support 182 must be sufficiently robust to support these components. The embodiment illustrated in FIG. 17 directly couples the turbine blade 184 to compressor 180, which substantially simplifies the structure of the wind turbine relative to known devices.

Currently known wind turbine power generators are not capable of dispatching energy on demand. The embodiment of FIG. 17 also provides a second important advantage by storing energy produced by wind turbine 170. For example, the compressor 180 can be effectively coupled to cold storage unit 24. In this embodiment, wind turbine 180 would include a refrigerant vapor supply conduit and a compressed vapor return conduit (conduits not shown) within wind turbine support 182. This allows storage of the power generated by the wind turbine to be stored by the system 10. The expander 14/generator 28 therefore can be used to dispatch stored power, such as to the grid 30, when needed, and not only when the turbine blades are rotating.

FIG. 17 also includes additional valving relative to other disclosed embodiments. This allows at least three different functions to be performed by the system 10. For example, if generated power is needed immediately, compressor 180 compresses working fluid vapor, which remains in the closed loop 22 and does not enter into any heat transfer components. This allows the compressor 180 located at the top of the wind turbine support 182 to compress working fluid vapor rising within a conduit located in support 182, and drive compressed fluid back to the expander 14. The working fluid expands in expander 14 to drive a generator. Low pressure working fluid is then returned directly to wind power turbine 170. Thus, in this process, valves 186 and 188 would be open, and valves 190 and 192 would be closed.

A second charging function also can be implemented using the embodiment of FIG. 17. The charging function is implemented by isolating the expander 14/generator 28 by appropriately opening and closing valves 186, 188, 190 and 192. In this embodiment, the function performed by system 10 of FIG. 17 is the same as the charging cycle described above.

System 10 of FIG. 17 also can perform a discharging function. In this function, compressor 180 is isolated by appropriate opening and closing valves 186, 188, 190 and 192. In this process, stored energy drives expander 14 as discussed above with respect to the discharge cycle. A person of ordinary skill in the art will appreciate that additional arrangement of valves 186, 188, 190 and 192 can be used to achieve these same functions.

While FIG. 17 illustrates using wind turbine 170, remotely situated from the remaining components of system 10, a person of ordinary skill in the art will appreciate that other power sources also could be used. For example, power might be generated by wave power. Any wave generating system now known, or hereafter developed, can be used in the embodiment illustrated in FIG. 17 by replacing wind turbine 170 with a wave power station. Three exemplary wave power embodiments are illustrated in FIGS. 18-20.

Figure 18:
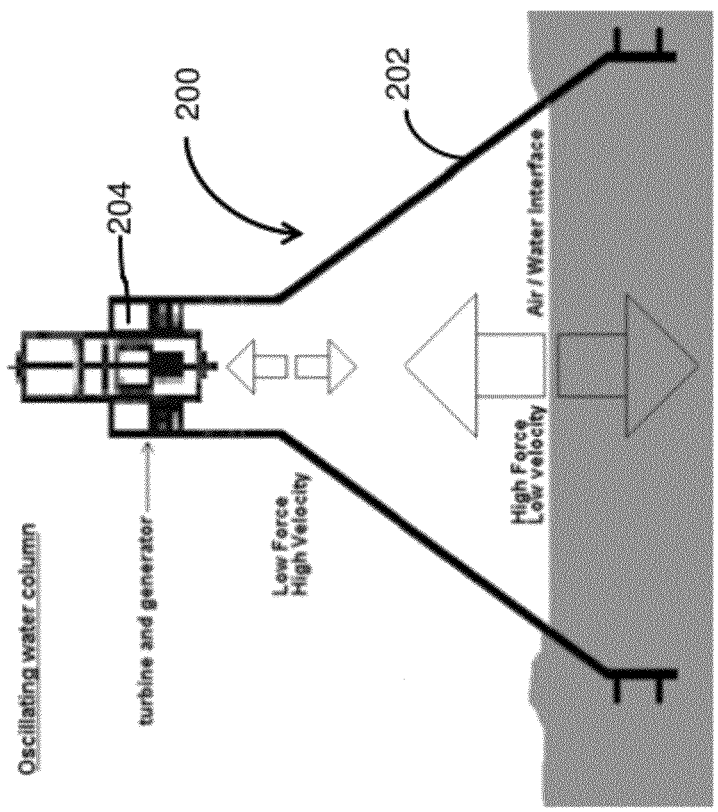
FIG. 18 illustrates a prior art wave power generator comprising an oscillating water column that can be used for power generation in combination with the system of FIG. 17. "How Hydrokinetic Energy Works," at http://www.ucsusa.org/clean_energy/technology_and_impacts/energy_technologies/how-hydrokinetic-energy-works.html.

FIG. 18 illustrates a first oscillating water column embodiment 200. System 200 includes a support structure 202 that supports and houses a turbine and generator 204. A water column oscillating within the support structure 202 drives the turbine and generator 204. Power output from the system 200 replaces output from the wind turbine 170 of FIG. 17.

Figure 19:
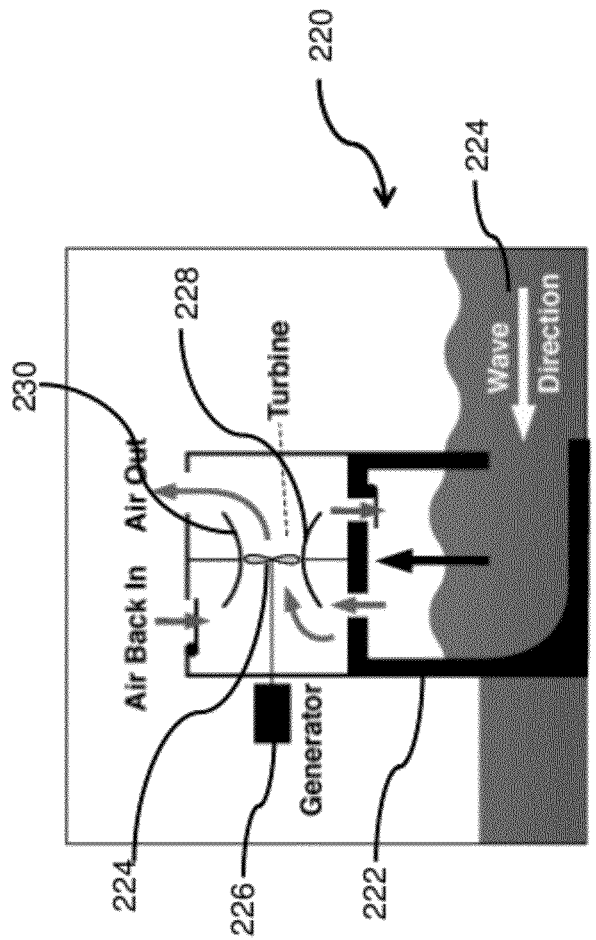
FIG. 19 illustrates a second exemplary embodiment of a prior art wave power system that can be used for power generation in combination with the system of FIG. 17. "Capturing the Energy in Ocean Waves," from Energy Futures, MIT Energy Initiative, pp. 16-17, Autumn 2008.

FIG. 19 illustrates a second exemplary embodiment of a wave power system 220. In this system, a support structure 222 receives incoming water in the wave direction 224. Water rising in support structure 222 again compresses air which drives the turbine blade 224 to drive generator 226. Baffles 228 and 230 can be included to direct air and water flow within support structure 222. Power output from the system 220 replaces output from the wind turbine 170 of FIG. 17.

Figure 20:
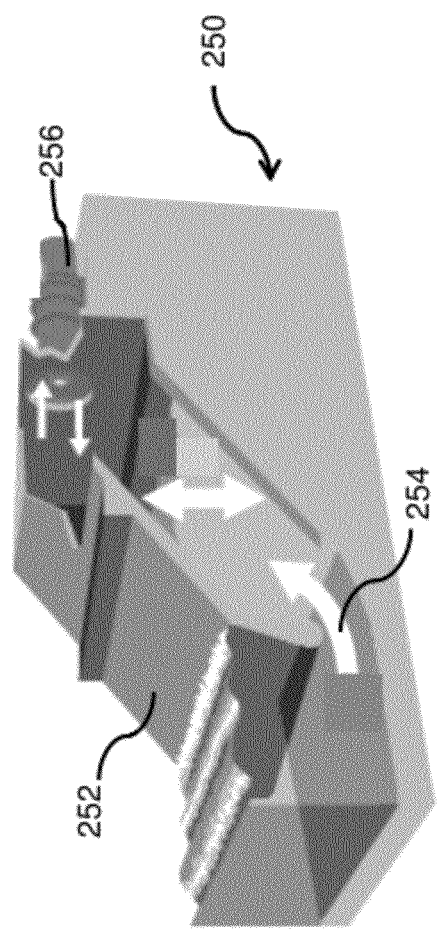
FIG. 20 illustrates a third exemplary embodiment of a prior art wave power system 250 comprising a wave capture chamber that produces an oscillating water column for power generation in combination with the system of FIG. 17.

FIG. 20 illustrates a third exemplary embodiment of a wave power system 250. System 250 includes a wave capture chamber 252. Wave power forces water into the wave capture chamber 252 in water flow direction 254. Air within the system is alternately compressed and decompressed by an oscillating water column within chamber 252. Alternating air compression and decompression produces air currents that drive a turbine 256, such as a Wells Turbine. Power output from the system 200 replaces output from the wind turbine 170 of FIG. 17.

Figure 21:
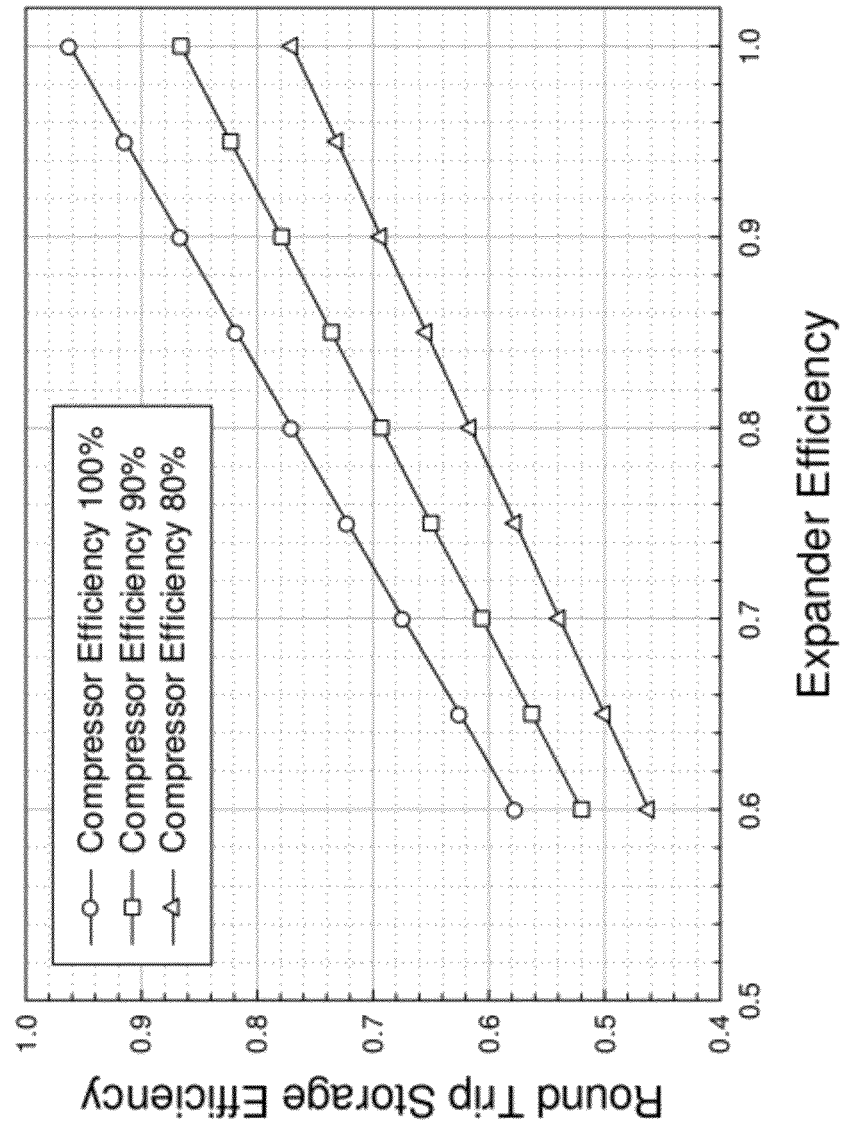
FIG. 21 is a graph of vapor expander efficiency (x-axis) versus round-trip storage efficiency of the system (y-axis).
Figure 23:
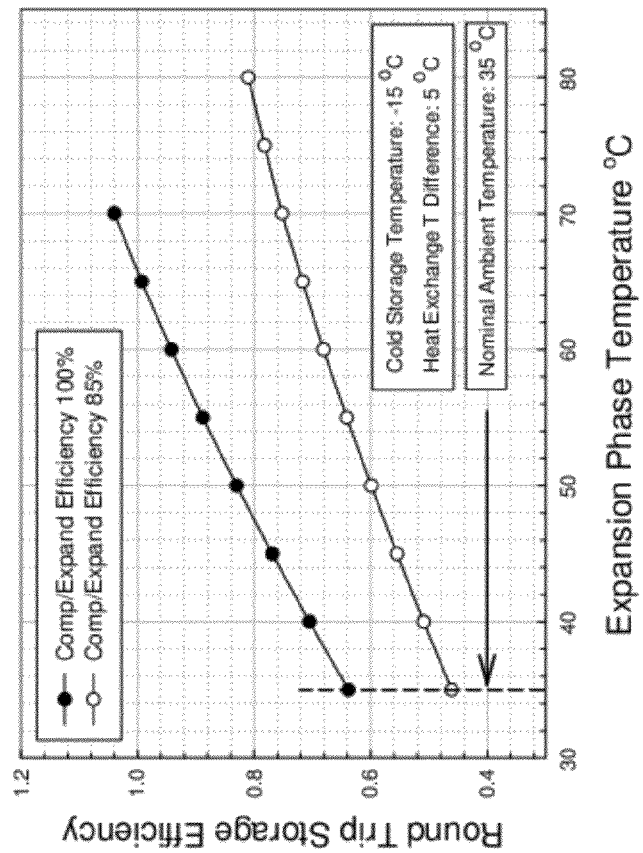
FIG. 23 is a graph of the round-trip storage efficiency of the system (y-axis) versus the expansion cycle phase temperature difference (x-axis, units of ° C.).
Figure 22:
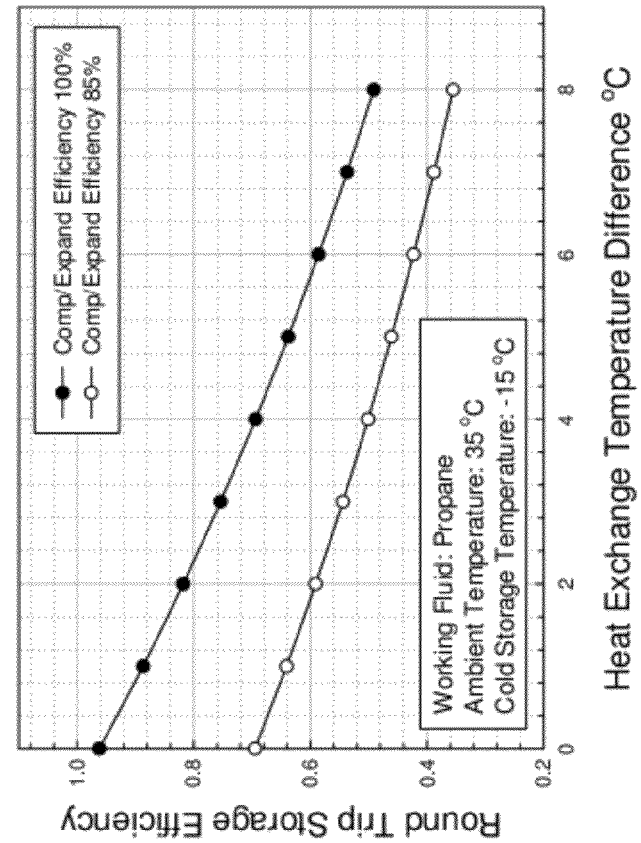
FIG. 22 is a graph of round-trip storage efficiency of the system (y-axis) versus the heat exchange temperature difference in the heat transfer processes (x-axis, units of ° C.).

Referring to FIG. 21, the effect on the round-trip efficiency of decreasing expander and compressor efficiencies is graphically illustrated for a cold storage system. Referring to FIG. 22, the effects of a driving ΔT in the heat transfer components is graphically illustrated. FIG. 23 demonstrates an increase in the round-trip efficiency resulting from using the temperature difference approach between charging and discharging for a cold storage system. As demonstrated by FIG. 23, an increased roundtrip efficiency can be achieved by using a small temperature difference between the working fluid and the ambient during the charging cycle and a greater temperature difference between the working fluid and a source of low-grade waste heat during the discharging cycle.

Figure 24:
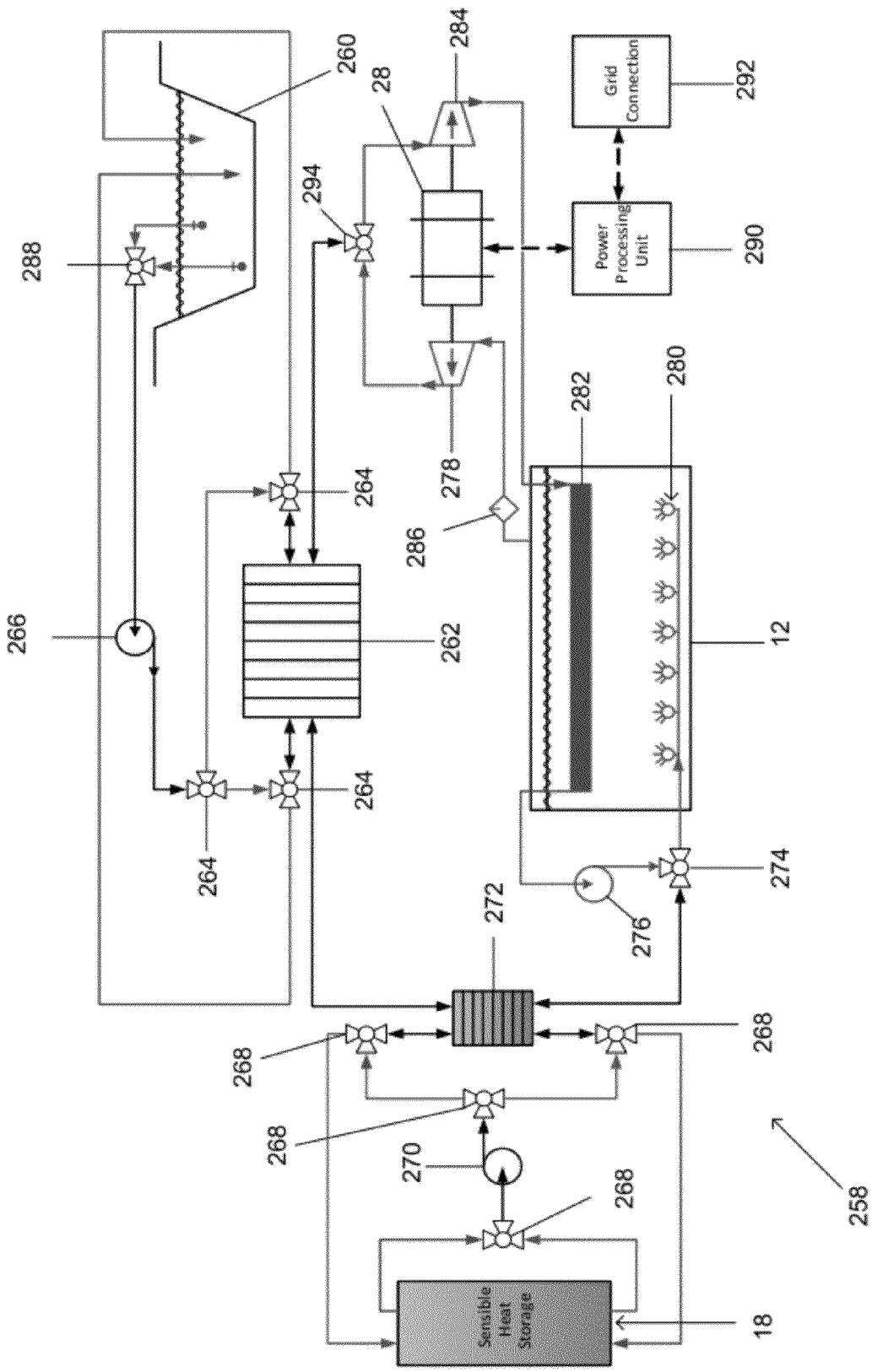
FIG. 24 is a schematic diagram that illustrates a particular embodiment of the disclosed systems for energy storage wherein a thermal pond is used as an external heat source and an acceptor of heat rejection and further comprising both a sensible heat storage unit and a latent heat storage unit comprising direct injection sprayers and an extruded aluminum condenser.

Alternative embodiments of energy storage systems are also disclosed. FIG. 24 is a schematic of a particular energy storage system implemented with a thermal pond 260, in the form of a solar salt gradient pond, for the source of heat, which is taken from the bottom layers of the pond 260 using a valve 288, and for heat rejection, which is directed to the top layer of the pond 260. Water is circulated between the pond and the co-functional boiler/condenser device 262. Valves 264 and a pump 266 are used to direct the water flow in a direction counter to the working fluid flow in device 262 of the cycle. The sensible heat storage unit 18 is implemented with a single thermocline tank with valves 268 and a pump 270 to direct the sensible heat fluid to another counterflow heat exchanger device 272. This embodiment uses a sensible heat storage approach different than that shown in FIG. 2. Sensible heat storage in this embodiment is comprised of a secondary fluid loop separate from the working fluid in the cycle. The fluid in the secondary loop is a single phase fluid preferably water or an aqueous based solution comprising water and another substance to prevent freezing of the secondary fluid. The counterflow heat exchanger 272 is used to mediate the exchange of sensible heat to and from the working fluid as the secondary fluid flows counter to the working fluid in device 272.

The storage of sensible heat in sensible heat storage unit 18 is a stratified thermocline where the warmer fluid resides at the top and cooler fluid resides at the bottom. Filler material or internal structure may also be included in unit 18 to stabilize the thermocline. The latent heat storage device 12 is shown with a direct contact injection heat exchanger 280 for working fluid vaporization during the charge cycle, and a set of extruded aluminum channel arrays 282 for heat exchange to condense the working fluid during the discharge part of the cycle. Finally, in this particular embodiment, a turbo compressor (278)/expander (284) unit arranged on a single shaft with a combination motor/generator 28, positioned between the expander/compressor, which is used to compress the working fluid during the charge cycle and expand the working fluid during the discharge cycle. Other components of this particular disclosed embodiment include a dryer 286, a power processing unit 290, a grid connection 292, additional valves 274 and 294, and an additional pump 276. The alternate embodiment shown in FIG. 24 demonstrates to one of ordinary skill in the art that alternatives to implementing the energy storage system exits. However, the innovations are evident where sensible heat is stored and released within the cycle at the appropriate times to increase roundtrip efficiency, latent heat storage is used to store the bulk of the energy from the grid, and a differential temperature approach from the surroundings (in the case of FIG. 24 it is a thermal pond) is used to further boost roundtrip efficiency. Thermal storage of electrical energy enables a wide range of applications and integrating strategies into current power generating infrastructure (e.g. steam based power plants) and at industrial sites. By using a cold storage approach, the energy storage concept disclosed can "reach down" the temperature scale and utilize low grade thermal energy, which has historically been considered a non-viable resource. The significance of this should not be lost; with this energy storage approach it is now feasible to use the reject heat from steam power plants to run energy storage thus opening up new opportunities in the energy storage market sector. Other sources of low-grade heat are now equally valuable with the innovations disclosed here.

Figure 25:
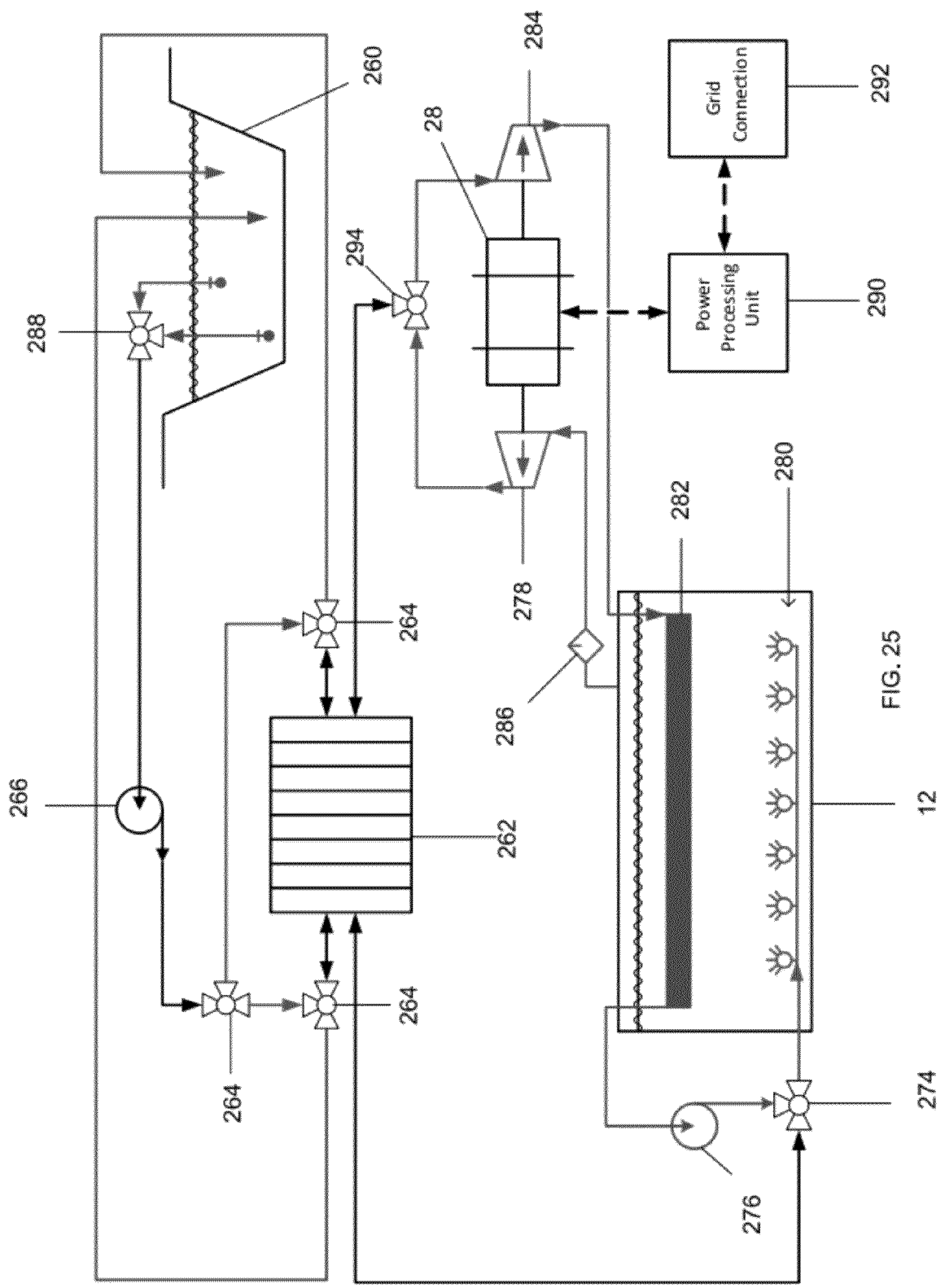
FIG. 25 is a schematic diagram illustrating a particular embodiment of the disclosed systems for energy storage comprising only a latent heat storage unit and not a sensible heat storage unit.

A similar embodiment is illustrated in FIG. 25. However, the embodiment illustrated by FIG. 25 does not comprise a sensible heat storage unit 18. In cases where the differential temperature approach from the surroundings is large enough, the sensible heat storage within the cycle may be eliminated yet the overall system roundtrip efficiency remains high enough to be practical.

Figure 26:
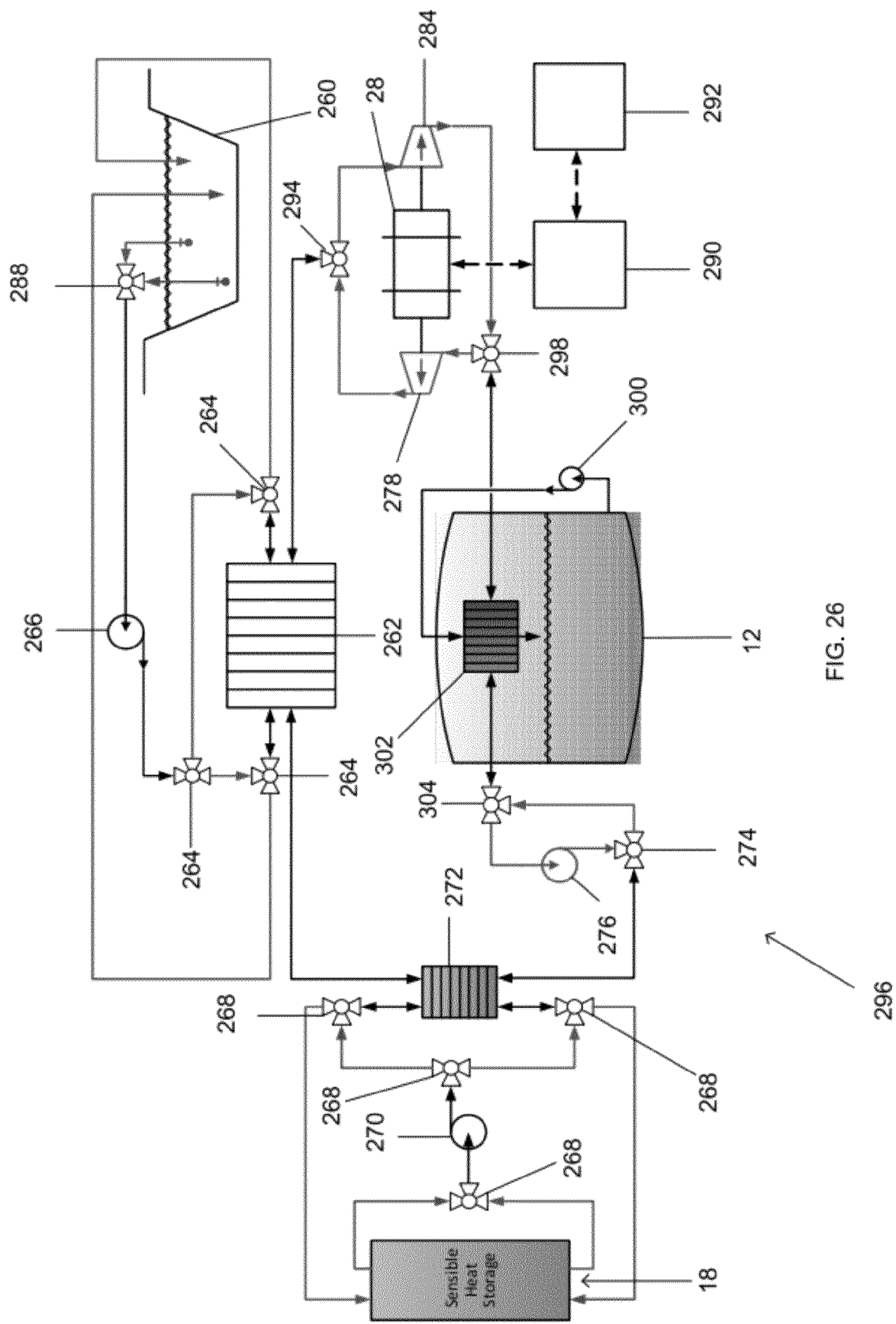
FIG. 26 is a schematic diagram illustrating a particular embodiment of the disclosed systems for energy storage wherein both a sensible heat storage unit and a latent heat storage unit comprising a super cooler/condenser are used.

FIG. 26 shows another embodiment of the disclosed systems. With reference to FIG. 26, water is circulated between the pond 260 and the co-functional boiler/condenser unit 262. Valves 264 and a pump 266 direct the water flow in the direction counter to the working fluid flow in the cycle. The sensible heat storage unit 18 is implemented into system 296 with valves 268 and a pump 270 to direct the sensible heat fluid to another counterflow heat exchanger device 272. The latent heat storage tank 12 is shown with a heat exchanger device 302 that can supercool the liquid (below the freezing point) circulating through it as the working fluid of the cycle evaporates in separate channels. The same heat exchanger 302 is used to condense the working fluid during the discharge part of the cycle. A pump 300 is used to continuously circulate the liquid from the bottom of the latent heat tank through the heat exchanger 302 and back to the surface of the liquid/slush pool. Finally, in this particular embodiment, a turbo compressor (278)/expander (284) unit arrange on a single shaft with a combination motor/generator 28 in the middle is used to compress the working fluid during the charge cycle and expand the working fluid during the discharge cycle. This particular disclosed embodiment also comprises additional components, such as valves 274, 304, 298, and 294, and pump 276.

Figure 27:
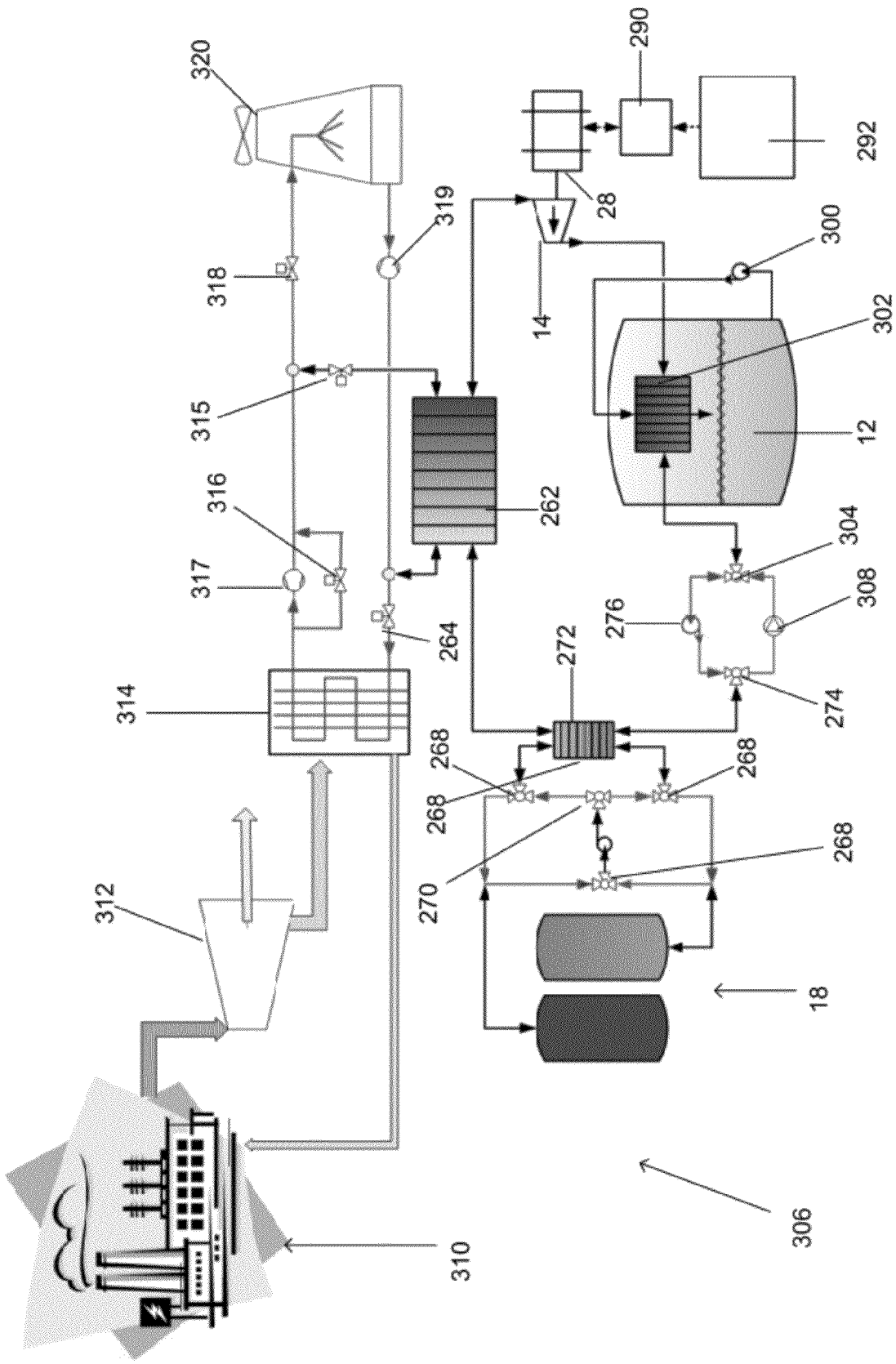
FIG. 27 is a schematic diagram illustrating a particular embodiment of the disclosed systems for energy storage wherein steam produced by a steam power plant is used as a source of heat input and a wet cooling tower is implemented.

Further embodiments of the disclosed systems include a combined power and storage (CPS) system 306 where low pressure condensing steam from a power plant is used as the heat input to the storage system (FIG. 27). During the discharge cycle of the storage system, steam, coming from a steam source 310, at a saturation temperature between about 40° C. to 100° C. is supplied, via a low pressure turbine 312, to condenser 314 of the storage system to heat a liquid loop. The liquid then goes to the storage system boiler 262 to evaporate the system working fluid. In an alternative embodiment, the steam could be supplied to the storage system boiler 262 directly. As shown, this configuration uses a wet cooling tower 320 to reject heat to the ambient during normal operation of the steam power plant and the charge cycle of the storage system. A liquid loop is used to transfer heat out of the storage system boiler/condenser unit 262 during the charge cycle. This embodiment may comprise a two-tank sensible heat storage unit 18 approach for internal cycle use, a co-functional compressor/expander 14 and motor/generator 28 configuration, and a heat exchanger device 302 within the latent heat storage device 12 that can super cool the storage medium in the tank through a continuous flow loop during the charge cycle. During the discharge cycle, the storage system working fluid condenses in the heat exchanger device 302 within the latent heat storage device 12. Also included in this particular disclosed embodiment is a near field pump 317, a far field pump 319, and a number of valves (264, 316, 315, and 318) to effectively control distribution of the fluid throughout the system comprised of the wet cooling tower 320, the condenser 314, and the storage system boiler/condenser unit.

Figure 28:
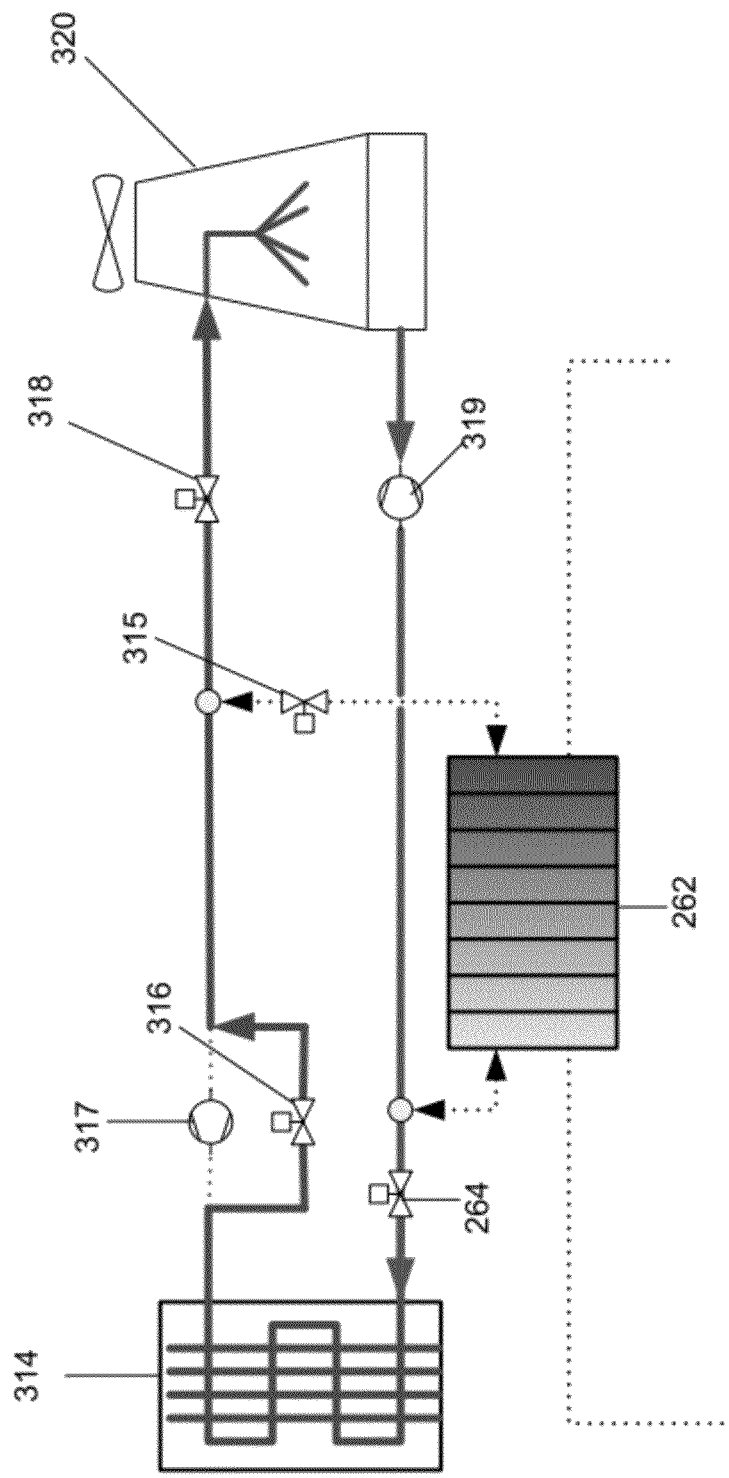
FIG. 28 is a schematic diagram illustrating a particular embodiment of the disclosed system wherein the system is powered by operation of a steam power plant. The dotted lines indicate portions of the system that are not implemented when in operation.

The particular embodiment illustrated in FIG. 27 is capable of several different functional operations, depending on the configuration of the fluid loop used. Control of the flow of the fluid loop may be controlled using valves 264, 316, 315, and 318. For example, FIG. 28 illustrates a particular disclosed embodiment wherein the system is operated using only the steam power plant 310. According to FIG. 28, the steam condenser 314 delivers condensed fluid through valve 316 to the wet cooling tower, bypassing the near field pump 317. The wet cooling tower 320 then delivers cooled fluid through the far field pump 319 back to the steam condenser 314 through valve 264. This particular flow configuration allows the steam plant to operate independent of the storage system.

Figure 29:
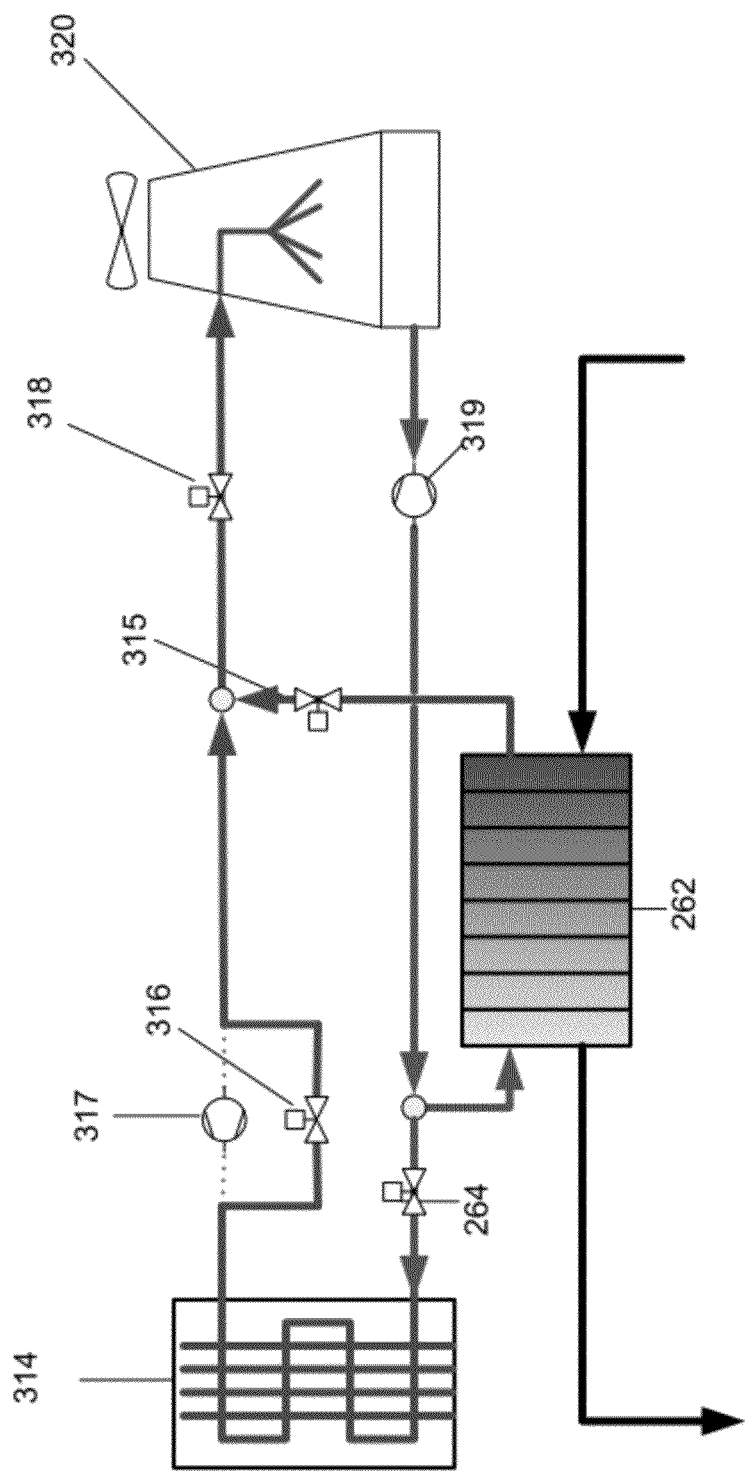
FIG. 29 is a schematic diagram illustrating a particular embodiment of the disclosed system wherein both steam plant power and energy storage are in operation. The dotted lines indicate portions of the system that are not implemented when in operation.

Another disclosed method of operation is illustrated in FIG. 29, which illustrates steam from the steam power plant 310 condensing in the condenser 314 while the storage system boiler/condenser 262, operating in condenser mode, uses cooling fluid from the wet cooling tower 329 to reject heat to the surroundings. The configuration shown in FIG. 29 allows the steam power plant to operate in combination with the charging cycle of the energy storage system. In particular, steam from the steam power plant 310 is condensed in steam condenser 314 and delivered to the wet cooling tower 320 through valves 316 and 318, while bypassing near field pump 317. The wet cooling tower then delivers fluid to the far field pump 319, which sends fluid to both the steam condenser 314 and the storage system boiler/condenser unit 262.

Figure 30:
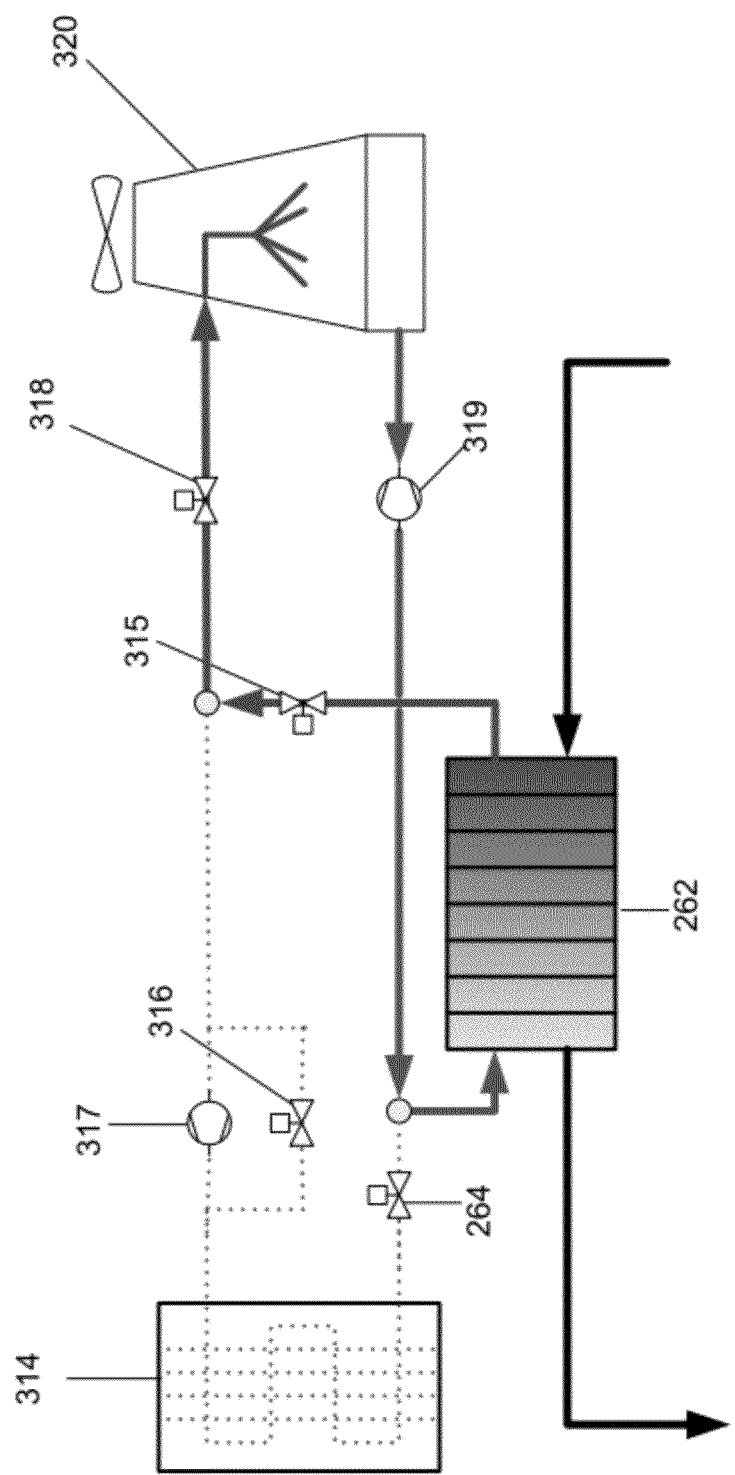
FIG. 30 is a schematic diagram illustrating a particular embodiment of the disclosed system wherein only energy storage is in operation. The dotted lines indicate the portions of the system that are not in operation.

An additional disclosed embodiment concerns using only the energy storage operation of the particular embodiment disclosed in FIG. 27. For example, the fluid routing configuration shown in FIG. 30 illustrates that the fluid flows between the wet cooling tower 320 and the storage system boiler/condenser unit 262 by implementing a fluid loop operated by valves 315, 318, and far field pump 319. In this particular embodiment, the steam power plant 310 is not operating and the energy storage system, operating in charge mode, is using the wet cooling tower 320 for heat rejection to the surroundings.

Figure 31:
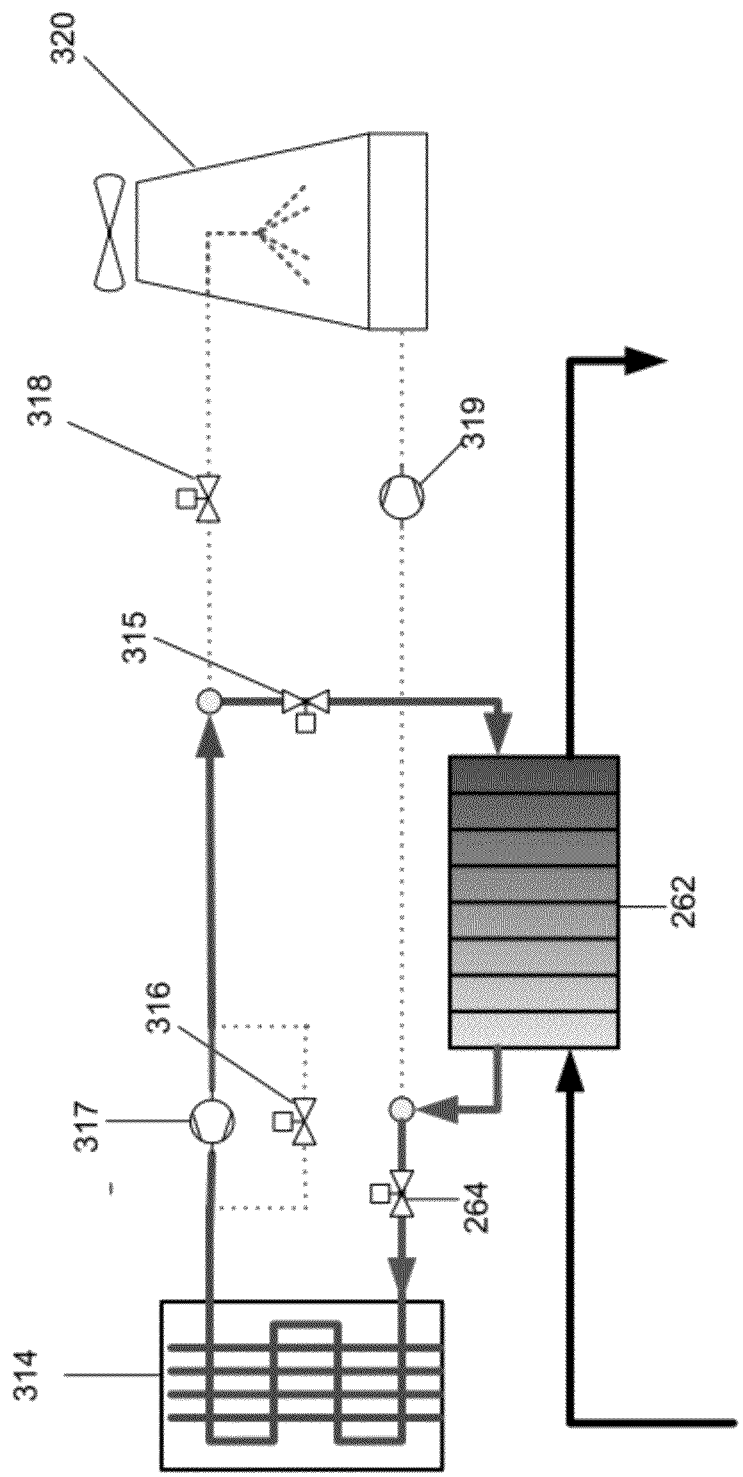
FIG. 31 is a schematic diagram illustrating a particular embodiment of the disclosed system wherein both steam plant power and energy discharge are in operation. The dotted lines indicate the portions of the system that are not in operation.

Yet another embodiment is disclosed in FIG. 31, wherein fluid from the steam condenser 314 flows through the near field pump 317 to the storage system boiler/condenser unit 262 via valve 315. The fluid then re-enters the steam condenser via valve 264. In this configuration, the steam plant is operating and supplying the necessary low grade heat to the storage system operating in discharge mode. The wet cooling tower is bypassed since the energy storage system is using the steam reject heat to drive the discharge process through boiler/condenser unit 262 operating as a boiler.

Figure 32:
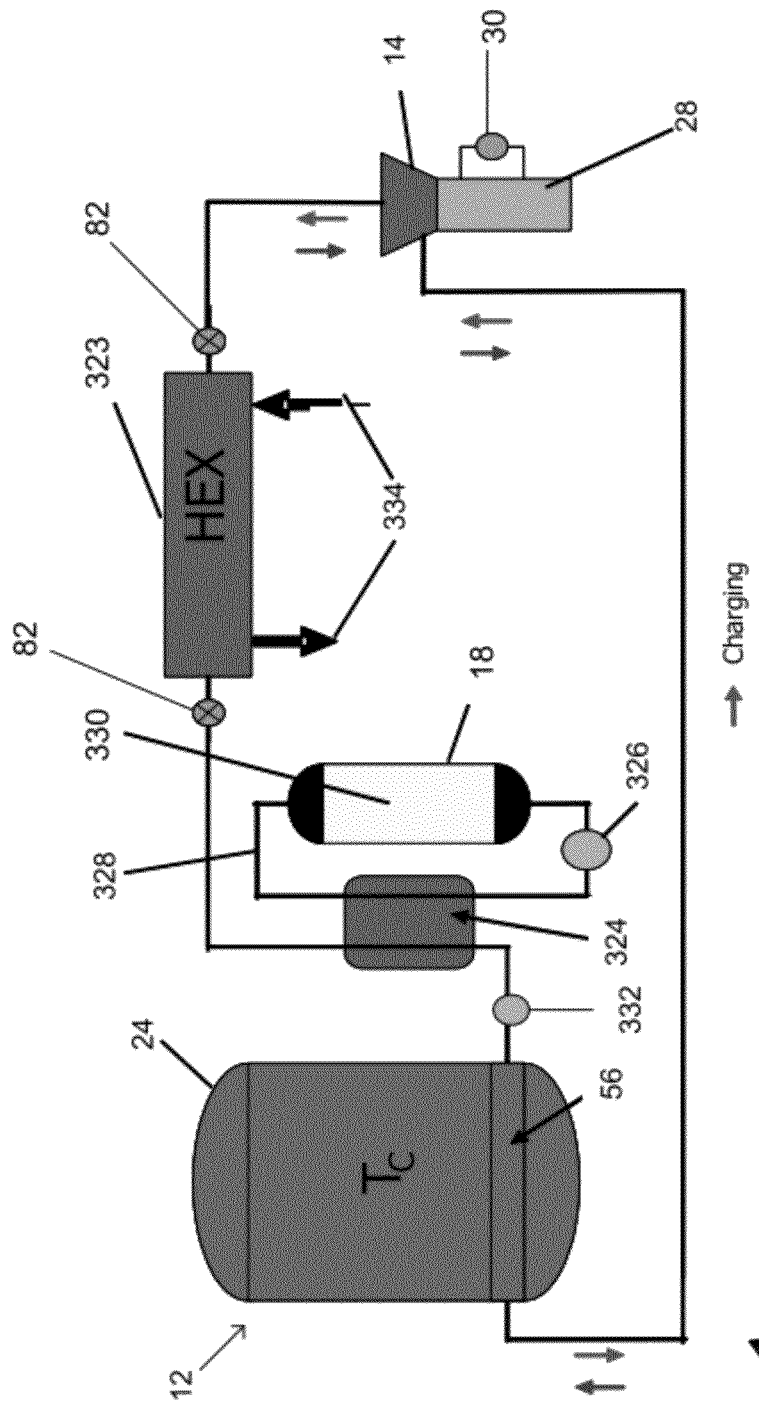
FIG. 32 is a schematic diagram illustrating a particular embodiment of the disclosed systems wherein a sensible heat storage unit is provided on a secondary loop that is thermally coupled with a heat exchanger that is fluidly coupled to a latent heat storage unit.

An additional embodiment of the disclosed systems is illustrated in FIG. 32. The system 322 illustrated in FIG. 32 comprises five main sub-systems including: 1) a combined expander/compressor 14 with motor-generator 28; 2) a heat exchanger device 323 communicating with both the ambient and source of low grade heat; 3) a latent heat storage system 12 comprising a large insulated storage tank 24 with internal heat exchangers 56; and 5) a stratified sensible heat storage device 18 containing an aqueous solution 330 (with associated heat exchanger 324 and pump 326). The heat exchanger device 323 that thermally communicates with the ambient as well as with a source of low grade heat, such as a large surface area device (e.g. plate and frame type), or sometime referred to as a gasketed heat exchanger. Since the temperatures and pressures involved are moderate, common construction materials can be used with standard configurations thus allowing economical implementation of this component. This heat exchanger 323 could have an external water loop 334 on the non-working fluid side that is cooled by a cooling tower during the system charging cycle. During the discharge cycle the water loop would be heated by a source of low grade heat.

The sensible heat storage process is implemented in FIG. 32 by a secondary fluid loop 328 comprising a thermally stratified storage tank 18, a pump 326 that can reverse the flow direction when needed, and a heat exchanger 324. A liquid 330 is stored in the tank such that the higher temperature fluid is at the top and the colder temperature fluid is at the bottom so that a thermally stable configuration is present. During system operation, the pump 326 operates with the sensible heat storage fluid 330 flowing in a counterflow direction to the working fluid in the secondary loop heat exchanger device 324. This requires the sensible heat fluid 330 to reverse direction through the heat exchanger when the cycle working fluid reverses direction as the system goes from charging to discharging mode, as described herein. A two-tank system may also be used, as illustrated in FIG. 27. The two-tank system eliminates the need for a thermocline to be maintained in the single tanks approach.

The latent heat storage system operates at sub-ambient temperatures, such as, but not limited to, at a temperature between approximately −10° C. and −15° C. The sensible heat storage system mediates the temperature change from ambient conditions to the cold storage conditions. This system component acts like a "time shifted" thermal recuperation process as opposed to a steady-state, real time heat recuperation as used in many ORC systems. The exact operating temperatures for the system would depend on specific design criteria and on the physical properties of the phase change material. In addition, the temperature of the surroundings (during the charge phase) and the source temperature of the low grade heat source also determine operating temperatures and pressures within the cycle. With reference to FIG. 32, as the system operates in the charging mode, the system working fluid travels in the counterclockwise direction and the system operates like a heat pump drawing heat out of the latent heat store by freezing the solution. For the discharging mode, the working fluid reverses direction and the system operates as an ORC using the latent heat store at sub-ambient temperature for heat rejection. With this approach, the local ambient temperature conditions are used for the charging cycle and a source of low-grade heat is used for the discharge cycle to boost roundtrip efficiency. Furthermore, the embedded sensible heat store allows the system to operate at higher efficiencies than a separate vapor compression heat pump and ORC system.

Figure 33:
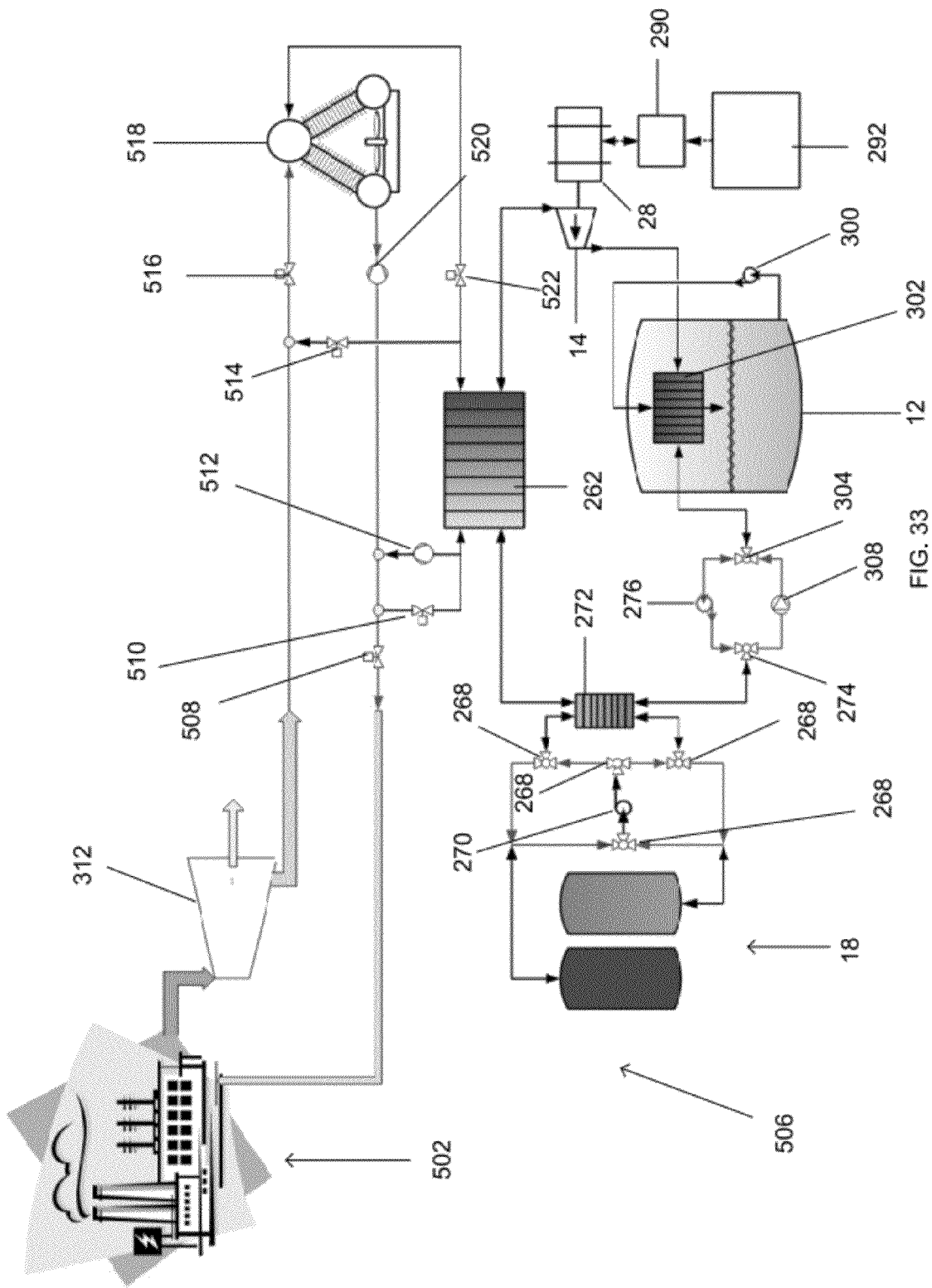
FIG. 33 is a schematic diagram illustrating a particular embodiment of a power and storage system wherein water is conserved and a dry cooling tower is implemented.

An additional embodiment of the disclosed system is shown in FIG. 33. The system 506, as illustrated in FIG. 33, comprises a steam power plant 502, substantially similar to that disclosed in FIG. 27 as 310. The heat is used in a boiler/condenser device 262 and a dry cooling tower 518 may be used to return condensate to the steam power plant 502 via far field pump 520 and valve 508. The particular embodiment disclosed in FIG. 33 does not employ a steam condenser; rather, it sends low pressure steam through a steam line into the dry cooling tower 518. Condensate from the dry cooling tower 518 may also enter the storage system boiler/condenser unit 262 via valve 510; at which point, the fluid may either enter the secondary loop or re-enter the dry cooling tower 518. The remaining components of the system are substantially similar to those illustrated in FIG. 27.

Figure 34:
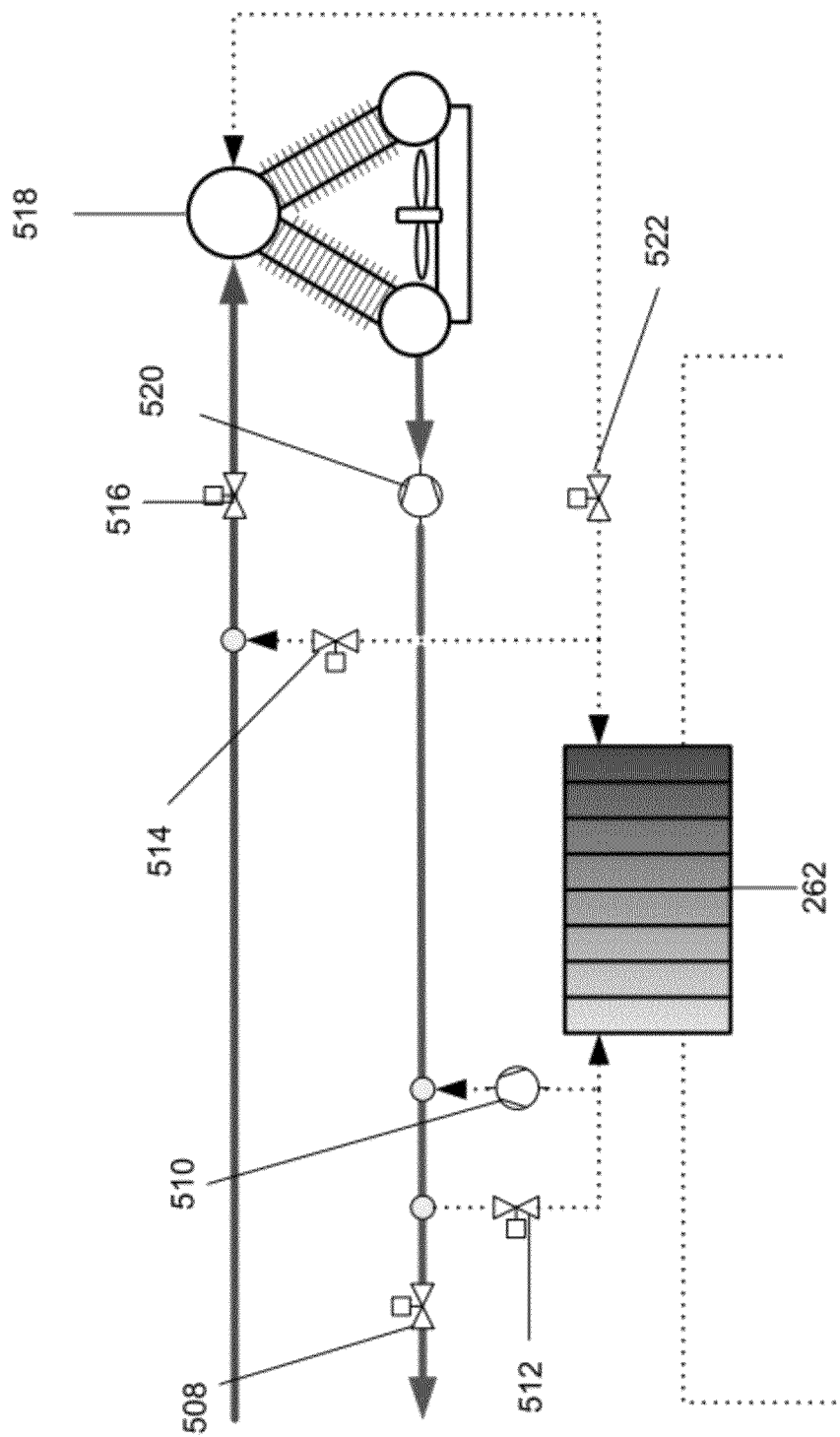
FIG. 34 is a schematic diagram illustrating a particular embodiment of the disclosed system wherein the system is powered by operation of a steam power plant. The dotted lines indicate portions of the system that are not implemented when in operation.
Figure 35:
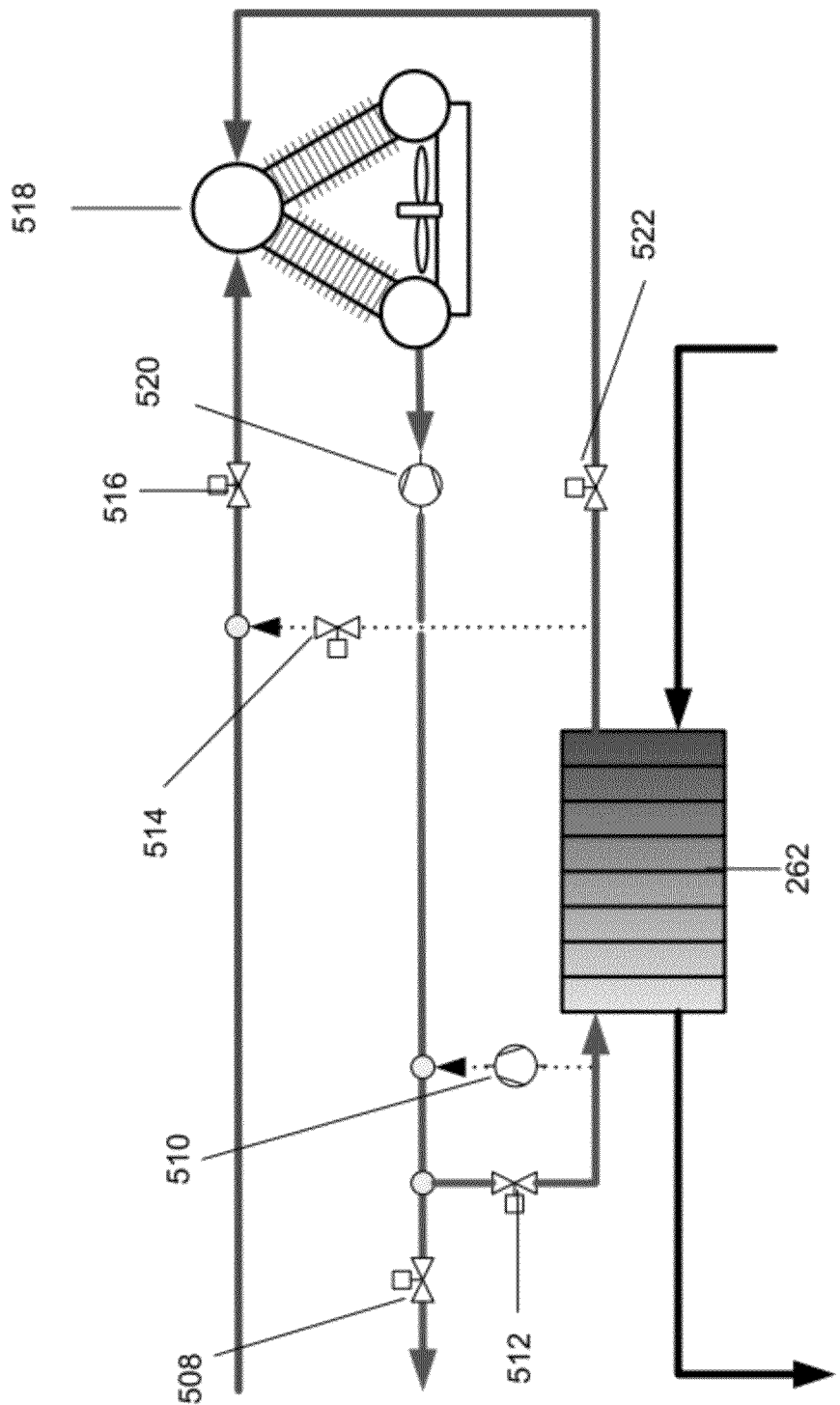
FIG. 35 is a schematic diagram illustrating a particular embodiment of the disclosed system wherein both steam plant power and energy storage are in operation. The dotted lines indicate portions of the system that are not implemented when in operation.
Figure 36:
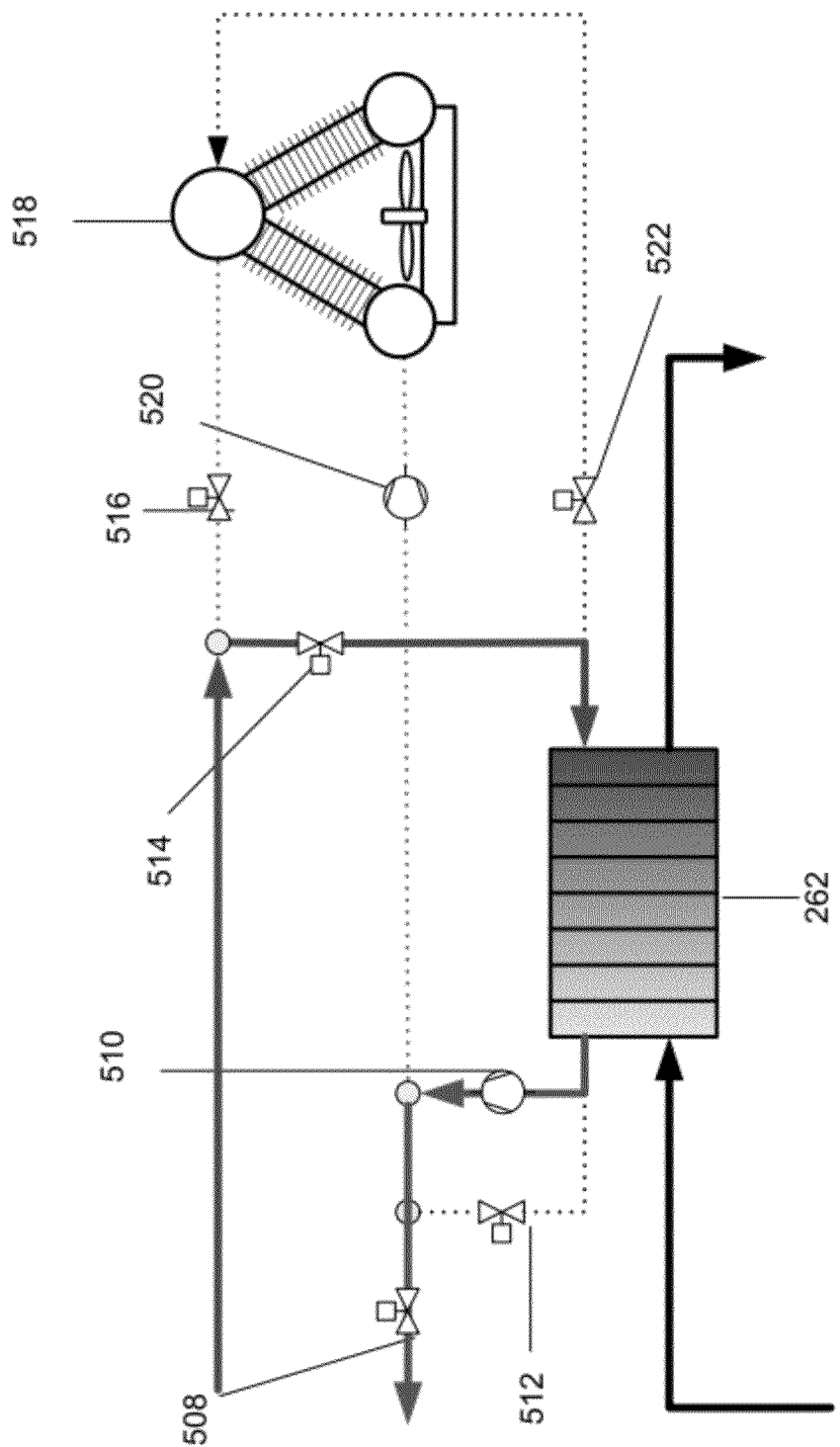
FIG. 36 is a schematic diagram illustrating a particular embodiment of the disclosed system wherein only energy storage is in operation. The dotted lines indicate the portions of the system that are not in operation.
Figure 37:
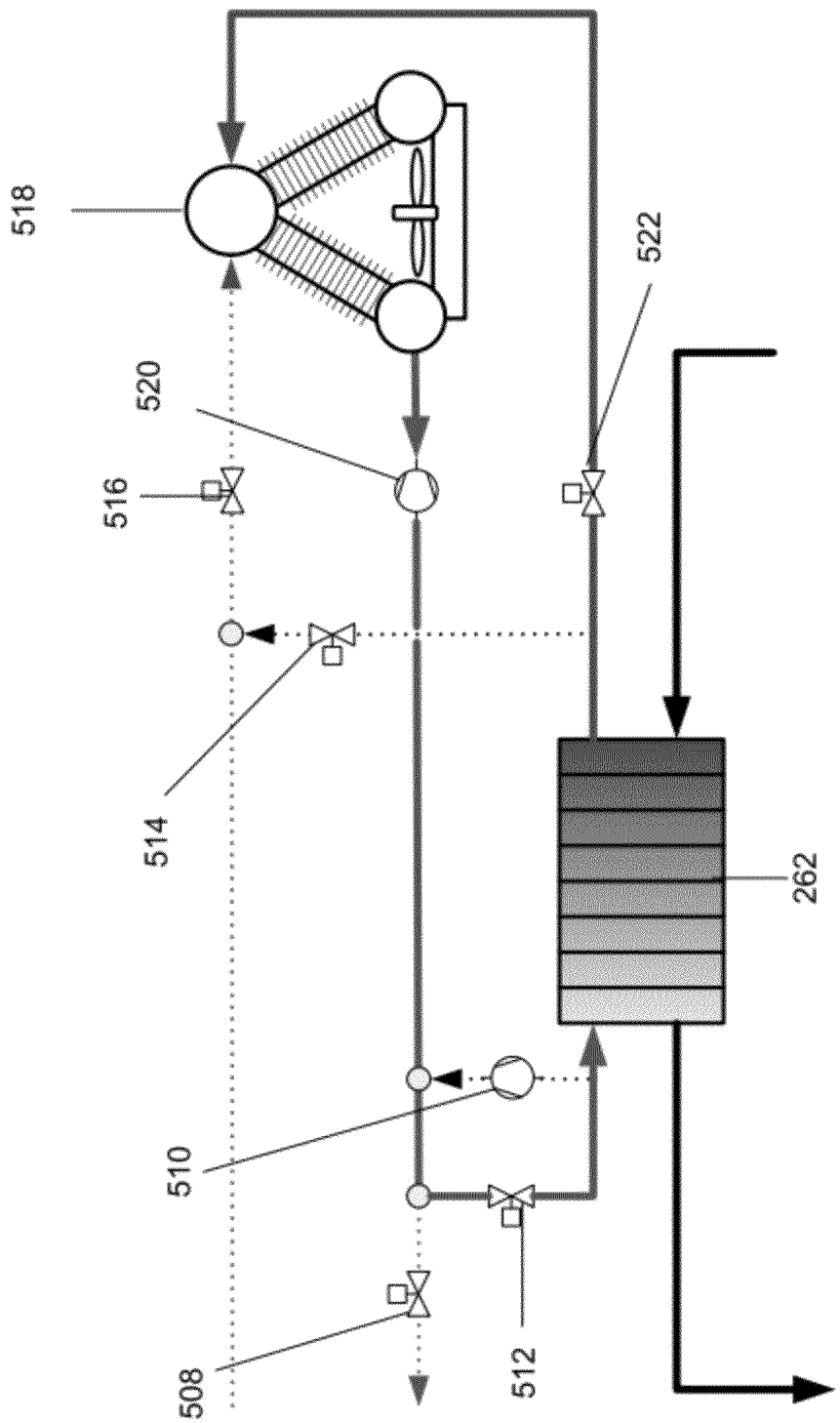
FIG. 37 is a schematic diagram illustrating a particular embodiment of the disclosed system wherein both steam plant power and energy discharge of stored energy is in operation. The dotted lines indicate the portions of the system that are not in operation.

FIGS. 34-37 illustrate various methods of operating the disclosed embodiment of FIG. 33. In particular, FIG. 34 illustrates a mode of operating the disclosed system as only a steam power plant with no energy storage taking place. For example, steam from the steam power plant 502 is sent to the dry cooling tower 518, which then returns condensate via the far field pump 520 and valve 508. Also disclosed is a particular embodiment that combines steam from the steam power plant and warmed condensate from the boiler/condenser unit 262 so that both the steam power plant and the energy storage system, operating in its storage mode, operate simultaneously. For example, FIG. 35 illustrates that a portion of the cooled condensate from the dry cooling tower 518 may pass to the storage system boiler/condenser unit 262 via valve 512. This condensate fluid then carries the heat rejected from the storage system during charge mode and delivers it to the dry cooling tower 518 via valve 522. The remaining portion of the cooled condensate returns to the steam plant via valve 508. This allows both the steam power plant and the storage system, operating in storage mode, to operate at the same time. Another disclosed embodiment is illustrated in FIG. 36, which illustrates using only the energy storage operation. In particular, condensate from the dry cooling tower 518 is sent to the storage system boiler/condenser unit 262, operating as a condenser, via the far field pump 520 and valve 512. The warmed liquid leaving the boiler/condenser 262 (after condensing the working fluid of the energy storage system) is then sent back to the dry cooling tower 518. This configuration allows the energy storage system to operate in charge mode by itself without the steam plant operating. Additionally, steam from the steam power plant 502 can be sent through an energy storage system, operating is its discharge cycle, such as illustrated in FIG. 37. As illustrated in FIG. 37, the steam is sent to the storage system boiler/condenser unit 262, now operating as a boiler, via valve 514. After passing through the storage system boiler/condenser unit 262, the condensate is returned through pump 510 and valve 508.

FIGS. 33, 34, 35, 36, and 37, illustrate how the energy storage system can integrate into a steam power plant and utilize the low-grade reject heat from the plant to drive the discharge mode of the storage system. Furthermore, while in charge mode, the energy storage system can utilize the dry cooling tower for heat rejection to the surroundings. The figures demonstrates to one of ordinary skill in the art that the energy storage system can be integrated into a dry cooling system of a steam power plant to conserve water since evaporative cooling using a wet cooling tower is not used. Furthermore, FIG. 37 shows that the energy storage system can perform the steam condensing operation alone without relying on the dry cooling tower. This may be advantageous during hot days when the dry cooling tower must operate at higher temperatures, hence higher saturation pressures, in order to condense the steam. This condition degrades the performance of the steam power plant. Having the energy storage system, operating in discharge mode, taking over the steam condensation duty from the dry cooling tower may allow the steam plant to operate more efficiently during hot days while simultaneously delivering more power to the grid by having both the steam power plant and energy storage system (operating in discharge mode) working at the same time.

Figure 38:
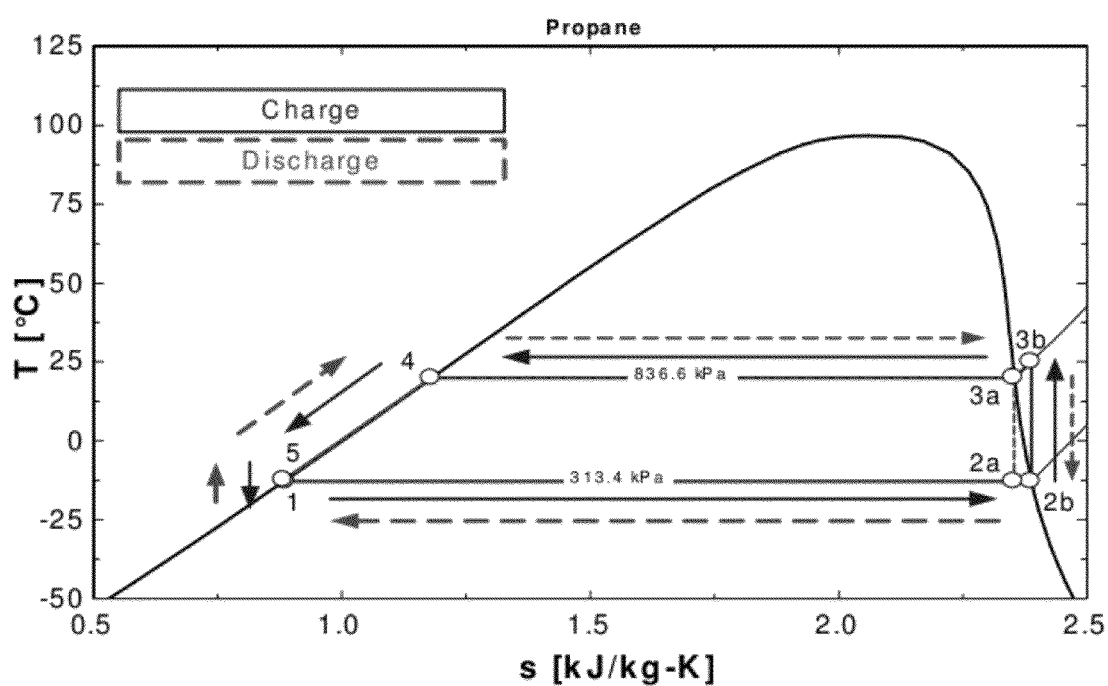
FIG. 38 is a temperature versus entropy diagram (the X-axis is S [kJ/kg-K], and the Y-axis is temperature [° C.]) illustrating thermodynamic processes for a particular working fluid (e.g. propane) modeled with ambient heat exchange at 20° C. The diagram illustrates a charge phase, which follows path $1$, $2b$, $3b$, $4$, $5$, and $1$, and a discharge phase, which follows path $1$, $5$, $4$, $3a$, $2a$, and $1$.

A temperature versus entropy diagram is shown in FIG. 38 for the charging and discharging processes. The charge process follows a counter-clockwise loop, compressing saturated vapor from 2b to 3b. The discharge process follows a clockwise loop, expanding saturated vapor from 3a to 2a. Both compressing and expanding processes are shown as vertical lines on the temperature vs. entropy diagram indicating ideal isentropic processes. In reality, each process would have an isentropic efficiency that captures non-ideal compression or expansion processes. The diagram is identical to a Rankine cycle (either power or heat pump cycle), however, both latent and sensible energy storage is used to mediate various heat transfer processes implied in the diagram. As a non-limiting example, propane was chosen as the working fluid where the latent heat storage tank operates at −12.9° C. (313.4 kPa saturation pressure). The ambient temperature heat exchanger is assumed to operate with a saturation temperature of 20° C. (saturation pressure of 836.6 kPa) during the charge phase of operation where the propane is condensing and heat is being rejected to the surroundings. During the discharge phase the propane also boils in the heat exchanger at 20° C., while a source of low-grade heat is supplied to the heat exchanger. In the temperature versus entropy diagram it should be noted that a standard ORC would require heating during the discharge process from state point 5 to 4 as the working fluid increases in temperature to saturation conditions in the boiler. However, in the conceptual process being described here and assuming embedded sensible heat storage, this thermal energy is being supplied by sensible heat stored during the charging cycle. Likewise, thermal energy needs to be removed from the working fluid during the charge phase between state points 4 and 5. By using the stored sensible heat most of the heat transfer with the environment takes place isothermally: propane boils or condenses between 4 and 3 with only a small amount of superheat existing in the charge phase between 3b and 3a. This allows the charge and discharge cycles to better approach Carnot cycle performance when compared to Rankine cycle operation.

Although the processes described by FIG. 38 are illustrative of a situation where the ambient temperature heat exchange takes place at nominally identical temperatures, in reality with a source of low grade heat the boiling temperature for discharging would be elevated above the temperature where condensation occurs for the charging cycle. Such an embodiment is illustrated FIG. 39, where the charge cycle only partially covers the temperature range necessary to bring the discharge cycle to saturation; the discharge cycle requires an elevated temperature source of heat from the environment. This is unlike the cycle in FIG. 38, where all the heat is supplied by the sensible heat storage occurring during the charge cycle. However, the diagram implies more work is being developed during the discharge cycle than is consumed by the charge cycle in the ideal case. In the real case where irreversibilities are present in both the charge and discharge cycles, this difference in temperature between the charge and discharge cycles is a result of using low-grade heat during the discharge cycle and partially compensates for the inherent irreversibilities of using real components and processes in the cycle. It allows a practical level of round trip efficiency to be achieved.

Two major irreversibilities of the thermal storage system can be the effect of the isentropic efficiency of a vapor expander/compressor and the effect of a driving temperature difference, $\Delta T$, on the two main heat transfer processes, which are the heat transfer processes occurring between the working fluid and the latent heat material, and between the working fluid and ambient surroundings through an ambient temperature heat exchanger. The following analysis approach can be used to obtain an accurate prediction of the efficiencies of the system. First law analysis on each component can be used throughout with the steady flow expression given as:

$$\dot{Q}-\dot{W}=\dot{m}(h_{in}-h_{out}) \quad (1)$$

with changes in potential and kinetic energies of the working fluid being neglected for the purposes of this analysis. For modeling purposes, Eq. (1) can be written for each component of the system for each phase of operation. For the expander/compressor and motor/generator components, adiabatic conditions are assumed to prevail leading to Q being zero. Furthermore, an isentropic efficiency can be set for each of the mechanical components defined by:

$$\eta_E = \frac{\dot{W}_E/\dot{m}}{\left(\dot{W}_E/\dot{m}\right)_S} = \frac{h_3 - h_2}{h_3 - h_{2S}} \quad (2)$$

$$\eta_C = \frac{\left(\dot{W}_C/\dot{m}\right)_S}{\dot{W}_C/\dot{m}} = \frac{h_{3S} - h_2}{h_3 - h_2} \quad (3)$$

where $\eta_E$ and $\eta_C$ are the isentropic efficiencies for the expansion and compression processes, respectively. The resulting simultaneous equations from this analysis can be solved with Engineering Equation Solver (or EES) which has embedded thermodynamic property data that can be brought into the solution process, thus no assumptions with regard to constant working fluid properties would be needed in this approach.

Using the steady flow assumption during the large portion of the operating time for either the charge or discharge phase of the cycle, the analysis is quite similar to a standard Rankine cycle system with modifications to account for the sensible heat storage process. An effectiveness for the counter-flow heat exchanger is used to describe the energy exchange for this process, thus using either an enthalpy or temperature formulation gives:

$$\varepsilon = \frac{h_{in} - h_{out}}{h_{in} - h_{@P=P_{in}, T=T_{SHS,in}}} \quad (4a)$$

$$\varepsilon = \frac{T_{SHS,out} - T_{SHS,in}}{T_{in} - T_{SHS,in}} \quad (4b)$$

The working fluid outlet enthalpy is determined from the heat exchanger effectiveness and the temperature of the sensible storage medium. The effectiveness, along with the working fluid conditions, determines the temperature of the sensible storage medium. Though no assumption is made concerning the specific material for the storage medium, it is assumed to have a constant specific heat over the temperature range in the heat exchanger for modeling purposes. This allows the simplification in Eq. 4b.

Modeling the latent heat storage involves specifying a storage temperature at which the latent heat material undergoes its phase transition, and then determining the heat transfer occurring between state points 1 and 2 of FIG. 38 by using a mass flow rate and the difference in enthalpy of the evaporating working fluid in the latent heat tank as the freezing takes place. Although this process is mediated by a heat exchange process, no specific heat exchanger configuration is defined. In the base case, no heat exchanger driving temperature difference is specified; however, in calculations beyond the base case, a driving temperature difference of 5° C. is used to help assess the effect of non-ideal heat exchanger operation. This is explained in more detail below.

Figure 39:
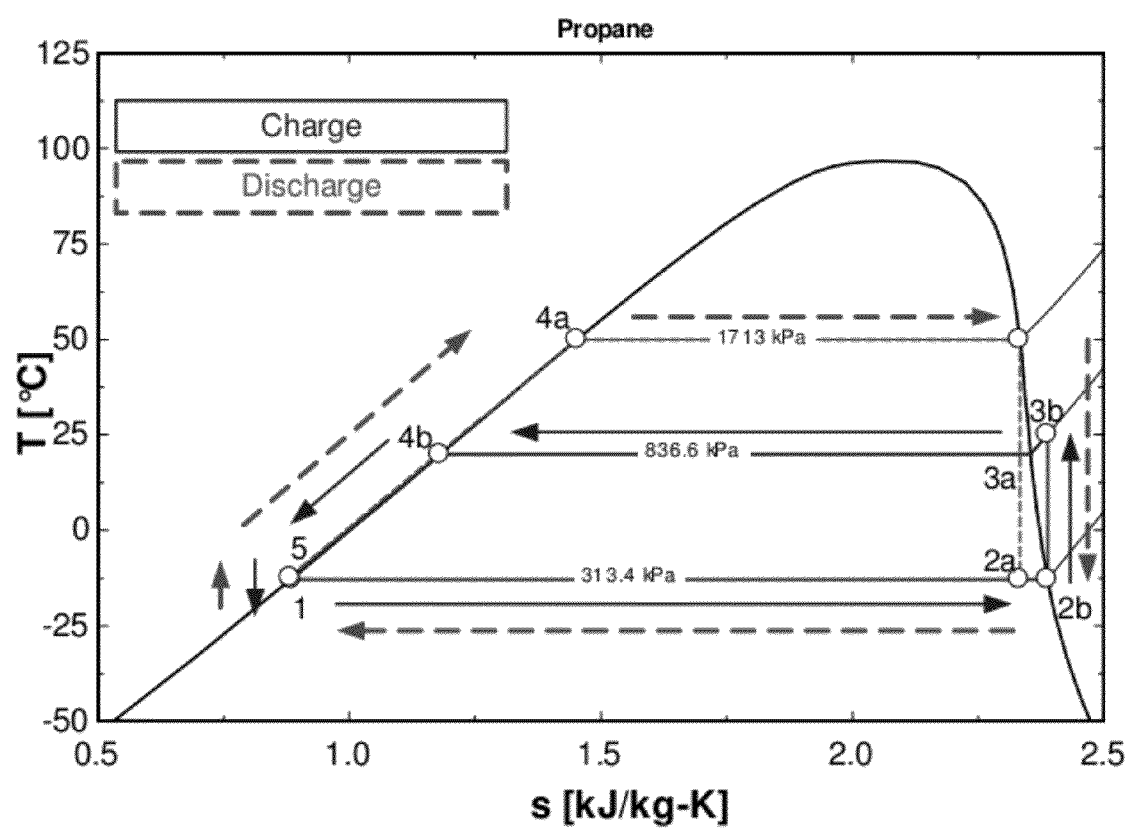
FIG. 39 is a temperature versus entropy diagram (the X-axis is S [kJ/kg-K], and the Y-axis is temperature [° C.]) illustrating thermodynamic processes for a particular working fluid (e.g. propane) modeled with ambient heat exchange at 20° C. in the charge phase and 50° C. in the discharge phase. The diagram illustrates a charge phase, which follows path $1$, $2b$, $3b$, $4b$, $5$, and $1$, and a discharge phase, which follows path $1$, $5$, $4a$, $3a$, $2a$, and $1$.
Figure 40:
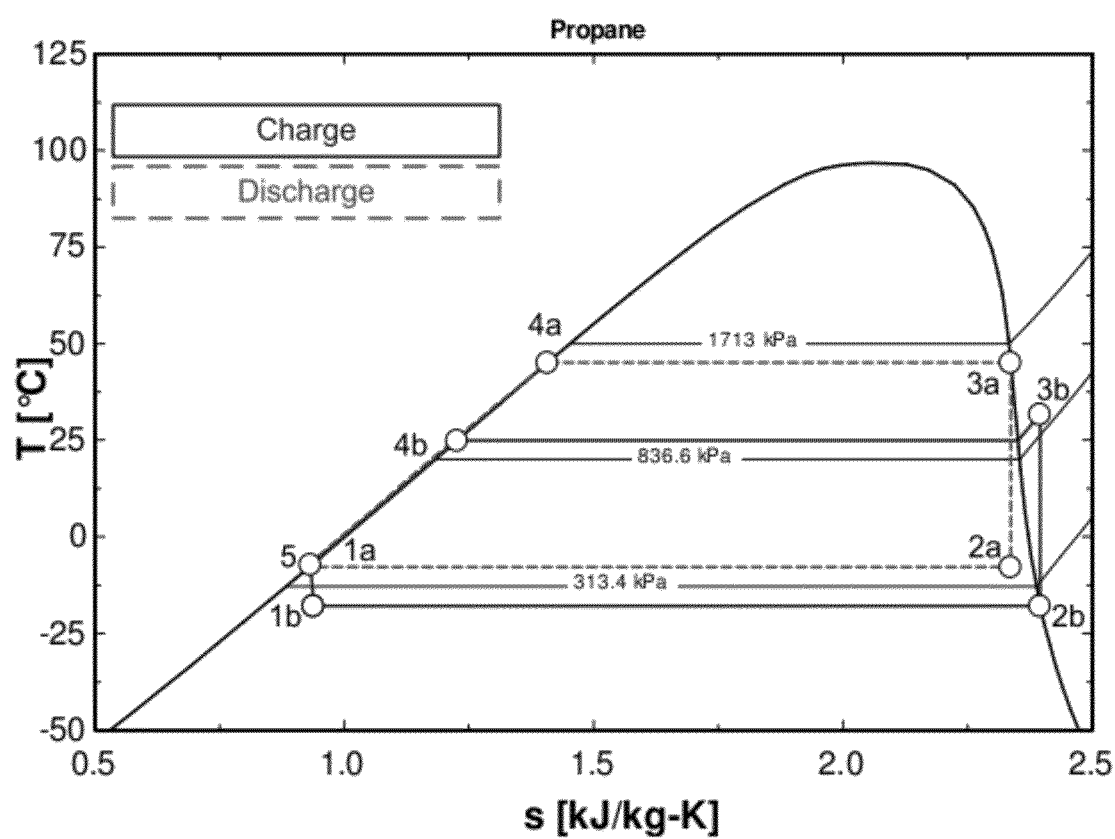
FIG. 40 is a temperature versus entropy diagram (the X-axis is S [kJ/kg-K], and the Y-axis is temperature [° C.]) illustrating thermodynamic processes for a particular working fluid (e.g. propane) with a driving temperature difference of 5° C. (compared with FIG. 38). The diagram illustrates a charge phase, which follows path $1b$, $2b$, $3b$, $4b$, $5$, and $1b$, and a discharge phase, which follows path $1a$, $5$, $4a$, $3a$, $2a$, and $1a$.
Figure 41:
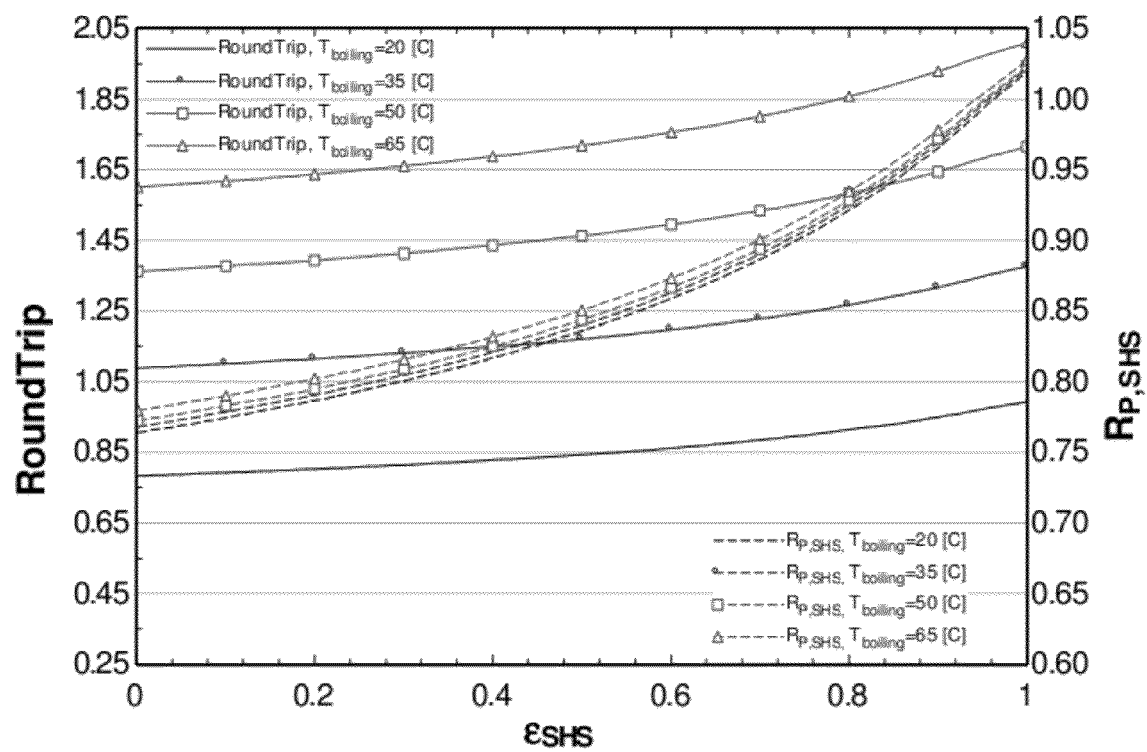
FIG. 41 is a chart showing the system performance as a function of SHS heat exchanger effectiveness ($\epsilon_{SHS}$) for the cases in Table 1 as the discharge phase boiling temperature is increased for an expander/compressor efficiency of 100%. The round trip efficiencies (Roundtrip) are shown with solid lines on the left vertical axis, and the ratio of performance ($R_{P,SHS}$) is shown with dashed lines on the right vertical axis.
Figure 42:
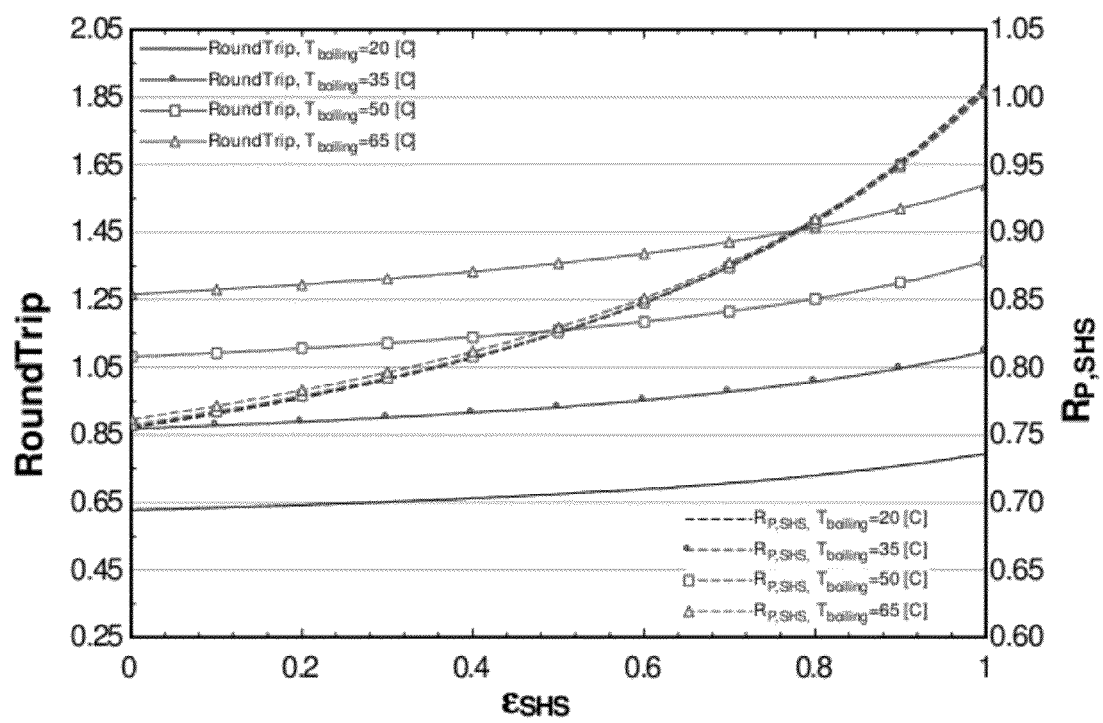
FIG. 42 is a chart showing the system performance as a function of SHS heat exchanger effectiveness ($\epsilon_{SHS}$) for the cases in Table 1 as the discharge phase boiling temperature is increased for an expander/compressor efficiency of 90%. The round trip efficiencies (Roundtrip) are shown with solid lines on the left vertical axis, and the ratio of performance ($R_{P,SHS}$) is shown with dashed lines on the right vertical axis.
Figure 43:
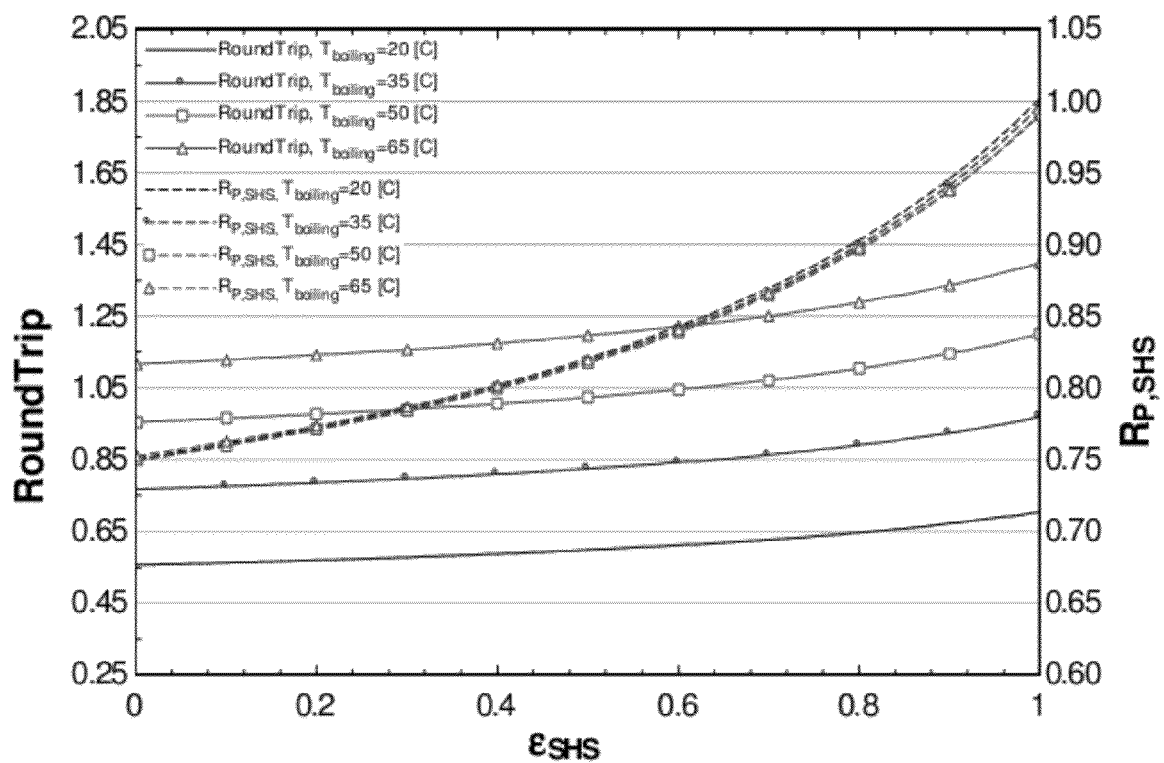
FIG. 43 is a chart showing the system performance as a function of SHS heat exchanger effectiveness ($\epsilon_{SHS}$) for the cases in Table 1 as the discharge phase boiling temperature is increased for an expander/compressor efficiency of 85%. The round trip efficiencies (Roundtrip) are shown with solid lines on the left vertical axis, and the ratio of performance ($R_{P,SHS}$) is shown with dashed lines on the right vertical axis.
Figure 44:
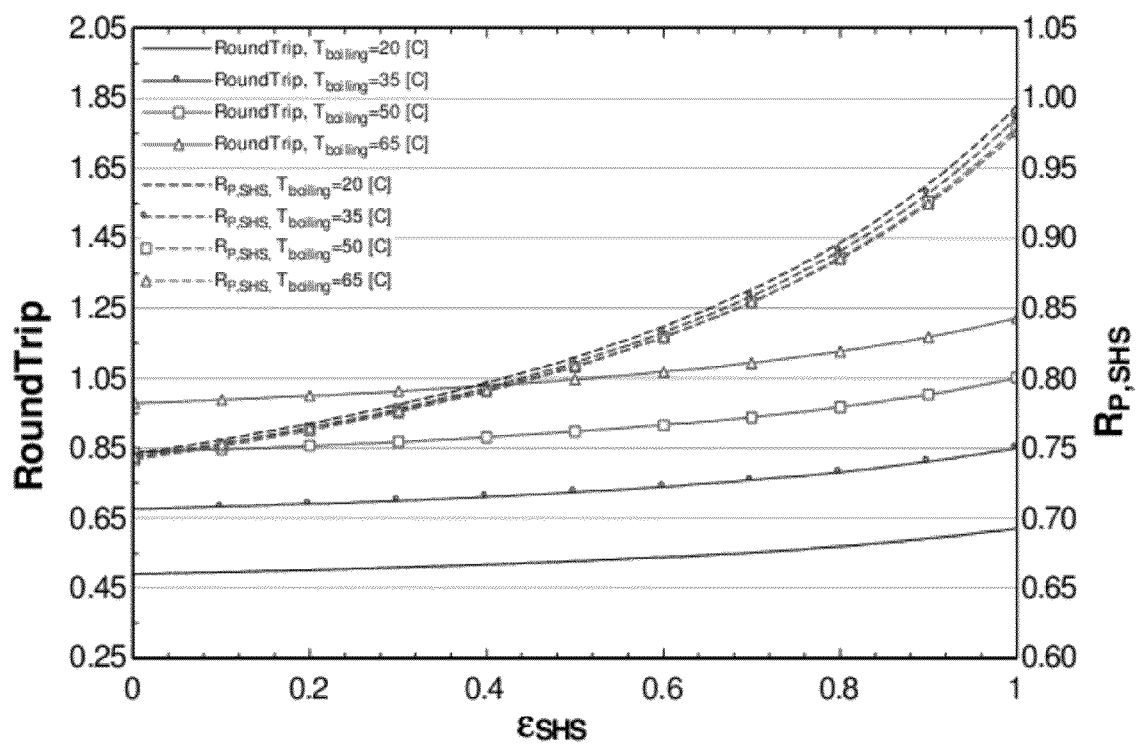
FIG. 44 is a chart showing the system performance as a function of SHS heat exchanger effectiveness ($\epsilon_{SHS}$) for the cases in Table 1 as the discharge phase boiling temperature is increased for an expander/compressor efficiency of 80%. The round trip efficiencies (Roundtrip) are shown with solid lines on the left vertical axis, and the ratio of performance ($R_{P,SHS}$) is shown with dashed lines on the right vertical axis.

FIG. 40 is a temperature versus entropy diagram for a particular working fluid (e.g. propane) with a driving temperature difference of 5° C. in the two main heat transfer processes (e.g. between state point 1 and 2 and between 3 and 4). The constant pressure lines in FIG. 40 are the same as shown in FIG. 39, but the saturation lines for the process are shifted to create the driving temperature difference for the heat exchange processes. A person of ordinary skill in the art will recognize that if the 5° C. driving temperature difference was introduced on the conditions in FIG. 38, each saturation process in the discharge cycle would have an approximately 10° C. difference from each corresponding saturation process in the charge cycle. This difference would drive the discharge phase to a temperature range about 20° C. less than the charge phase.

To capture the increase or decrease in saturation temperature (and hence saturation pressure) for the processes taking place in the heat exchanger and cold storage tank, one value of ΔT is used throughout. That is, one model input parameter is used to provide the temperature difference either above or below the nominal temperature in each of the two components modeled in this fashion, as shown in FIG. 40. Obtaining baseline results first uses the computational model with nominal temperatures for the processes (no driving ΔT) in each heat transfer component. Additional modeling results are then generated using the 5° C. temperature difference in order to show how system performance is affected.

The set of simultaneous equations resulting from modeling were solved with Engineering Equation Solver (EES). This solution package provides a means for determining the thermodynamic property data needed during the solution process for the set of coupled non-linear algebraic equations. With this approach, it is possible to model the thermodynamics of the system under baseline conditions and to use a parameter variation approach to identify the advantages of using sensible heat storage as a means for increasing the round trip efficiency over an ordinary heat pump/heat engine approach to energy storage. Furthermore, exercising the model for the baseline system and using increasing temperature values of the supplied low-grade heat will provide an assessment of when the system round trip efficiency becomes of interest for energy storage. For this assessment, 70% round trip efficiency was used as a threshold. Additional information includes values for the amount of thermal energy exchanged with the surroundings, amount of heat storage needed per kW-h of electricity stored, and estimates of volume and mass of representative storage material.

Baseline computational runs were made with propane as the working fluid (Table 1). Propane was chosen because of its attractive vapor pressure characteristics at the nominal cold storage temperature of −12.9° C. giving a saturation pressure of 313.4 kPa and an ambient heat exchanger temperature of 20° C. having a saturation pressure of 836.6 kPa. This example is not intended to be limiting and a person of ordinary skill in the art will recognize that the approach may be used with other examples of working fluids. A nominal pressure ratio of approximately 2.7 across the compressor and expander under ideal conditions (e.g. no driving ΔT considerations) was obtained. Quantities are provided such as the operating efficiencies of the components and resulting round trip efficiencies for a sensible heat storage case where the heat exchanger effectiveness is unity. Also provided in Table 1 are the amounts of thermal energy that must be rejected to ambient, or supplied by the ambient, during the charge or discharge phase of the system, respectively. Other quantities were also calculated for the nominal case where no ΔT was used. For the cases with isentropic efficiencies of 100% and 90% for both the compressor and expander, and heat being exchanged with the surroundings at 20° C., the round trip efficiencies are 99.2% and 79.4%, respectively. Without being limited to a particular theory of operation, it is currently believed that the incorporation of the sensible heat store removes a significant inherent irreversibility from the Rankine heat pump/heat engine approach for storing electrical energy.

In Table 1, the results from the computations show that 8.6 and 10.3 kW-h of latent heat should be stored for every kW-h of electricity released back onto the grid for the 100% and 85% isentropic efficiency cases, respectively. For the same kW-h of electricity the 85% case, as an example, should reject approximately 9.6 kW-h of heat to the surroundings during the charging phase. The discharge phase consumes slightly less energy; 9.1 kW-h are required to drive the process. The amount of heat transferred to or from the latent heat store partly depends on the difference in temperatures used in the cycle (i.e. the difference between the latent heat temperature and ambient temperature). As this difference increases, the amount of heat stored per kW-h of electricity released back onto the grid decreases.

TABLE 1

Nominal Operating Values

| | 100% Isentropic Case | 90% Isentropic Case | 85% Isentropic Case | 80% Isentropic Case | 85% Isentropic Case, dT = 5° C. |
|---|---|---|---|---|---|
| Compressor Efficiency | 100% | 90% | 85% | 80% | 85% |
| Expander Efficiency | 100% | 90% | 85% | 80% | 85% |
| Discharge Phase Pump Efficiency | | | 65% | | |
| Charge Phase Expansion Valve Efficiency | | | Isenthalpic | | |
| *Temperatures of saturation processes* | | | | | |
| LHS[a] Condensing Temperature | | | −12.9° C. | | −7.9° C. |
| LHS[a] Evaporating Temperature | | | −12.9° C. | | −17.9° C. |
| Condensing Temperature (Heat Out from System) | | | 20° C. | | 25° C. |
| Boiling Temperature (Heat Into System) | | | 20° C. | | 15° C. |
| Sensible Heat Storage Heat Exchanger Effectiveness | | | 1.00 | | |
| Expander Pressure Ratio | | | 2.67 | | 1.98 |
| Compression Pressure Ratio | | | 2.67 | | 3.61 |
| Round Trip Efficiency | 99.2% | 79.4% | 70.4% | 62.0% | 36.0% |
| *Values given below are in kW-h of heat per kW-h of electricity released back to the grid* | | | | | |
| Chill Stored in Latent Cold Tank | 8.6 | 9.7 | 10.3 | 11.0 | 14.5 |
| Heat Rejected to Ambient (Charging Mode) | 7.8 | 8.9 | 9.6 | 10.3 | 14.1 |
| Heat Provided from Ambient (Discharging Mode) | 7.8 | 8.6 | 9.1 | 9.7 | 12.3 |
| Ideal Heat Stored in SHS[b] Tank (Heat Available)[c] | 1.8 | 2.0 | 2.2 | 2.3 | 3.3 |
| Ideal Heat Retrieved in SHS[b] Tank (Chill Available)[d] | 1.8 | 2.0 | 2.2 | 2.3 | 3.2 |
| *Amount of storage material needed per kW-h of electricity released back to grid* | | | | | |
| Approximate Mass (kg) of LHS Material[e] | 193 | 217 | 231 | 247 | 326 |
| Volume (m³) of LHS Material | 0.173 | 0.195 | 0.208 | 0.222 | 0.293 |
| Approximate Mass (kg) of SHS Material[f] | 54 | 61 | 65 | 69 | 95 |
| Volume (m³) of SHS Material | 0.051 | 0.058 | 0.061 | 0.065 | 0.089 |
| *Cycle times are given in seconds per kW-h electricity stored/discharged at 1 kW* | | | | | |
| Discharge time per (total) | | | 3600 | | |
| Degraded discharge cycle time (no remaining SHS heat) | 68 | 26 | 6 | 0 | 0 |
| Charge time (total) | 3628 | 4530 | 5108 | 5806 | 9993 |
| Degraded charge cycle time (no remaining SHS chill) | 0 | 0 | 0 | 30 | 351 |

[a]Latent Heat Storage
[b]Sensible Heat Storage
[c]Ideal heat stored, available heat, represents the maximum that could be stored if the opposing cycle had sufficient capacity to receive it.
[d]Ideal heat retrieve, available chill, represents the maximum that could be retrieved if opposing cycle had sufficient capacity to store it.
[e]Ethylene glycol is used as a representative storage material with a freezing point of −12.9° C.
[f]A mixture of water and ethylene glycol at 30% by mass is used as a representative material with a density of 1.057 kg/m³ and $c_p$ = 3.826 kJ/° C.-kg and a freezing temperature below −12.9° C.

In particular embodiments, ethylene glycol was chosen to provide a representation of the amount of material needed for the latent heat store. Using the 85% isentropic efficiency case and assuming that the latent heat of fusion for ethylene glycol is 160 kJ/kg (0.044 kW-h/kg), approximately 231 kg of material, which occupies a liquid volume of 0.208 m³ is required to release 1 kW-h of electricity back onto the grid. This latter figure does not include any volume for containment or flow channels for the working fluid. For sensible heat storage, water may be used with a suitable freezing point depressant such as a glycol. At the same operating conditions above, 65 kg of a 30% ethylene glycol/water mixture occupying 0.0061 m³ would store the heat used to produce 1 kW-h electrical, calculated with $mc_p \Delta T$. Although these calculations give only a first order estimate of the amount of material needed for heat storage, a person of ordinary skill in the art can easily scale to higher storage levels by assuming the addition of more material and tank volume. For example, a 100 kW-h storage system with the same conditions as the 85% isentropic case in Table 1 would use approximately 23,100 kg of ethylene glycol having a volume of 20.8 m³. If a volume factor of 1.5 is used for allowances for containment and working fluid channels, a spherical tank with a diameter of 3.9 m is determined. The sensible heat storage tank also scaled to this size and using a volume factor of 2 would give a cylinder with a diameter and height of 2.5 m.

In order to evaluate the performance of the sensible heat storage, a ratio of performance ($R_{P,SHS}$) is calculated to signify the sensible storage system efficiency.

$$R_{P,SHS} = \frac{ChillAvailable}{HeatAvailable}$$

This ratio emerges from a storage imbalance in the charge and discharge cycles. The energy capacity in the LHS is held in balance, so the energy capacity in the sensible heat storage (SHS) is dependent on system variations. The smallest energy capacity from either the charge or discharge cycle should be used to define the storage capacity of the SHS. When this ratio is less than 1, there is more heat available to drive the discharge process than can be used before the energy capacity of the LHS is reached. Further, this indicates insufficient sensible cooling available to the charge cycle. After the SHS capacity is reached, the charge cycle must flash from saturated liquid to a higher quality vapor than when the SHS can provide subcooling capacity. This reduces the COP of the charge cycle and system charging (energy storage) should occur over a longer period. This also represents a decrease in Round Trip efficiency, because as the SHS capacity is increasingly insufficient, the time averaged COP approaches that of a cycle with no subcooling.

When the ratio of performance is greater than 1, there is insufficient heat available to the discharge cycle. This lowers the Rankine cycle thermal efficiency, but does not reduce the Round Trip efficiency since only energy provided to the compressor and expander is taken into account. However, the heat load on the environment does increase in this case and necessitates larger heat exchangers.

FIGS. 41 through 45 are graphs illustrating roundtrip efficiency and $R_{P,SHS}$ for a range of boiling temperatures with varying expander/compressor efficiencies. The round trip efficiencies are shown with solid lines on the left vertical axis, and the ratio of performance is shown with dashed lines on the right vertical axis. It may be seen in these charts that the round trip efficiency increases in all cases with more effective sensible heat storage.

Figure 45:
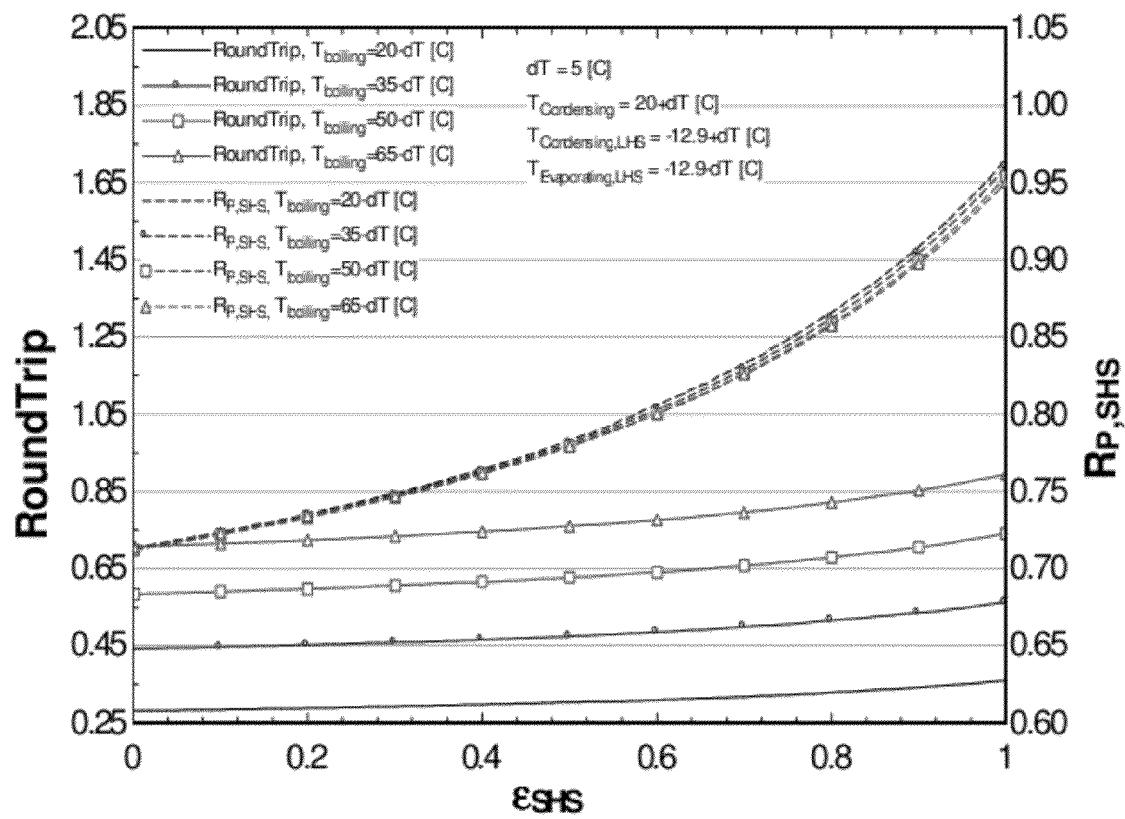
FIG. 45 is a chart showing the system performance as a function of SHS heat exchanger effectiveness ($\epsilon_{SHS}$) for the cases in Table 1 as the discharge phase boiling temperature is increased for an expander/compressor efficiency of 85% and a driving temperature difference across the phase changing heat exchangers of 5° C. The round trip efficiencies (Roundtrip) are shown with solid lines on the left vertical axis, and the ratio of performance ($R_{P,SHS}$) is shown with dashed lines on the right vertical axis.

The ratio of performance increases to above 0.9 with a fully effective SHS with the lowest performing conditions (FIG. 45). This indicates that an effective SHS is capable of providing most of the sensible cooling for the charge cycle. The ratio of performance is seen above unity only in FIGS. 41 and 42, and only in the case with heat exchanger effectiveness above 0.95. In most cases then, the SHS is able to supply sensible heat to the discharge process during the entire discharge period.

Figure 46:
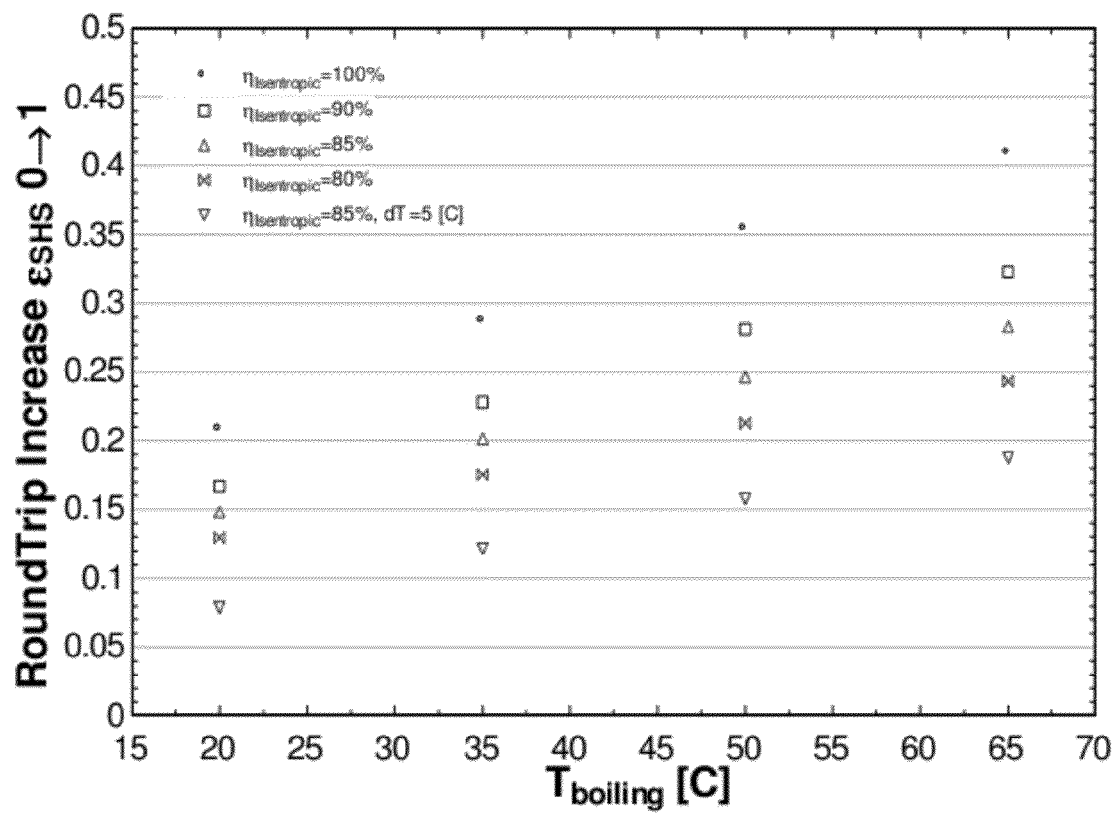
FIG. 46 is a graph of the total increase in round-trip efficiency (where the Y-axis is RoundTrip Increase $\epsilon_{SHS}$ 0-1 and the X-axis is temperature [° C.]) for the conditions shown in FIGS. 41-45 from no SHS to an SHS with fully effective heat exchangers.

FIG. 46 is a graph of the total increase in roundtrip efficiency (Y-axis) versus the boiling temperature (° C.) (x-axis), and it shows the total increase in round trip efficiency for all cases in FIGS. 41 through 45. Increasing the boiling temperature in the discharge process coincides with a larger improvement in round trip efficiency with an effective SHS. That is, as the round trip efficiency increases, there is a larger benefit from an effective SHS. If the temperature of the low grade heat is sufficiently high, perhaps greater than about 70° C., a simplified system may then also begin to provide acceptable round trip efficiencies. This simplified system would retain all of the major components describe in FIG. 32 with the exception of the sensible heat storage. Eliminating this feature of the energy storage system would simplify the configuration and reduce the cost, but the round trip efficiency would suffer. A higher temperature for the low grade heat source could compensate for the lower performance. Another consideration here is the impact of the driving temperature difference in the major heat exchange processes, as shown in FIG. 45. This consideration would have to be factored into a system that lacked the sensible heat storage as an integral component of the overall energy storage system.

Table 2 presents information from computational runs for a sensible heat storage system as shown in FIG. 1 under a set of nominal conditions where the ambient temperature for the charging and discharging phases of the cycle are the same and set to 35° C. Table 2 provides quantities such as the amount of thermal energy that must be rejected to ambient, or supplied by the ambient, during the charge or discharge phase of the system, respectively. Also, a fill material is assumed in the sensible heat storage tank and values provided in the table are for a representative material such as rock (granite). Propane was the working fluid for the computational runs. Also provided is the amount of the mal energy storage needed. These quantities were determined for two cases assuming isentropic efficiencies of 100% and 85% for both mechanical components. As Table 2 shows, a round-trip storage efficiency of 96% is calculated for the 100% isentropic (or ideal) case. This ideal case also does not take into account driving temperature differences in the heat transfer components. Note, however, FIGS. 22 and 23 do take into account the driving temperature differences.

TABLE 2

Nominal Operating Values with No Driving ΔT Considerations

|  | 100% Isentropic Case | 85% Isentropic Case |
|---|---|---|
| Compressor Efficiency | 100% | 85% |
| Expander Efficiency | 100% | 85% |
| Cold Temperature | −15° C. | −15° C. |
| Ambient Temperature | 35° C. | 35° C. |
| Nominal Pressure Ratio | 4.18 | 4.18 |
| Round-Trip Efficiency | 96% | 70% |
| Values given below are in kW-h of heat per kW-h of electricity released back to the grid | | |
| Chill Stored in Latent Cold Tank | 5.92 | 7.14 |
| Heat Rejected to Ambient (Charging Mode) | 4.98 | 6.22 |
| Heat Provided from Ambient (Discharging Mode) | 4.91 | 5.78 |
| Heat Stored in Sensible Storage Tank | 1.95 | 2.35 |
| Heat Retrieved in Sensible Storage Tank | 1.99 | 2.34 |
| Amount of storage material needed per kW-h of electricity released back to grid | | |
| Approximate Mass (kg) of Latent Heat Storage Material[a] | 134.6 | 162.4 |
| Volume (m³) of Latent Heat Storage Material | 0.122 | 0.148 |
| Approximate Mass (kg) of Sensible Heat Storage Material[b] | 179 | 210 |
| Volume (m³) of Sensible Heat Storage Material | 0.066 | 0.078 |

[a]Ethylene glycol is used as a representative material even though its freezing point is −13.5° C.
[b]Rock (granite) is used as a representative material with ρ = 2800 kg/m³ and $c_p$ = 0.8 kJ/° C.-kg In Table 2, the results from the computations show that 5.92 and 7.14 kW-h of latent heat needs to be stored for every kW-h of electricity released back onto the grid for the 100% and 85% isentropic efficiency cases, respectively. Also, taking the 85% case as an example, approximately 6.22 kW-h of heat would be rejected to the surroundings during the charging phase; slightly less than this value represents the amount of energy that must be supplied from the surroundings during the discharge phase. Using the 85% isentropic efficiency case and assuming the use of ethylene glycol for the latent heat storage material (having a latent heat of 160 kJ/kg, or 0.044 kW-h/kg), to release 1 kW-h of electricity back onto the grid could require approximately 162 kg of material which occupies a volume of 0.148 m³. This latter figure does not include volume for containment or flow channels for the working fluid. If an inexpensive sensible heat material is used such as rock pebbles, a lower limit on the sensible heat storage mass is 210 kg based strictly on $mc_p\Delta T$. It would have a volume of 0.078 m³, if accounting only for the storage material volume without interstitial spaces. Furthermore, only a lower limit would be placed on the pebble bed mass because typically two to three times this amount of rock could be needed to implement a "thermocline" sensible heat store. By referencing these first-order estimate calculations for the amount of storage material needed for the system, a scaled estimate to higher storage levels can be made by assuming the addition of more material and tank volume. For example, a 100 kW-h storage system would use approximately 16,200 kg of ethylene glycol having a volume of 14.7 m³. If a volume factor of 1.5 is used for allowances for containment and working fluid channels, a spherical tank with a diameter of 3.5 m is determined. The sensible heat storage tank also scaled to this size and using a volume factor of two would give a cylinder 0.75 m in diameter and 5.1 meters long. These would be reasonable values for a 100 kW-h system and much larger storage tanks and systems can be envisioned in industrial scale settings. Note that the differences in the values between Tables 1 and 2 arise from the differences in the systems analyzed, nominal operating conditions, component performances used in the computations, and the idealizations used to generate each set of data.

IV. A System for Purifying Fluid

Low grade heat (with a temperature below approximately 90° C.) is available from solar, geothermal, power plants, and industrial sources and can be, in certain circumstances, inexpensive to collect and use. In addition, diurnal temperature swings also represent a source of exploitable low grade heat. Embodiments disclosed herein can utilize a source of low grade heat in the production of fresh water from non-potable water.

Particular disclosed embodiments concern a system that purifies fluid as well as reduces the amount of energy needed to carry out such a process. In addition, particular disclosed embodiments are capable of using energy sources other than high-grade electrical power; such as, but not limited to, low-grade thermal energy. Particular embodiments concern low-grade thermal heat sources wherein the temperature ranges from about 40° C. to about 100° C., more typically from about 60° C. to about 80° C. Non-limiting examples of low-grade thermal energy include solar energy, energy from geothermal sources, industrial waste heat, power plant waste heat, environmental temperature differences (e.g. diurnal temperature swings), and combustion of indigenous fuels.

In certain embodiments expander/compressor technology is used to recover heat from melting a frozen fluid, such as ice, after it has been frozen to separate contaminants, such as salts (e.g. sodium chloride). Energy recovery may be achieved by using, for example, a heat pump and heat engine cycle integrated together through a heat exchanger device. Such a system provides heat recovery from the freeze/thaw cycles, and improves the thermodynamic performance of the two cycles such that fundamental limitations on energy use through Rankine cycle implementation are minimized and Carnot efficiency is approached. Particular disclosed embodiments of the disclosed system concern using continuous operation to produce potable water, and others concern using at least two batch-wise processing units to keep the system operation nearly steady. In particular embodiments, low grade thermal energy found in the surroundings may be used to drive the purification process. While certain descriptions included herein describe embodiments a system for purifying non-potable water, a person of ordinary skill in the art will recognize that the disclosed embodiments need not be limited to purifying non-potable water and that other fluids capable of being purified by a freeze/pump/thaw process are contemplated by the present disclosure.

Figure 47:
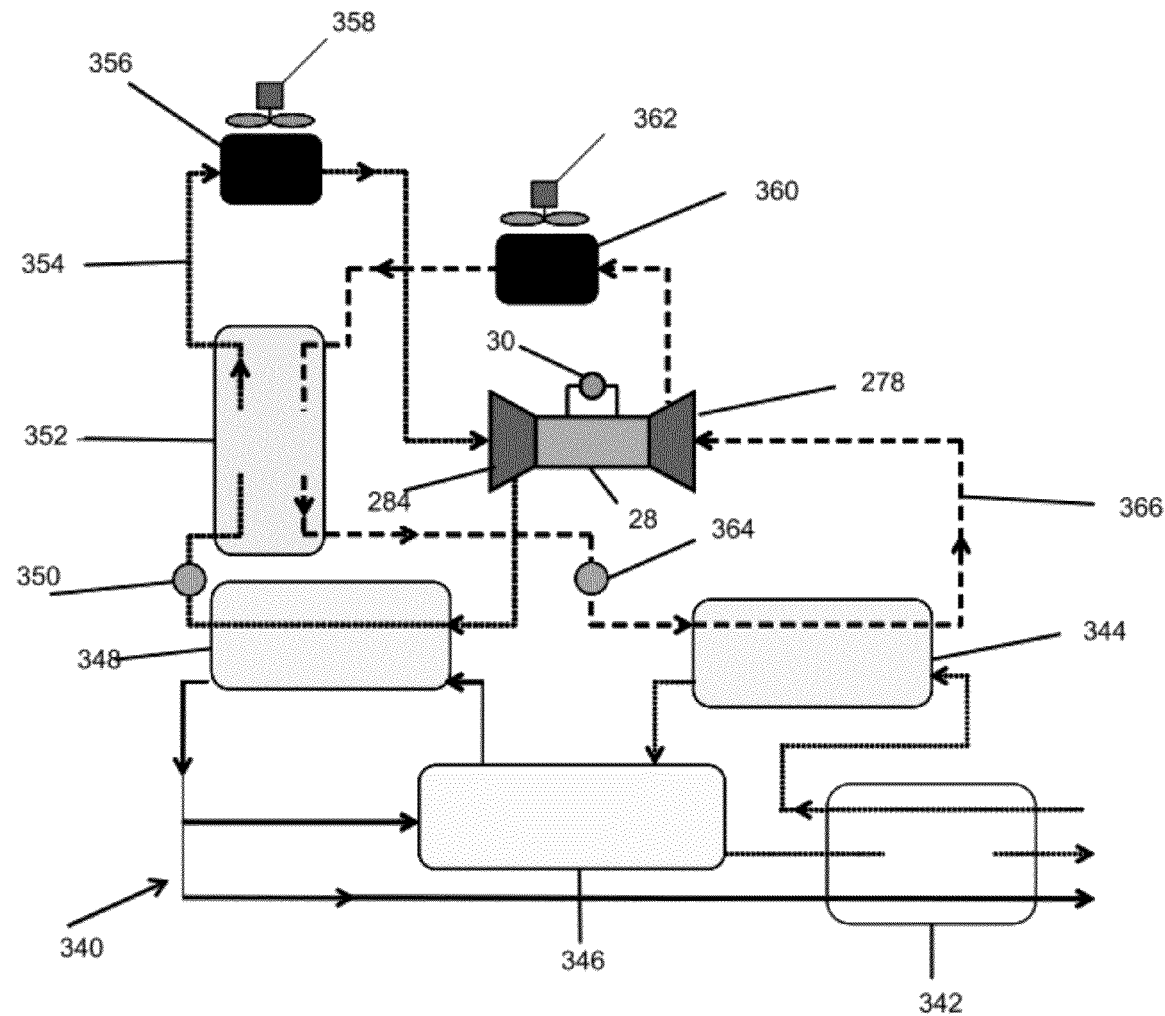
FIG. 47 is a schematic diagram that shows a particular embodiment of a water purification system comprising expander/compressor processes.

Particular embodiments of a system that purifies fluid, such as, but not limited to, non-potable water are presented. FIG. 47 shows a schematic of a disclosed embodiment of a system used to purify fluid. System 340, as illustrated in FIG. 47, is arranged such that the heat exchange processes with the surroundings are at the top of the diagram, the thermodynamic cycles are in the middle, and the water processing is at the bottom; however a person of ordinary skill in the art will recognize that this arrangement may be varied.

Particular embodiments concern using an expander/compressor approach to drive the refrigeration of the freeze water purification process. With reference to FIG. 47, a system 340 may be used to purify fluid. System 340 comprises fluid processing components as well as thermodynamic and heat exchanging features. The water processing components may comprise a counterflow heat exchanger device 342, a freezer 344, which further comprises a heat exchanger, a tank 346, in which separation and washing occurs, and a melter 348, which further comprises a heat exchanger. The thermodynamic and heat exchanging features are fluidly coupled in two separate loops. The thawing loop 354, which produces a power cycle or expander cycle (the terms "power cycle" and "expander cycle" may be used interchangeably throughout), includes a vapor expander 284, a feed pump 350, a counterflow heat exchanger device 352, and an elevated temperature heat exchanger device 356. The freezing loop 366, which provides a heat pump cycle (the terms "refrigeration cycle," "compressor cycle," and "freezing cycle" may be used interchangeably with the term "heat pump cycle") comprises a compressor 278, an ambient temperature heat exchanger device 360, the same counterflow heat exchanger device 352 as the thawing loop 354, a throttling valve 364, and freezer 344. System 340 also comprises a motor/generator device 28 which may be electrically coupled to a power grid 30. Both the vapor expander 284 and the compressor 278 may be mechanically coupled to the motor/generator device 28. Additionally, system 340 comprises temperature-modulator devices 358 and 362.

In addition to the previously mentioned components, the thawing cycle also comprises a first working fluid. Any of the working fluids mentioned herein may be used in this and other disclosed embodiments of a system that purifies fluid and a combined fluid purification/energy storage system. As illustrated in FIG. 47, the components of the thawing cycle are fluidly coupled.

The freezing loop also comprises a second working fluid, such as a refrigerant. Examples of refrigerants include natural refrigerants known to a person of ordinary skill in the art, such as, but not limited to propane and butane, ammonia; and synthetic refrigerants known to a person of ordinary skill in the art. Any suitable refrigerant may be used in this disclosed embodiment and the other embodiments disclosed herein. In particular disclosed embodiments, the components of the freezing loop are fluidly coupled Another embodiment of a system that produces purified fluids is disclosed. In this embodiment, a thermal source of water, such as a thermal pond, may be used to supply water at two different temperatures, which may drive the purification process. In particular embodiments, a natural or man-made thermal pond may be used that has a salt gradient to stabilize the thermal gradient and use solar energy to establish the thermal gradient. Warm water, ranging from about 50° C. to about 90° C., more typically ranging from about 60° C. to about 80° C., can be obtained using energy, such as solar energy, collected by the thermal pond. Evaporative cooling of the top layer can provide a source of wet-bulb temperature water, which ranges in temperature from about 5° C. to about 50° C.; more typically from about 10° C. to about 40° C.

Figure 48:
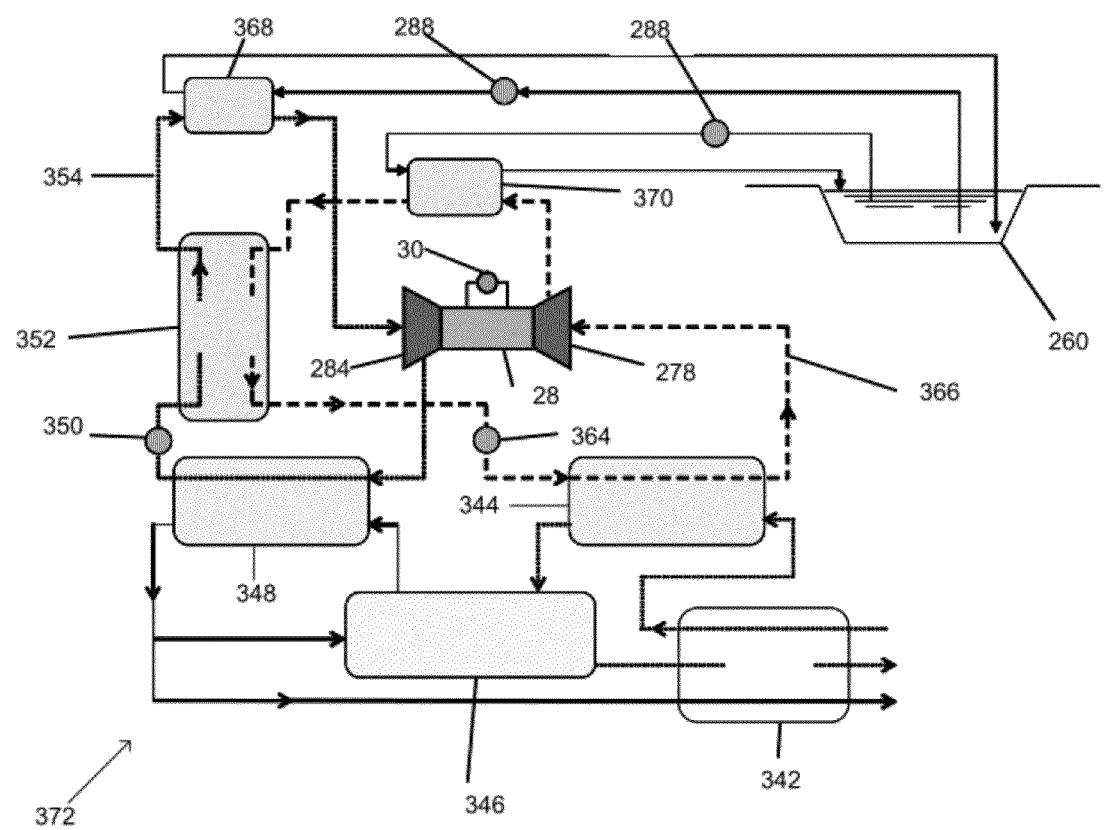
FIG. 48 is a schematic diagram that shows an exemplary embodiment that creates the two different temperatures used in certain embodiments of the disclosed purification system.

A particular embodiment of a system 372 is shown in FIG. 48. As illustrated in FIG. 48, the system comprises the following fluid processing components: a counterflow heat exchanger 342, a freezer 344, a tank 346, in which separation and washing may occur, and a melter 348. The thermodynamic and heat exchanging features are fluidly coupled in two separate loops. The thawing loop 354 comprises a vapor expander 284, a heat exchanger located in the melter 348, a feed pump 350, a counterflow heat exchanger 352, and a warm temperature heat exchanger 368. The freezing loop (e.g. heat pump cycle) 366 features a compressor 278, a wet-bulb heat exchanger 370, the counterflow heat exchanger 352 also associated with the thawing loop 354, a valve 364, and a heat exchanger located in the freezer 344. System 372 also comprises a motor/generator device 28 which may be electrically coupled to a power grid 30. Both the vapor expander 284 and the compressor 278 may be mechanically coupled to the motor/generator device 28.

In addition to the previously mentioned components, the thawing loop 354 also comprises a first working fluid. As illustrated in FIG. 48, the components of the thawing loop may be fluidly coupled The freezing loop also comprises a second working fluid, such as a refrigerant. As illustrated in FIG. 48, the components of the freezing loop may be fluidly coupled FIG. 48 illustrates a particular embodiment that creates the two different temperatures in the thermal pond 260. This particular embodiment uses energy, such as solar radiation, to heat the bottom region of thermal pond 260 to temperatures ranging from about 50° C. to about 90° C., more typically ranging from about 60° C. to about 80° C. The thermal pond 260 has a salt concentration gradient; for example, the bottom of the pond has a high salt concentration and the top has a low salt concentration range. This configuration is stable with respect to convection currents, and energy (e.g. solar radiation) is able to penetrate to the lower regions of the pond and heat the water near the bottom of the pond. In addition, the top of the thermal pond can approach the wet bulb temperature through evaporative cooling. In particular embodiments, evaporation can be promoted with a water circulation source, such as a sprinkler system. Thus, in particular embodiments, the thermal pond configuration of system 372 can provide both the warm source of heat for driving the power cycle and create a cooler ambient temperature for heat rejection for the heat pump cycle. The thermal pond 260 may be fluidly coupled to pumps 288 which are fluidly coupled to the warm temperature heat exchanger 368 and the wet-bulb heat exchanger 370.

In particular embodiments, a cooler ambient temperature may be available from, for example, the ocean or some other sink found in the environment. In such an embodiment, the thermal pond may be used to generate the warm temperatures needed to drive the power cycle. Also, if using the external thermal pond of system 372 is not viable in certain locations, energy (e.g. solar energy) can still be utilized by capturing it, using, for example, flat panel solar collectors.

V. A Combined System that Purifies Fluid and Stores Energy

Figure 49:
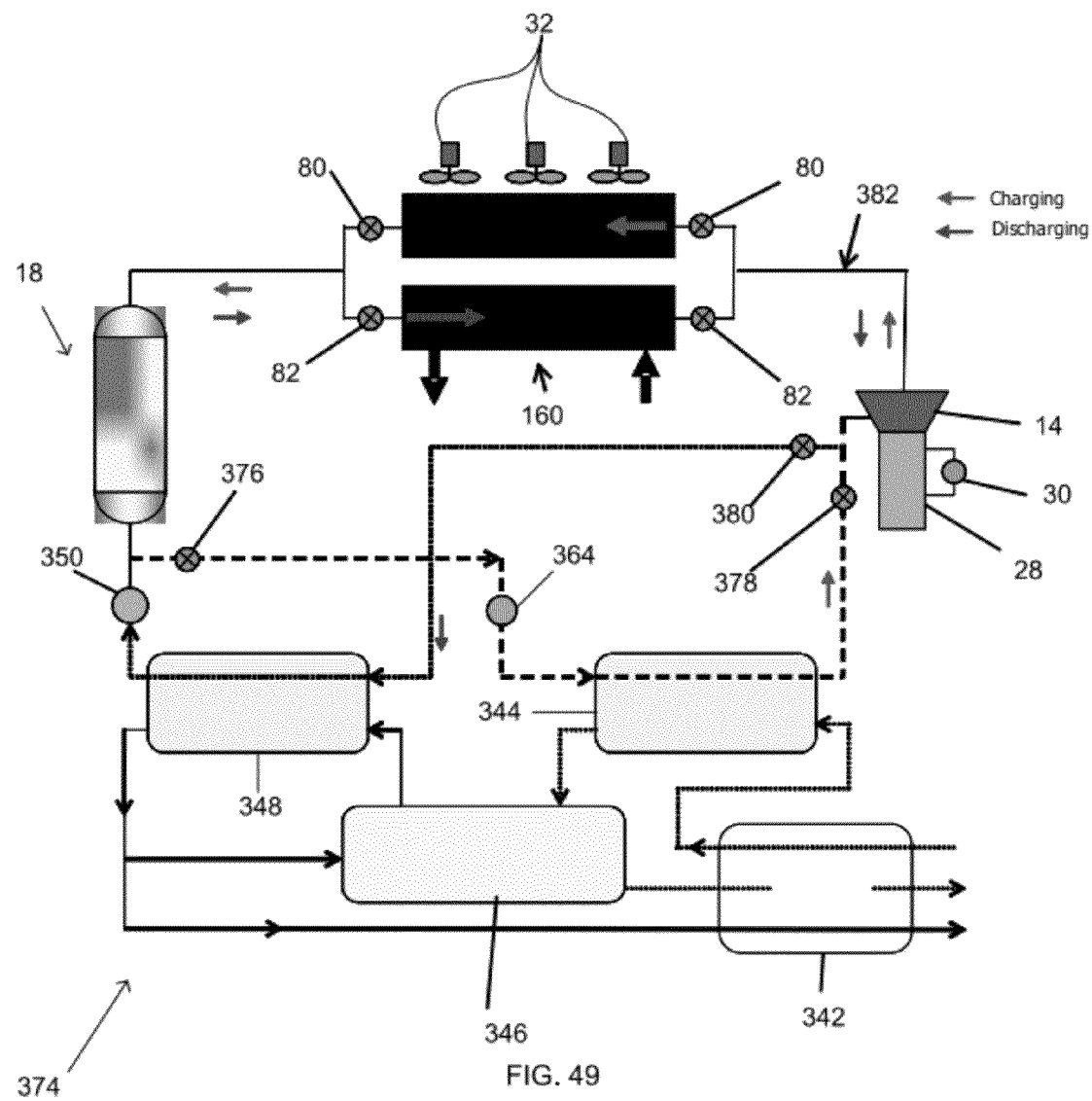
FIG. 49 is a schematic diagram that shows an exemplary embodiment of a co-functional purification system that can simultaneously store electrical energy and purify water.

Further disclosed embodiments of the disclosed system that produce purified fluid, such as, but not limited to, non-potable water, are disclosed in which an energy storage process and a fluid purification process are combined. For example, FIG. 49 illustrates a particular embodiment of a system 374 wherein the components that process impure fluid are substantially similar to those disclosed in FIGS. 47 and 48. The thermodynamic features of system 374 comprise a vapor expander/compressor device 14; a waste-heat recovery device 160; valves 80 and 82 that control charging/discharging cycles, respectively; a sensible heat storage device 18; a motor/generator device 28; and a power grid 30. As shown in FIG. 49, each of the devices can be fluidly coupled in a fluidly-closed circuit 382, through which a two-phase working fluid can flow. A person of ordinary skill in the art will recognize that additional valves and plumbing may be needed in order to facilitate transferring liquids for heat exchange, holding tanks, and pumps.

As illustrated in FIG. 49, energy storage can be coupled with the purification process. System 374, illustrated in FIG. 49, comprises a motor pump 350, a throttling valve 364, valves 376, 378 and 380, which permit control of the flow of the single working fluid during either the freeze cycle or the thaw cycle, and heat exchangers that are located in the melter 348 and freezer 344. A person of ordinary skill in the art will recognize that energy storage may occur at the same time as fluid purification.

Figure 50:
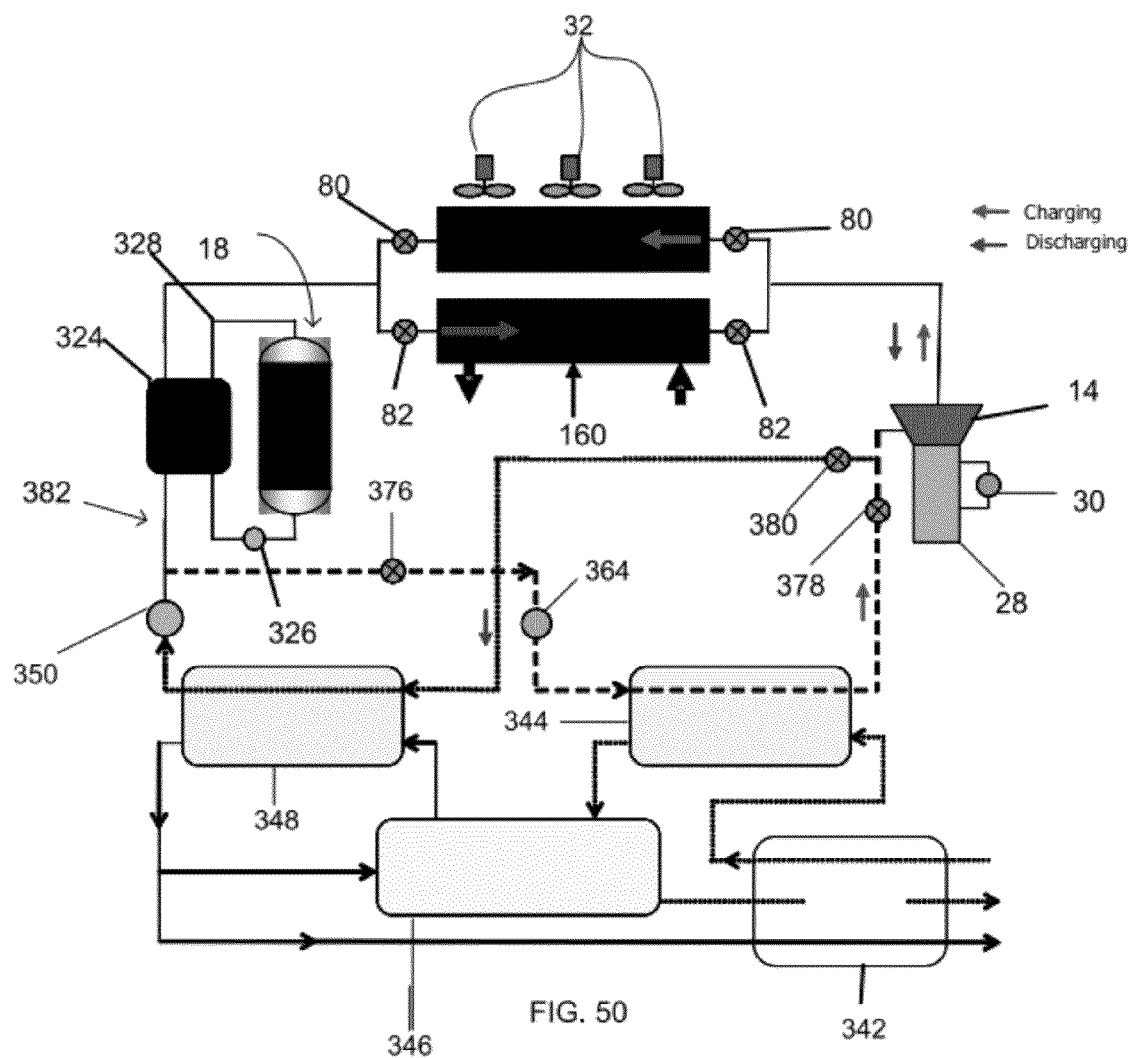
FIG. 50 is a schematic diagram that shows an exemplary embodiment that stores sensible thermal energy from a working fluid.

Another embodiment combining energy storage and fluid purification is disclosed. As illustrated in FIG. 50, similar fluid processing components are used as those shown in any one of FIGS. 47, 48, and 49. The fluid processing components are powered by the components of the freezing and thawing thermodynamic cycles. As illustrated in FIG. 50, an expander/compressor device 14 is fluidly coupled to valves 80 and 82, which may be used to control the flow of the working fluid. The system also comprises a waste-heat recovery device 160, which is fluidly coupled to an additional counterflow heat exchanger 324, which is capable of working with the sensible heat storage device 18. As shown in FIG. 50, particular embodiments may have a secondary fluid loop 328 of a storage medium comprising a water based solution (e.g. water plus a second component such as, but not limited to, propylene glycol), which is contained in the sensible heat storage device 18 and used to store the sensible thermal energy from the cycle working fluid. The sensible heat storage device 18 is included within the secondary fluid loop 328, as well as a reversing pump 326. In particular embodiments, the sensible heat storage device 18 may hold a pebble bed or an insulated, movable separator. The disclosed system comprises substantially similar thermodynamic cycle components as those shown in FIG. 49 (e.g. a motor pump, throttling valve, valves, and heat exchangers in both the melting and freezing units), as well as the motor/generator device and power grid shown in any one of FIGS. 47, 48, and 49.

Figure 51:
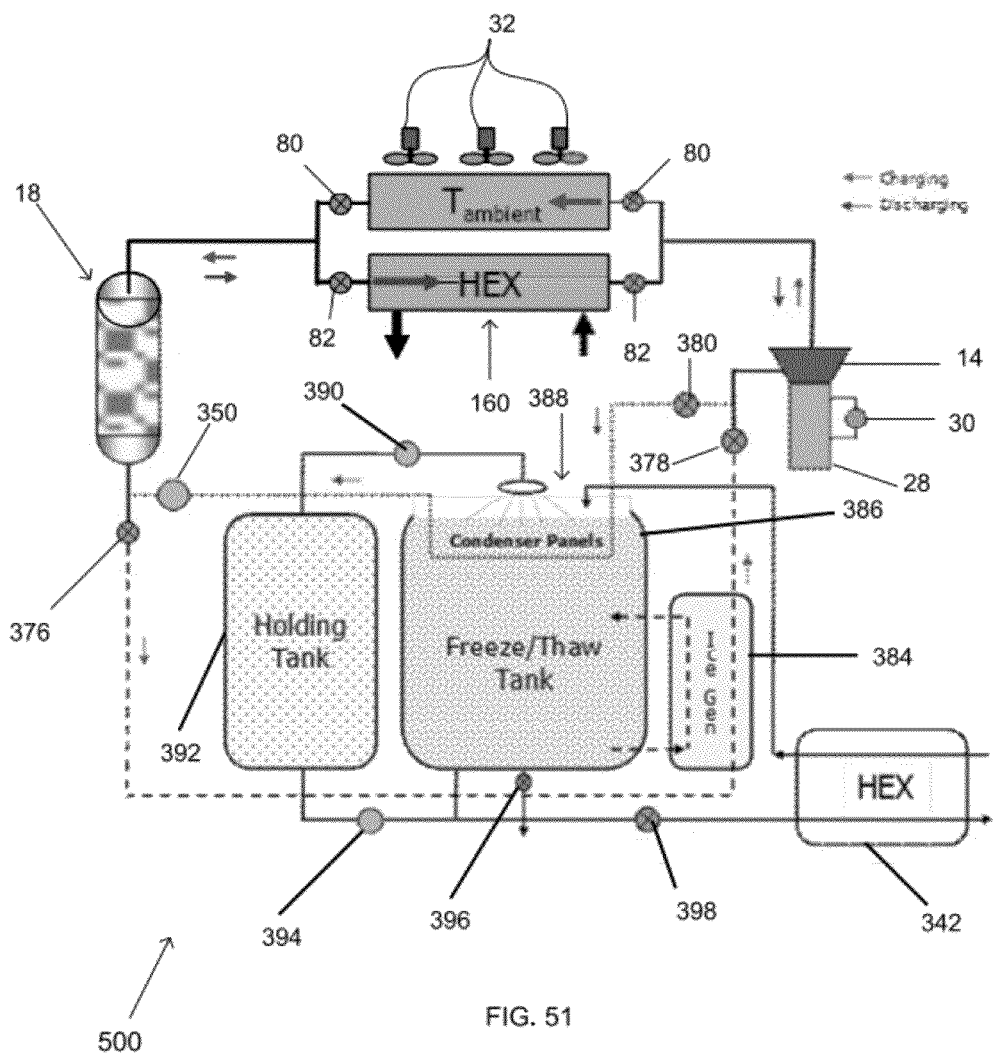
FIG. 51 is a schematic diagram that shows an exemplary embodiment of a co-functional purification system/energy storage system that comprises an integrated holding tank that can both freeze and thaw.

Another embodiment combining energy storage and fluid purification is illustrated in FIG. 51. The water processing components of system 500, as illustrated in FIG. 51, include a two-fluid heat exchanger 342, a freeze/thaw tank 386, and an ice generator device 384. The freeze/thaw tank 386 may comprise condenser panels 388. System 500 also comprises a pump 390 that transfers condensation from the condenser panels to a holding tank 392, a pump 394, an outlet valve 396 to release any species of contaminant that would be substantially removed from non-potable water by a freeze/wash process (e.g. salt, such as sodium chloride, and other contaminants), and an additional valve 398. The ice generator device 384 may be selected from a standard scraped surface heat exchanger or an orbiting rod type that produces an ice slurry that circulates through the ice generator device 384 and into the freeze/thaw tank 386. The energy storage features and thermodynamic cycles of system 500 are substantially similar to the features and cycles shown in FIG. 49.

VI. Method for Purifying Fluid

A method for using the disclosed system is disclosed. This method may be performed using a continuous operation mode or an intermittent, batch-wise mode. The following embodiments of the disclosed method are provided for the fluid/ice handling section of the purification process and are meant to be descriptive in providing the basic steps needed for ice handling by the purification system in order to properly function.

A. Continuous Operation Mode for the Expander/Compressor System

A general description for using the disclosed system in a continuous operation mode is disclosed. In particular embodiments, impure fluid, such as non-potable water, enters the system through an inlet heat exchanger and is cooled to near freezing conditions. The impure fluid then enters a freezer and is frozen in a continuous process, at which point, both an frozen fluid slurry and concentrated contaminates leave the freezer and enter a separator/washer unit. The concentrated contaminants can be extracted from the slurry to produce frozen fluid that may or may not comprise a small amount of contaminants. The frozen fluid is then washed with a small amount of fresh fluid to remove the remaining contaminants, and the concentrated contaminants and wash fluid are rejected from the system through the inlet heat exchanger. The washed frozen fluid enters a melter where the frozen fluid is melted to produce substantially purified fluid. The purified fluid leaves the melter, at which point a small portion of fresh fluid is diverted to be used for washing and the larger portion of pure fluid leaves the purification system through the inlet heat exchanger.

With reference to FIG. 47, non-potable water, such as sea water, enters the system through a counterflow heat exchanger 342. The non-potable water is supplied to the freezer 344 where it is cooled to a temperature ranging from about 0° C. to about −10° C.; more typically from about −1° C. to about −5° C. A mixture or slurry of contaminants, such as salts (e.g. sodium chloride) and ice is continuously produced in the freezer 344 and transferred to the separator/washer unit 346 where the ice is washed with an amount of fresh water sufficient to remove the sodium chloride, which is separated from the decontaminated ice and removed from the system through the heat exchanger 342. The purified ice from the tank 346 may be fluidly delivered to a melter 348, wherein the ice is melted and the energy used to freeze the water is partially recovered by the heat engine cycle. Purified water passes from the melter 348. Some of the potable water is diverged to the tank 346 as wash water, with the majority of the potable water being sent to the heat exchanger 342. The potable water exits the system through the heat exchanger 342 and is ready for use. In addition, any species of contaminant capable of being separated from purified water during a freezing/washing process, such as salts (e.g. sodium chloride) and other contaminants, may exit the system through the counterflow heat exchanger. Additional embodiments concern using direct contact heat exchange for the melting and freezing steps.

The thermodynamic processes of the system illustrated in FIG. 47 are disclosed. According to FIG. 47, the working fluid condenses in the melter 348 after passing through the vapor expander 284. As it emerges from the expander 284, the working fluid is in a vapor state, but it is near saturation conditions as it enters the melter 348. When the working fluid is in the melter 348, it condenses at a temperature ranging from about 5° C. to about −10° C.; more typically from about 2° C. to about −5° C., and melts the ice as heat is transferred to it. A person of ordinary skill in the art will recognize that the working fluid passes through the melter 348 without mixing with the purified water produced as the ice is melted. The working fluid emerges from the melter 348 as a saturated liquid and passes through the feed pump 350 where the working fluid's pressure is increased. At this point the working fluid is at a temperature of approximately 0° C. as it enters the counterflow heat exchanger 352. In the counterflow heat exchanger 352, the working fluid increases in temperature ranging from about 10° C. to about 100° C.; more typically from about 20° C. to about 90° C.; even more typically from about 50° C. to about 80° C. Thus, a person of ordinary skill in the art will recognize that the counterflow heat exchanger 352 warms the working fluid before it is vaporized in the elevated temperature heat exchanger 356. When the working fluid is in the elevated temperature heat exchanger 356, an energy source capable of producing heat at a temperature higher than local ambient temperature is used to boil the working fluid at elevated pressure. The energy source may be selected from solar energy, environmental temperature differences, geothermal energy, an industrial waste heat source, or waste heat from a power plant. After the working fluid has been vaporized, it is routed to the expander 284 where it undergoes a vapor expansion process and hence produces work to drive the compressor 278. The spent vapor enters the melter 348 where condensation in the heat exchanger that is located in the melter takes place and the cycle starts again.

The freezing loop 366, as illustrated in FIG. 47, may begin in the freezer 344 where the refrigerant evaporates as the compressor 278 draws the vapor refrigerant from the cold space of the freezer. After passing through the compressor 278, the refrigerant passes through the ambient temperature heat exchanger 360 where the refrigerant is condensed. The thermal sink for this heat transfer process would be the coolest environmental temperature available, for example the atmosphere or the non-potable water source conditions preferably below the surface where colder temperatures prevail. After condensation, the refrigerant near ambient temperature flows through the counterflow heat exchanger 352 where it decreases in temperature to near 0° C. as the power cycle working fluid warms to ambient temperature. The refrigerant then throttles through a valve 364 and enters the freezer 344 where ice may be made. In particular embodiments, the expansion of the warm, pressurized power cycle vapor passing through the expander 284 drives the compressor 278 to allow the refrigeration cycle to operate. A person of ordinary skill in the art will recognize that using efficient components and small driving temperature differences in the heat exchange components could result in producing more power than consumed by the compressor 278; therefore, particular embodiments may comprise a motor/generator device 28 so that excess power could be removed from the vapor expander 284 and delivered to the power grid 30. Also, if insufficient power is generated, the motor function could be used to provide the necessary input to the compressor 278.

A method for using the system 372 illustrated in FIG. 48 is disclosed. A person of ordinary skill in the art will recognize that a method similar to the method described for the system of FIG. 47 may be employed in the system illustrated in FIG. 48. In system 372; however, the warm temperature heat exchanger 368, which is used to generate the temperature needed for the power cycle, is powered by warm water obtained from the bottom of thermal pond 260. The warm water flows through the warm temperature heat exchanger 368, which then increases the temperature of the working fluid before it passes into the expander 284. Warm water, which has left the warm temperature heat exchanger 368, flows back into the thermal pond 260. In addition, cool water from the thermal pond 260 flows into the wet-bulb heat exchanger 370 in order to provide the temperature level needed to cool the refrigerant as it leaves the compressor 278. Water from the wet-bulb heat exchanger 370 is then sent back to the thermal pond 260.

B. Intermittent, Batch-wise Operational Mode for an Expander/Compressor System

In particular embodiments, the expander/compressor system, wherein energy storage is not included, is shut down temporarily, allowing collection of purified fluid. Generally, the impure fluid enters the system through the inlet heat exchanger and is cooled to near freezing conditions after which the impure fluid fills a large freezer. Simultaneously, purified fluid that was previously melted in the melter drains from the melter and leaves the system through the inlet heat exchanger. When the filling and draining steps are completed, the frozen fluid from the separator/washer unit is sent to the melting tank at which point the expander/compressor cycle operates to create an frozen fluid slurry from the impure fluid in the freezer. The expander/compressor cycle also melts the frozen fluid in the melting tank. The expander/compressor cycle is shut down and a frozen fluid/contaminant slurry leaves the freezer to repeat the process. In particular embodiments, a small amount of purified fluid that leaves the melting tank is used to wash the frozen fluid in the separator/washer unit. In further embodiments, a small holding tank for concentrated contaminants/wash fluid can be used to temporarily hold these fluids so that they can also flow through the inlet heat exchanger at the correct time.

C. Intermittent, Batch-wise Operational Mode for a Co-Functional Energy Storage/Purification System In particular embodiments, a co-functional energy storage/purification system may be used to collect potable water; however, the disclosed embodiments are not intended to be limited to water purification and other fluids are contemplated by the disclosed method. In certain disclosed embodiments, non-potable water enters the system through the inlet heat exchanger and is cooled to near freezing conditions, after which point the non-potable water fills a large freeze/thaw tank. The energy storage working fluid operates in charge mode by freezing the non-potable water into a slurry using an ice generator attached to, or within the freeze/thaw tank. After creating the ice/contaminant slurry, the charge cycle is completed, and the concentrated contaminants are drained from the freeze/thaw tank. A small amount of fresh water is used to rinse the remaining ice in the tank and then the tank is re-filled with enough fresh water from the holding tank to create a fresh water/ice slurry. The energy storage working fluid then operates in discharge mode by thawing the water/ice mixture in the freeze/thaw tank. After the discharge cycle, the liquid fresh water is drained from the freeze/thaw tank and placed in the holding tank. When the freeze/thaw tank is re-filled with non-potable water, the fresh water in the holding tank flows out of the system through the inlet heat exchanger and cools the incoming non-potable water. In particular embodiments, a small holding tank for concentrated contaminants/wash water can be used to temporarily hold these fluids so that they can also flow through the inlet heat exchanger at the correct time.

A method for using the combined energy storage and water purification system 374 is disclosed (FIG. 49). In particular embodiments, the water processing steps are similar to those described for FIGS. 47 and 48. In reference to the thermodynamics of system 374, a single working fluid is employed and the direction of the cycle is reversed when converting from an energy storage charging function to the discharging function. The energy required to power the freezer may be produced by the power grid 30, and energy flows back to the power grid as the ice is melted in the melter 348. The sensible storage device 18 is used to store thermal energy from the charge cycle and provide it to the discharge cycle to make the energy storage process more efficient. In particular embodiments, system 374 can use as much energy in the discharge cycle as is produced by the charge cycle, thus acting as an efficient embodiment of the disclosed system. As previously mentioned, valves 376, 380, and 378 are used to ensure the flow of the working fluid is consistent with sending the fluid either through the melter (e.g. opening valve 380, and closing valves 376 and 378) or freezer (e.g. opening valves 378 and 376, and closing valve 380) of system 374. Efficient operation of the freezing/thawing process can be mediated by using the sensible heat storage and/or differential temperature sources/sinks in the surroundings.

FIG. 51 is one embodiment that shows a system configuration where the freeze/thaw processes take place in the same tank. As illustrated in FIG. 51, the ice generator 384 is used external to the freeze/thaw tank 386, but a person of ordinary skill in the art will recognize that ice generation can also occur inside the freeze/thaw tank. The holding tank 392 facilitates moving the water through the water handling components of the system at the correct times in the process. As with other disclosed embodiments, energy can be stored in this system in a sensible heat storage device 18 as non-potable water is being frozen in the freeze/thaw tank 386.

The water processing steps shown in FIG. 51 may differ from those embodiments previously disclosed. Freezing, contaminant/salt drainage, washing, and thawing all take place sequentially in the freeze/thaw tank 386 and ice generator subcomponent 384. The freezing part of the process is associated with heat pump operation where the heat removed from the water during ice formation uses as low an environmental temperature as possible for heat rejection. After freezing the non-potable water to levels that represent approximately 50% or greater ice, the concentrated water contaminants (e.g. salt, such as sodium chloride) are drained from the tank through an outlet 396. A small amount of fresh water, ranging from about 2 to 15 percent, more typically about 10 percent, is used to remove and drain any residual contaminants, such as salts (e.g. sodium chloride). The freeze/thaw tank 386 is then filled with enough fresh water so that the tank is composed of a fresh water/ice slurry. The thawing process takes place with the power cycle operating in the reverse direction from the heat pump cycle, wherein an elevated temperature source of heat is used from the surroundings. This allows high performance in terms of the energy storage aspect of the system operating at high round trip efficiencies while purifying a liquid (e.g. non-potable water).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising: combining a heat pump cycle and a heat engine cycle within a system comprising:
    a cold storage tank;
    water, an alkylene glycol, or combination thereof within the cold storage tank;
    an external pump that is fluidly coupled to the storage tank;
    an external heat exchanger that is fluidly coupled to the external pump, wherein the external heat exchanger is capable of supercooling the water, the alkylene glycol, or combination thereof to form an ice slurry;
    a vapor expander and compressor device mechanically coupled to a motor/generator device, which is electrically coupled to a power grid or a power source,
    a phase-change heat exchanger fluidly coupled to the vapor expander and compressor device;
    an insulated sensible heat storage tank comprising a cold fluid in a first end of the insulated sensible heat storage tank and a hot fluid in a second end of the insulated sensible heat storage tank, the insulated sensible heat storage tank being fluidly coupled to the phase-change heat exchanger;
    a reversible flow pump that fluidly couples the insulated sensible heat storage tank to the cold storage tank; such components being fluidly coupled to define a first fluid loop having a working fluid that flows there through;
    a second fluid loop that passes through the phase-change heat exchanger of the first fluid loop; and wherein the second fluid loop contains a fluid medium, the fluid medium being capable of exchanging thermal energy with the working fluid;

operating the system by circulating the working fluid there through;

embedding sensible heat storage in a compression cycle of the working fluid; and using the stored sensible heat during an expansion cycle of the working fluid to increase round-trip efficiency of the system.

2. The method according to claim 1, further comprising powering the heat pump cycle by electrical energy and storing the energy in a phase change of a latent heat storage material.

3. The method according to claim 1 where the phase-change heat exchanger is operated near ambient temperature during energy storage and the phase-change heat exchanger is operated at higher than ambient temperatures during energy generation.

4. The method according to claim 1 where the phase-change heat exchanger is operated at a charging temperature during energy storage and the phase-change heat exchanger is operated at a discharging temperature during energy generation where the discharging temperature is higher than the charging temperature.

5. The method according to claim 4 further comprising using a gas as a heat exchange medium in the phase-change heat exchanger for transferring heat to and from the working fluid.

6. The method according to claim 4 further comprising using a liquid as a heat exchange medium in the phase-change heat exchanger for transferring heat to and from the working fluid.

7. A method, comprising:
providing non-potable water to a system comprising:
a cold storage tank;
water, an alkylene glycol, or combination thereof within the cold storage tank;
an external pump that is fluidly coupled to the storage tank;
an external heat exchanger that is fluidly coupled to the external pump, wherein the external heat exchanger is capable of supercooling the water, the alkylene glycol, or combination thereof to form an ice slurry;
a vapor expander and compressor device mechanically coupled to a motor/generator device, which is electrically coupled to a power grid or a power source,
a phase-change heat exchanger fluidly coupled to the vapor expander and compressor device;
an insulated sensible heat storage tank comprising a cold fluid in a first end of the insulated sensible heat storage tank and a hot fluid in a second end of the insulated sensible heat storage tank, the insulated sensible heat storage tank being fluidly coupled to the phase-change heat exchanger;
a reversible flow pump that fluidly couples the insulated sensible heat storage tank to the cold storage tank; such components being fluidly coupled to define a first fluid loop having a working fluid that flows there through;
a second fluid loop that passes through the phase-change heat exchanger of the first fluid loop; and
wherein the second fluid loop contains a fluid medium, the fluid medium being capable of exchanging thermal energy with the working fluid;
a thermodynamic heat pump cycle comprising a heat exchanger in a freezing section;
a thermodynamic power cycle comprising a heat exchanger in a melting section;
a section where ice is substantially separated from contaminants and washed;
an additional heat exchanger to cool incoming impure fluid;
and
wherein the working fluid is fluidly coupled to the thermodynamic heat pump cycle and the thermodynamic power cycle;
a freezer; and
a melter
generating ice from the non-potable water;
separating the ice from contaminants in the non-potable water;
washing the ice; and
melting the ice to produce potable water.

8. The method of claim 7 comprising:
providing the non-potable water from an external source to the system;
generating the ice in the freezer;
separating the ice from sodium chloride present in the non-potable water;
washing the ice; and
melting the ice in the melter to produce potable water.

9. A system, comprising:
a cold storage tank;
water, an alkylene glycol, or combination thereof within the cold storage tank;
an external pump that is fluidly coupled to the cold storage tank;
an external heat exchanger that is fluidly coupled to the external pump, wherein the external heat exchanger is capable of supercooling the water, the alkylene glycol, or combination thereof to form an ice slurry;
a vapor expander and compressor device mechanically coupled to a motor/generator device, which is electrically coupled to a power grid or a power source,
a phase-change heat exchanger fluidly coupled to the vapor expander and compressor device;
an insulated sensible heat storage tank comprising a cold fluid in a first end of the insulated sensible heat storage tank and a hot fluid in a second end of the insulated sensible heat storage tank, the insulated sensible heat storage tank being fluidly coupled to the phase-change heat exchanger;
a reversible flow pump that fluidly couples the insulated sensible heat storage tank to the cold storage tank; such components being fluidly coupled to define a first fluid loop having a working fluid that flows there through;
a second fluid loop that passes through the phase-change heat exchanger of the first fluid loop, and
wherein the second fluid loop contains a fluid medium, the fluid medium being capable of exchanging thermal energy with the working fluid.

10. The system according to claim 9 wherein the system is electrically coupled to the power grid for discharging or effectively coupled to the power source for charging.

11. The system according to claim 10 where the power source is remotely located from remaining components of the system and is selected from a wind turbine or a wave generator.

12. The system according to claim 9 wherein the system comprises a cold storage system and the latent heat storage tank stores latent heat at temperatures of from about −65C to about 0C.

13. The system according to claim 9 wherein the vapor expander and compressor device comprises a compressor rotor attached to an expander rotor on the same shaft with the motor/generator positioned in between the compressor and the expander.

14. The system according to claim 9 wherein any one of the vapor expander and compressor device, the motor/generator device, and the reversible flow pump are single function components.

15. The system according to claim 9 wherein the system comprises a hot storage system and the latent heat storage tank stores latent heat at temperatures of from about 90° C. to about 150° C.

16. The system according to claim 9 wherein the insulated sensible heat storage tank comprises a granulated mixture for increased heat capacity, decreased volume of the working fluid, and decreased mixing of the working fluid.

17. The system according to claim 16 wherein the granulated mixture comprises a material that is chemically non-reactive with the working fluid, is selected from granite, silica-based material, concrete, metals, glass, polymers, ceramics, and combinations thereof, and has a thermal capacity of from about 1,200 (J/kg ° C.) to about 200 (J/kg ° C.).

18. The system according to claim 16 and operating with cold storage wherein the working fluid flowing through the insulated sensible heat storage tank has a temperature from about −65° C. to about 0° C. at the first end of the insulated sensible heat storage tank and a temperature from about 0° C. to about 50° C. at the second end of the insulated sensible heat storage tank.

19. The system according to claim 9 wherein the latent heat storage tank comprises a mixture of water and an alkylene glycol having a melting point of from about −65° C. to about 0° C.

20. The system according to claim 19 wherein the mixture of water and the alkylene glycol is encapsulated in a thermally conductive material for decreased thermal resistance and increased contact surface area to form a capsule having a size of from about 0.1 cm$^3$ to about 100 cm$^3$.

21. The system according to claim 19 wherein the cold storage tank contains an ice slurry of the water and alkylene glycol mixture after it has been supercooled by the external heat exchanger.

22. The system according to claim 21 wherein the cold storage tank comprises an agitator for agitating the mixture of water and alkylene glycol.

23. The system according to claim 9 wherein the cold storage tank comprises a direct contact injection heat exchanger and a set of extruded aluminum channel arrays.

24. The system according to claim 9 wherein the alkylene glycol is ethylene glycol or propylene glycol.

25. The system according to claim 9 wherein the working fluid comprises a natural or synthetic refrigerant.

26. The system according to claim 9 wherein the working fluid is propane or hexane.

27. The system according to claim 9 further comprising a combustor.

28. The system according to claim 27 wherein the combustor is a boiler.

29. The system according to claim 9 further comprising a waste-heat recovery device.

30. The system according to claim 29 wherein the waste-heat recovery device is present in the second fluid loop for using heat from industrial processes or heat naturally available in the environment.

31. The system according to claim 30 wherein the heat naturally available in the environment comprises heat generated from a thermal pond.

32. The system according to claim 30 wherein the second fluid loop further comprises a cooling tower or a thermal pond.

33. The system according to claim 9 wherein the insulated sensible heat storage tank is present in a third fluid loop thermally coupled with the first fluid loop further comprising a pump, one or more valves, and a sensible heat exchanger.

34. The system according to claim 9 further comprising:
a thermodynamic heat pump cycle comprising a heat exchanger in a freezing section;
a thermodynamic power cycle comprising a heat exchanger in a melting section;
a section where ice is substantially separated from contaminants and washed;
an additional heat exchanger to cool incoming impure fluid; and
wherein the working fluid is fluidly coupled to the thermodynamic heat pump cycle and the thermodynamic power cycle.

35. The system of claim 34 where both the thermodynamic heat pump cycle and the thermodynamic power cycle are thermally coupled through a counterflow heat exchanger and mechanically coupled through a connection between the vapor expander and compressor device.

36. The system of claim 34 further comprising:
a freezer; and
a melter.

37. The system of claim 34 wherein the system is configured for use in a sequential manner or in a continuous manner for purifying fluid.

38. The system according to claim 9 wherein the fluid medium is further coupled to a heat source selected from a steam source, a thermal pond, a microturbine, an internal combustion engine, or a fuel cell.

39. The system according to claim 9 where a heat source is directly coupled to the system via the phase-change heat exchanger.

40. A system, comprising:
a cold storage tank;
water, an alkylene glycol, or combination thereof within the cold storage tank;
an external pump that is fluidly coupled to the storage tank;
an external heat exchanger that is fluidly coupled to the external pump, wherein the external heat exchanger is capable of supercooling the water, the alkylene glycol, or combination thereof to form an ice slurry;
a vapor expander and compressor device mechanically coupled to a motor/generator device, which is electrically coupled to a power grid or a power source,
a phase-change heat exchanger fluidly coupled to the vapor expander and compressor device;
an insulated sensible heat storage tank comprising a cold fluid in a first end of the insulated sensible heat storage tank and a hot fluid in a second end of the insulated sensible heat storage tank, the insulated sensible heat storage tank being fluidly coupled to the phase-change heat exchanger;
a reversible flow pump that fluidly couples the insulated sensible heat storage tank to the cold storage tank; such components being fluidly coupled to define a first fluid loop having a working fluid that flows there through;
a freezer;
a melter;

a unit suitable for separating ice from contaminants, and washing ice;

an additional heat exchanger;

a second fluid loop that passes through the phase-change heat exchanger of the first fluid loop; and wherein the second fluid loop contains a fluid medium, the fluid medium being capable of exchanging thermal energy with the working fluid;

a first thermodynamically-powered fluid loop that directs fluid in a first direction, the first thermodynamically-powered fluid loop comprising a heat exchanger located in the freezer, and a wet-bulb heat exchanger in thermal communication with a heat sink; and a second thermodynamically-powered fluid loop that directs fluid in a second direction, the second thermodynamically-powered fluid loop comprising a heat exchanger located in the melter and a warm temperature heat exchanger in thermal communication with a low-grade heat source.

41. The system of claim 40 wherein the vapor expander and compressor device is a scroll-based expander/compressor device.

42. The system of claim 40 wherein the vapor expander and compressor device is a turbomachinery device wherein a compressor rotor is attached to an expander rotor with the motor/generator device placed in between the compressor rotor and the expander rotor.

* * * * *